(12) United States Patent
Kwon et al.

(10) Patent No.: US 11,817,716 B2
(45) Date of Patent: Nov. 14, 2023

(54) WIRELESS CHARGING METHOD AND APPARATUS THEREFOR

(71) Applicant: LG INNOTEK CO., LTD., Seoul (KR)

(72) Inventors: Yong Il Kwon, Seoul (KR); Jay Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/872,708

(22) Filed: Jul. 25, 2022

(65) Prior Publication Data

US 2022/0368157 A1 Nov. 17, 2022

Related U.S. Application Data

(63) Continuation of application No. 16/761,199, filed as application No. PCT/KR2018/013258 on Nov. 2, 2018, now Pat. No. 11,437,849.

(30) Foreign Application Priority Data

Nov. 2, 2017 (KR) .......................... 10-2017-0145585
Nov. 9, 2017 (KR) .......................... 10-2017-0148699

(51) Int. Cl.
*H02J 50/60* (2016.01)
*H02J 50/10* (2016.01)
*H02J 7/00* (2006.01)

(52) U.S. Cl.
CPC ........ *H02J 50/10* (2016.02); *H02J 7/007192* (2020.01); *H02J 50/60* (2016.02)

(58) Field of Classification Search
CPC ....................................................... H02J 50/60
(Continued)

(56) References Cited

U.S. PATENT DOCUMENTS 8,854,216 B2  10/2014  Uchida
9,831,688 B2  11/2017  Nakano et al.
(Continued)

FOREIGN PATENT DOCUMENTS

EP  2592762 A1      3/2012
EP  2592762 A1 *   5/2013  ............. H01F 38/14
(Continued)

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

A wireless charging method in a wireless power transmitter, the method including sensing an object in a charging region, measuring a quality factor value, receiving information including a reference quality factor value, detecting a foreign object using the measured quality factor value and the reference quality factor value, and transmitting a response signal that includes ACK information or NAK information depending on whether or not the foreign object is detected. Further, the wireless power transmitter transmits information including a first guaranteed power value when the response signal includes the ACK information, and transmits information including a second guaranteed power value when the response signal includes the NAK information, and the first guaranteed power value is greater than the second guaranteed power value.

20 Claims, 26 Drawing Sheets

(58) Field of Classification Search
USPC ........................................................ 320/108
See application file for complete search history.

(56) References Cited

U.S. PATENT DOCUMENTS

| | | | |
|---|---|---|---|
| 10,020,692 B2 | 7/2018 | Asanuma et al. | |
| 10,164,482 B2 | 12/2018 | Park et al. | |
| 10,177,592 B2 | 1/2019 | Park et al. | |
| 10,381,879 B2 | 8/2019 | Park | |
| 10,804,729 B2 | 10/2020 | Park et al. | |
| 2011/0012793 A1 | 1/2011 | Amm et al. | |
| 2012/0049791 A1 | 3/2012 | Tanabe | |
| 2012/0119914 A1 | 5/2012 | Uchida | |
| 2013/0062959 A1 | 3/2013 | Lee et al. | |
| 2013/0099592 A1 | 4/2013 | Abe | |
| 2014/0049422 A1 | 2/2014 | Von Novak et al. | |
| 2014/0266036 A1 | 9/2014 | Jung et al. | |
| 2014/0285145 A1 | 9/2014 | Patro et al. | |
| 2016/0149442 A1 | 5/2016 | Asanuma et al. | |
| 2016/0164302 A1 | 6/2016 | Nakano et al. | |
| 2016/0241086 A1 | 8/2016 | Jung et al. | |
| 2017/0018977 A1* | 1/2017 | Van Wageningen | H02J 50/60 |
| 2017/0047786 A1 | 2/2017 | Park et al. | |
| 2018/0115197 A1* | 4/2018 | Li | H02J 50/60 |
| 2018/0358841 A1 | 12/2018 | Park | |
| 2019/0097450 A1 | 3/2019 | Park et al. | |
| 2019/0131826 A1 | 5/2019 | Park et al. | |

FOREIGN PATENT DOCUMENTS

| | | | | |
|---|---|---|---|---|
| JP | WO2011/010375 A1 | 1/2011 | | |
| JP | 2012-55045 A | 3/2012 | | |
| JP | 2015-46990 A | 3/2015 | | |
| JP | 2015-154159 A | 8/2015 | | |
| JP | 2017-511111 A | 4/2017 | | |
| KR | 10-2011-0051727 A | 5/2011 | | |
| KR | 10-1213649 B1 | 12/2012 | | |
| KR | 10-2013-0133853 A | 12/2013 | | |
| KR | 10-2014-0076626 A | 6/2014 | | |
| KR | 10-2014-0113147 A | 9/2014 | | |
| KR | 10-2015-0003408 A | 1/2015 | | |
| KR | 10-2015-0046108 A | 4/2015 | | |
| KR | 10-2015-0059069 A | 5/2015 | | |
| KR | 10-2015-0063933 A | 6/2015 | | |
| KR | 10-2016-0136461 A | 11/2016 | | |
| KR | 10-2017-0107155 A | 9/2017 | | |
| KR | 10-2017-0118571 A | 10/2017 | | |
| WO | WO 2015/129143 A1 | 9/2015 | | |
| WO | WO 2015/132818 A1 | 9/2015 | | |
| WO | WO-2015129143 A1 * | 9/2015 | | H02J 17/00 |
| WO | WO 2017/034143 A1 | 3/2017 | | |
| WO | WO 2017/179826 A1 | 10/2017 | | |

* cited by examiner

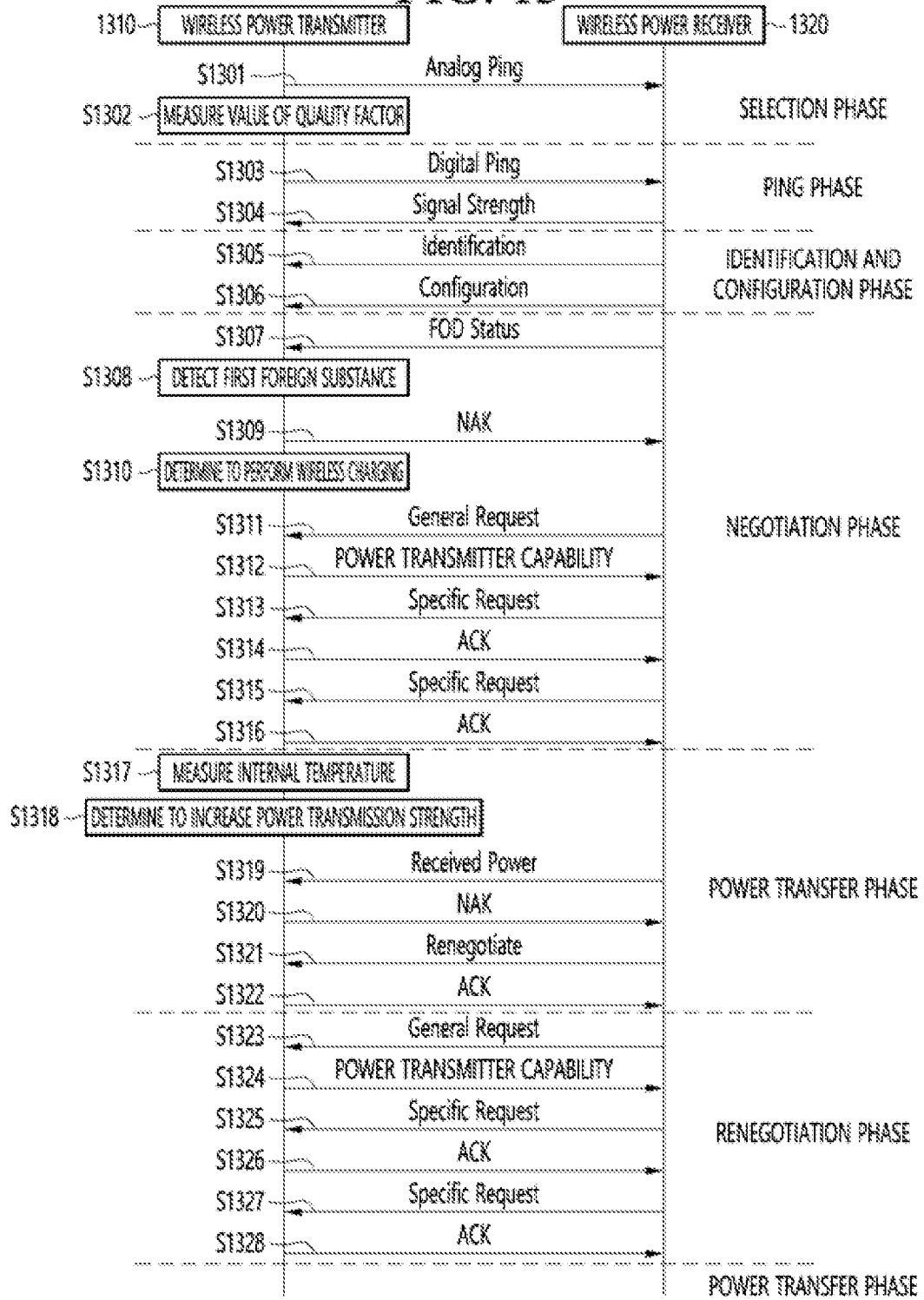

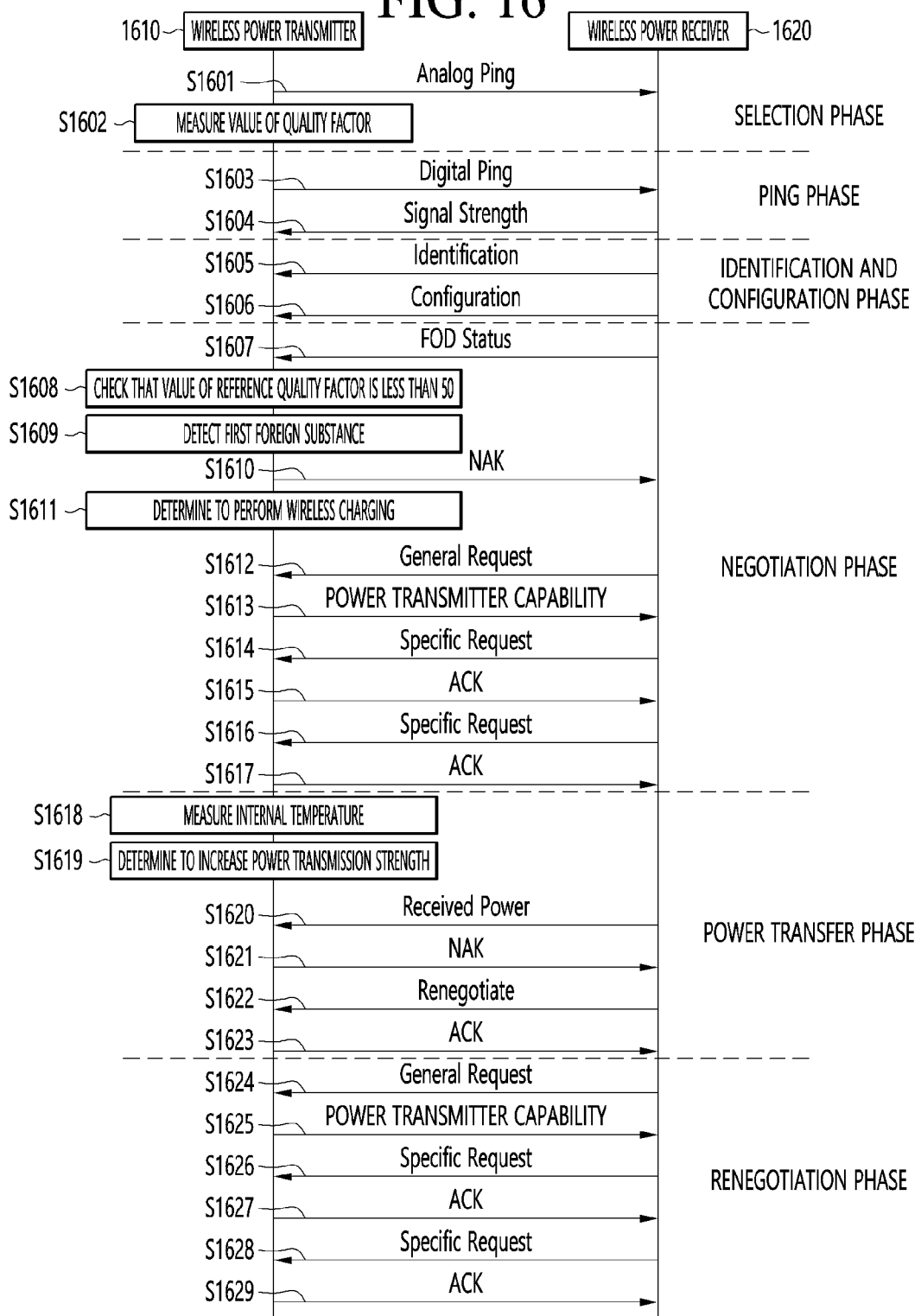

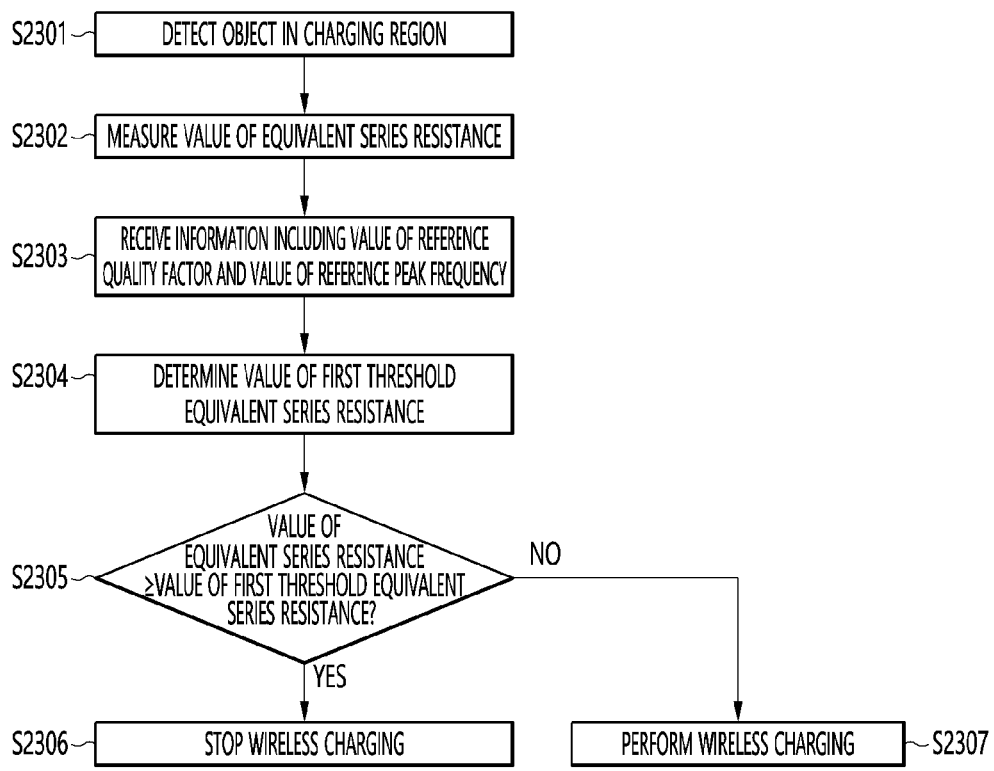
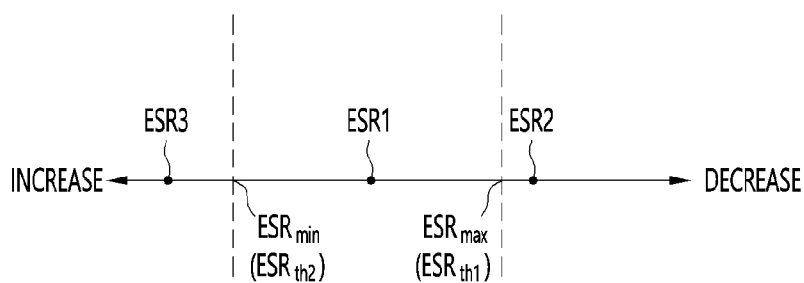

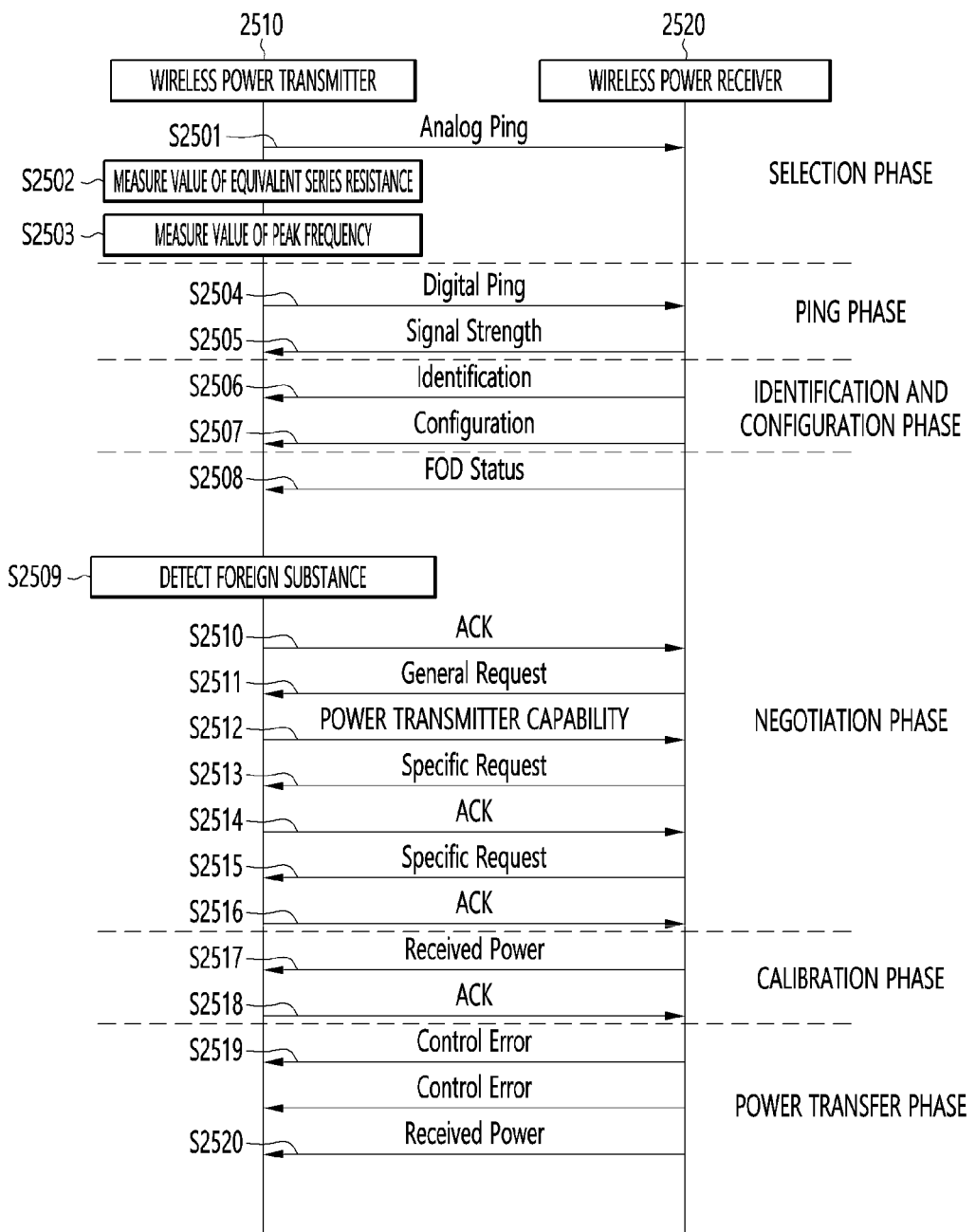

WIRELESS CHARGING METHOD AND APPARATUS THEREFOR

CROSS REFERENCE TO RELATED APPLICATIONS

This application is Continuation of application Ser. No. 16/761,199 filed on May 1, 2020 (now U.S. Pat. No. 11,437,849 issued on Sep. 6, 2022), which is the National Phase of PCT/KR2018/013258 filed on Nov. 2, 2018, which claims priority under 35 U.S.C. § 119(a) to Patent Application No. 10-2017-0145585 and 10-2017-0148699 filed in the Republic of Korea on Nov. 2, 2017, and Nov. 9, 2017, respectively, all of which are hereby expressly incorporated by reference into the present application.

TECHNICAL FIELD

The present invention relates to a wireless power transmission technology, and more particularly, to a wireless charging method and apparatus therefor.

BACKGROUND ART

A mobile phone, a notebook computer, and similar portable terminals include a battery for storing electric power and a circuit for charging and discharging the battery. To charge a battery of such a terminal, electric power has to be received from an external charger.

In general, as an example of a type of electrical connection between a charging apparatus for charging the battery with electric power and the battery, there is a terminal supply type in which commercial power is received, converted to have voltage and current corresponding to the battery, and supplied as electric energy to the battery through terminals of the battery. Such a terminal supply type involves use of a physical cable or electric wire. Therefore, when many pieces of equipment of the terminal supply type are used, numerous cables occupy a considerable amount of workspace, are difficult to organize, and create a poor appearance. Further, the terminal supplying type may cause problems of instantaneous discharge due to different electric potential differences between the terminals, combustion and fire due to foreign objects, natural discharge, deterioration in the lifespan and performance of the battery, etc.

To solve these problems, there have recently been proposed a charging system and control methods thereof involving a method of wirelessly transmitting electric power (hereinafter referred to as a "wireless charging system"). Further, up through now, wireless charging systems have not been a basic part of some portable terminals, and a consumer has had to separately purchase wireless charging receiver accessories, thereby resulting in lower demands for wireless charging systems. However, it is expected that wireless charging users will rapidly increase and a terminal manufacturer will provide wireless charging as a basic feature in the future.

In general, the wireless charging system includes a wireless power transmitter transfer for supplying electric energy in a wireless power transmission manner, and a wireless power receiver for receiving the electric energy from the wireless power transmitter and charging the battery.

Such a wireless charging system may employ at least one wireless power transmission manner (for example, an electromagnetic induction manner, an electromagnetic resonance manner, radio frequency (RF) wireless power transmission manner, etc.) to transmit the electric power.

As an example, the wireless power transmission manner may use various wireless power transmission standards based on the electromagnetic induction manner employing the principle of electromagnetic induction, in which an electromagnetic field is generated in an electric power transmitter coil and electricity is induced in a receiver coil by the electromagnetic field. Herein, the wireless power transmission standards of the electromagnetic induction manner may include a wireless charging technology of the electromagnetic induction manner defined in the Wireless Power Consortium (WPC) or/and Power Matters Alliance (PMA).

As another example, the wireless power transmission manner may use the electromagnetic resonance manner, in which an electromagnetic field generated by a transfer coil of the wireless power transmitter resonates with a certain resonance frequency so that electric power may be transmitted to a wireless power receiver located nearby. Herein, the electromagnetic resonance manner may include the wireless charging technology of the resonance manner defined in the Air Fuel Alliance (formerly A4WP, Alliance for Wireless Power) standard organization, i.e. wireless charging technology standard organization.

As still another example, the wireless power transmission manner may use the RF wireless power transmission manner, in which energy of low electric power is embedded in an RF signal to transmit the electric power to a wireless power receiver located at a distance.

Meanwhile, in the wireless charging system, when a foreign object absorbing a magnetic field such as a metal is present between a wireless power transmitter and a wireless power receiver, a problem of a heat generation phenomenon, a decrease in charging efficiency, and an increase in power consumption occur, and thus an accurate foreign object detection method is required.

SUMMARY

The present invention has been devised to solve problems of the related art described above, and an object of the present invention is to provide a wireless charging method and an apparatus and system therefor.

In addition, another object of the present invention is to provide a wireless charging method for determining the foreign object accurately, and an apparatus and system therefor.

In addition, still another object of the present invention is to provide a wireless charging method solving a problem that wireless charging is not performed by erroneously recognizing that a foreign object is present in the related art, and an apparatus and system therefor.

Technical problems to be solved in the present invention are not limited to the above-mentioned technical problems, and other technical problems not mentioned will be clearly understood by a person having ordinary skill in the art, to which the present invention pertains, from the following descriptions.

In order to solve the above technical problems, a wireless charging method according to an embodiment, in a wireless charging method in a wireless power transmitter configured to wirelessly transmit power to a wireless power receiver, includes: sensing an object in a charging region; measuring a quality factor value; receiving information including a reference quality factor value; detecting a foreign object using the measured quality factor value and the reference quality factor value; and transmitting information including a first guaranteed power value when the foreign object is not detected, and transmitting information including a second guaranteed power value when the foreign object is detected, wherein the first guaranteed power value may be greater than the second guaranteed power value.

In addition, the wireless charging method according to the embodiment may include measuring an internal temperature of the wireless power transmitter, and when the sensed temperature is less than a preset temperature for a preset period and the foreign object is detected, may further include transmitting guaranteed power having a third guaranteed power value, wherein the third guaranteed power value may be greater than the second guaranteed power value.

In addition, in the wireless charging method according to the embodiment, the second guaranteed power value may be a minimum guaranteed power of the wireless power transmitter.

In addition, in the wireless charging method according to the embodiment, the detecting of the foreign object may include determining a threshold quality factor value using the reference quality factor value, and determining that the foreign object is not detected when the measured quality factor value is greater than or equal to the threshold quality factor value, and determining that the foreign object is detected when the measured quality factor value is less than the threshold quality factor value.

In addition, in the wireless charging method according to the embodiment, the threshold quality factor value may be a value that is reduced by 10% from the reference quality factor value.

In addition, the wireless charging method according to the embodiment may further include determining whether to perform wireless charging when the foreign object is detected, and when it is determined to perform the wireless charging, information including a second guaranteed power value may be transmitted, and when it is determined not to perform the wireless charging, the wireless charging may be stopped.

In addition, in the wireless charging method according to the embodiment, the determining of whether to perform the wireless charging when the foreign object is detected may include determining an acceptable quality factor value using the threshold quality factor value, determining to perform the wireless charging when the measured quality factor value is greater than or equal to the acceptable quality factor value, and determining not to perform the wireless charging when the measured quality factor value is less than the acceptable quality factor value.

In addition, in the wireless charging method according to the embodiment, the acceptable quality factor value may be a value that is reduced by 20% from the threshold quality factor value.

In addition, in the wireless charging method according to the embodiment, when the sensed temperature is less than a preset temperature for a preset period, the transmitting of guaranteed power having the third guaranteed power value may be performed in a renegotiation phase.

In addition, in the wireless charging method according to the embodiment, when the foreign object is not detected and the information including the first guaranteed power value is transmitted, a calibration phase may be performed before transitioning to a power transfer phase, and when the foreign object is detected and the information including the second guaranteed power value is transmitted, it may transition to the power transfer phase without performing the calibration phase.

A wireless charging method according to an embodiment, in a wireless charging method in a wireless power transmitter configured to wirelessly transmit power to a wireless power receiver, includes: sensing an object in a charging region; measuring a quality factor value; receiving information including a reference quality factor value; determining whether the reference quality factor value is less than 50; performing first foreign object detection using the measured quality factor value and the reference quality factor value when the reference quality factor value is less than 50, and performing second foreign object detection using the measured quality factor value and the reference quality factor value when the reference quality factor value is greater than or equal to 50; and transmitting information including a first guaranteed power value when the foreign object is not detected by performing the first foreign object detection, transmitting information including a second guaranteed power value when the foreign object is detected by performing the first foreign object detection, transmitting the information including the first guaranteed power value when the foreign object is not detected by performing the second foreign object detection, and stopping wireless charging when the foreign object is detected by performing the second foreign object detection, wherein the first guaranteed power value may be greater than the second guaranteed power value.

In addition, the wireless charging method according to the embodiment may include measuring an internal temperature of the wireless power transmitter, and when the sensed temperature is less than a preset temperature for a preset period and the foreign object is detected by performing the first foreign object detection, may further include transmitting guaranteed power having a third guaranteed power value, wherein the third guaranteed power value may be greater than the second guaranteed power value.

A wireless charging apparatus according to an embodiment includes: one or more transmission coils; a power converter configured to convert the intensity of DC power applied from the outside; a communication unit configured to exchange information with an external device; a sensor configured to measure a quality factor value; and a controller configured to receive information including a reference quality factor value through the communication unit and perform foreign object detection, wherein the controller may detect a foreign object using the measured quality factor value and the reference quality factor value, transmit information including a first guaranteed power value when the foreign object is not detected, and transmit information including a second guaranteed power value when the foreign object is detected, and the first guaranteed power value may be greater than the second guaranteed power value.

In addition, in the wireless charging apparatus according to the embodiment, the sensor may measure an internal temperature of the wireless power transmitter, the controller may transmit guaranteed power having a third guaranteed power value when the sensed temperature is less than a preset temperature for a preset period and the foreign object is detected, and the third guaranteed power value may be greater than the second guaranteed power value.

In addition, in the wireless charging apparatus according to the embodiment, the second guaranteed power value may be a minimum guaranteed power of the wireless power transmitter.

In addition, in the wireless charging apparatus according to the embodiment, in the foreign object detection, the controller may determine a threshold quality factor value using the reference quality factor value, determine that the foreign object is not detected when the measured quality factor value is greater than or equal to the threshold quality factor value, and determine that the foreign object is detected when the measured quality factor value is less than the threshold quality factor value.

In addition, in the wireless charging apparatus according to the embodiment, the threshold quality factor value may be a value that is reduced by 10% from the reference quality factor value.

In addition, in the wireless charging apparatus according to the embodiment, the controller may determine whether to perform wireless charging when the foreign object is detected, when it is determined to perform the wireless charging, information including the second guaranteed power value may be transmitted, and when it is determined not to perform the wireless charging, the wireless charging may be stopped.

In addition, in the wireless charging apparatus according to the embodiment, in the determining of whether to perform the wireless charging when the foreign object is detected, the controller may determine an acceptable quality factor value using the threshold quality factor value, determine to perform the wireless charging when the measured quality factor value is greater than or equal to the acceptable quality factor value, and determine not to perform the wireless charging when the measured quality factor value is less than the acceptable quality factor value.

In addition, in the wireless charging apparatus according to the embodiment, the acceptable quality factor value may be a value that is reduced by 20% from the threshold quality factor value.

In addition, in the wireless charging apparatus according to the embodiment, when the sensed temperature is less than a preset temperature for a preset period, the transmitting of guaranteed power having the third guaranteed power value may be performed in a renegotiation phase.

In addition, in the wireless charging apparatus according to the embodiment, when the foreign object is not detected and the information including the first guaranteed power value is transmitted, the controller may perform a calibration phase before transitioning to a power transfer phase, and when the foreign object is detected and the information including the second guaranteed power value is transmitted, it may transition to the power transfer phase without performing the calibration phase.

A wireless charging apparatus according to an embodiment includes: one or more transmission coils; a power converter configured to convert the intensity of DC power applied from the outside; a communication unit configured to exchange information with an external device; a sensor configured to measure a quality factor value; and a controller configured to receive information including a reference quality factor value through the communication unit and determine whether the reference quality factor value is less than 50, wherein the controller may perform first foreign object detection using the measured quality factor value and the reference quality factor value when the reference quality factor value is less than 50, and may perform second foreign object detection using the measured quality factor value and the reference quality factor value when the reference quality factor value is greater than or equal to 50, and the controller may transmit information including a first guaranteed power value when the foreign object is not detected and transmit information including a second guaranteed power value when the foreign object is detected by performing the first foreign object detection, transmit the information including the first guaranteed power value when the foreign object is not detected and stop wireless charging when the foreign object is detected by performing the second foreign object detection, and the first guaranteed power value may be greater than the second guaranteed power value.

In addition, in the wireless charging apparatus according to the embodiment, the sensor may measure an internal temperature of the wireless power transmitter, the controller may transmit guaranteed power including a third guaranteed power value when the sensed temperature is less than a preset temperature for a preset period and the foreign object is detected by performing the first foreign object detection, and the third guaranteed power value may be greater than the second guaranteed power value.

A wireless charging method according to an embodiment, in a wireless charging method in a wireless power transmitter configured to wirelessly transmit power to a wireless power receiver, includes: measuring a quality factor value prior to a ping phase; receiving a foreign object detection (FOD) status packet including a reference quality factor value in a negotiation phase; determining a threshold quality factor value using the reference quality factor value; determining an acceptable quality factor value using the threshold quality factor value; and detecting a first foreign object based on the measured quality factor value and the acceptable quality factor value.

In addition, in the wireless charging method according to the embodiment, the threshold quality factor value may be a value that is reduced by 10% from the reference quality factor value, and the acceptable quality factor value may be a value that is reduced by 20% from the threshold quality factor value.

In addition, in the wireless charging method according to the embodiment, the detecting of the first foreign object may determine whether the measured quality factor value is greater than or equal to the acceptable quality factor value.

In addition, the wireless charging method according to the embodiment may further include transmitting an ACK for performing wireless charging when the measured quality factor value is greater than or equal to the acceptable quality factor value.

In addition, the wireless charging method according to the embodiment may further include determining whether the measured quality factor value is greater than or equal to the threshold quality factor value, and after transition to the calibration phase, performing calibration when the measured quality factor value is greater than or equal to the threshold quality factor value and not performing the calibration when the measured quality factor value is less than the threshold quality factor value.

In addition, the wireless charging method according to the embodiment may further include performing second foreign object detection after transition to a power transfer phase.

In addition, in the wireless charging method according to the embodiment, in the second foreign object detection, when a power loss value, which is determined based on a reception power value and a transmission power value, exceeds a predetermined threshold power loss value, it may be determined that a foreign object is present.

In addition, in the wireless charging method according to the embodiment, in the second foreign object detection, when a measured internal temperature value exceeds a predetermined threshold temperature value, it may be determined that the foreign object is present.

In addition, in the wireless charging method according to the embodiment, the FOD status packet may further include a reference peak frequency value, and the wireless charging method may further include measuring a frequency value before the ping phase, determining a threshold frequency value using the reference peak frequency value in the negotiation phase, and determining an acceptable frequency value using the threshold frequency value, wherein the detecting of the first foreign object may be performed based on the measured frequency value and the acceptable frequency value.

In addition, in the wireless charging method according to the embodiment, the threshold frequency value may be a value that is increased by 10% from the reference peak frequency value, and the acceptable frequency value may be a value that is increased by 20% from the threshold frequency value.

In addition, in the wireless charging method according to the embodiment, the detecting of the first foreign object may determine whether the measured frequency value is less than or equal to the acceptable frequency value.

The wireless charging method according to the embodiment may further include transmitting an ACK signal for performing wireless charging when the measured frequency value is less than or equal to the acceptable frequency value.

In addition, the wireless charging method according to the embodiment may further include determining whether the measured frequency value is less than or equal to the threshold frequency value, and after transition to the calibration phase, performing calibration when the measured frequency value is less than or equal to the threshold frequency value and not performing the calibration when the measured frequency value exceeds the threshold frequency value.

In addition, in the wireless charging method according to the embodiment, the FOD status packet may further include a reference peak frequency value, and the wireless charging method may further include measuring an equivalent series resistance value before the ping phase, determining a threshold equivalent series resistance value using the reference quality factor value and the reference peak frequency value in the negotiation phase, and determining an acceptable equivalent series resistance value using the threshold equivalent series resistance value, wherein the detecting of the first foreign object may be performed based on the measured equivalent series resistance value and the acceptable equivalent series resistance value.

In addition, in the wireless charging method according to the embodiment, the threshold equivalent series resistance value may be a value that is increased by 10% from the reference equivalent series resistance value, and the acceptable equivalent series resistance value may be a value that is increased by 20% from the threshold equivalent series resistance value.

In addition, in the wireless charging method according to the embodiment, the detecting of the first foreign object may determine whether the measured equivalent series resistance value is less than or equal to the acceptable equivalent series resistance value.

In addition, the wireless charging method according to the embodiment may further include transmitting an ACK for performing wireless charging when the measured equivalent series resistance value is less than or equal to the acceptable equivalent series resistance value.

In addition, the wireless charging method according to the embodiment may further include determining whether the measured equivalent series resistance value is less than or equal to the threshold equivalent series resistance value, and after transition to the calibration phase, performing calibration when the measured equivalent series resistance value is less than or equal to the threshold equivalent series resistance value and not performing the calibration when the measured equivalent series resistance value exceeds the threshold equivalent series resistance value.

A wireless charging apparatus according to an embodiment includes: one or more transmission coils; a power converter configured to convert the intensity of DC power applied from the outside; a communication unit configured to exchange information with an external device; a sensor configured to measure a quality factor value; and a controller configured to receive an FOD status packet including a reference quality factor value through the communication unit and perform first foreign object detection, wherein the controller may determine a threshold quality factor value using the reference quality factor value and determine an acceptable quality factor value using the threshold quality factor value, and the first foreign object detection may be performed based on the measured quality factor value and the acceptable quality factor value.

In addition, in the wireless charging apparatus according to the embodiment, the threshold quality factor value may be a value that is reduced by 10% from the reference quality factor value, and the acceptable quality factor value may be a value that is reduced by 20% from the threshold quality factor value.

In addition, in the wireless charging apparatus according to the embodiment, in the first foreign object detection, the controller may determine whether the measured quality factor value is greater than or equal to the acceptable quality factor value.

In addition, in the wireless charging apparatus according to the embodiment, the controller may transmit an ACK for performing wireless charging when the measured quality factor value is greater than or equal to the acceptable quality factor value.

In addition, in the wireless charging apparatus according to the embodiment, after transition to a calibration phase, the controller may perform calibration when the measured quality factor value is greater than or equal to the threshold quality factor value and may not perform the calibration when the measured quality factor value is less than the threshold quality factor value.

In addition, in the wireless charging apparatus according to the embodiment, after transition to a power transfer phase, the controller may perform second foreign object detection.

In addition, in the wireless charging apparatus according to the embodiment, in the second foreign object detection, when a power loss value, which is determined based on a received power value and a transmission power value, exceeds a predetermined threshold power loss value, the controller may determine that a foreign object is present.

In addition, in the wireless charging apparatus according to the embodiment, in the second foreign object detection, when a measured internal temperature value exceeds a predetermined threshold temperature value, the controller may determine that the foreign object is present.

In addition, the wireless charging apparatus according to the embodiment, the FOD status packet may further include a reference peak frequency value, the sensor may measure a frequency value, the controller may determine a threshold frequency value using the reference peak frequency value and determine an acceptable frequency value using the threshold frequency value, and the first foreign object detection may be performed based on the measured frequency value and the acceptable frequency value.

In addition, in the wireless charging apparatus according to the embodiment, the threshold frequency value may be a value that is increased by 10% from the reference peak frequency value, and the acceptable frequency value may be a value that is increased by 20% from the threshold frequency value.

In addition, in the wireless charging apparatus according to the embodiment, in the first foreign object detection, the controller may determine whether the measured frequency value is less than or equal to the acceptable frequency value.

In addition, in the wireless charging apparatus according to the embodiment, the controller may transmit an ACK signal for performing wireless charging when the measured frequency value is less than or equal to the acceptable frequency value.

In addition, in the wireless charging apparatus according to the embodiment, after transition to the calibration phase, the controller may perform calibration when the measured frequency value is less than or equal to the threshold frequency value and may not perform the calibration when the measured frequency value exceeds the threshold frequency value.

In addition, the wireless charging apparatus according to the embodiment, the FOD status packet may further include a reference peak frequency value, the sensor may measure an equivalent series resistance value, the controller may determine a threshold equivalent series resistance value using the reference quality factor value and the reference peak frequency value in a negotiation phase and determine an acceptable equivalent series resistance value using the threshold equivalent series resistance value, and the first foreign object detection may be performed based on the measured equivalent series resistance value and the acceptable equivalent series resistance value.

In addition, in the wireless charging apparatus according to the embodiment, the threshold equivalent series resistance value may be a value that is increased by 10% from the reference equivalent series resistance value, and the acceptable equivalent series resistance value may be a value that is increased by 20% from the threshold equivalent series resistance value.

In addition, in the wireless charging apparatus according to the embodiment, in the first foreign object detection, the controller may determine whether the measured equivalent series resistance value is less than or equal to the acceptable equivalent series resistance value.

In addition, in the wireless charging apparatus according to the embodiment, the controller may transmit an ACK for performing wireless charging when the measured equivalent series resistance value is less than or equal to the acceptable equivalent series resistance value.

In addition, in the wireless charging apparatus according to the embodiment, after transition to the calibration phase, the controller may perform calibration when the measured equivalent series resistance value is less than or equal to the threshold equivalent series resistance value and may not perform the calibration when the measured equivalent series resistance value exceeds the threshold equivalent series resistance value.

In addition, in order to solve the above technical problems, a wireless charging method according to an embodiment, in a wireless charging method in a wireless power transmitter configured to wirelessly transmit power to a wireless power receiver, includes: sensing an object in a charging region; measuring an equivalent series resistance value and a peak frequency value; receiving information including a reference quality factor value and a reference peak frequency value; determining a first threshold equivalent series resistance value and a threshold peak frequency value; and detecting a foreign object using the measured equivalent series resistance value, the measured peak frequency value, the first threshold equivalent series resistance value, and the threshold peak frequency value, wherein when the measured equivalent series resistance value is greater than or equal to the first threshold equivalent series resistance value and the measured peak frequency value is greater than or equal to the threshold peak frequency value, the wireless power transmitter may determine that a foreign object is present and stop transmitting power.

In addition, in the wireless charging method according to the embodiment, the determining of the first threshold equivalent series resistance value may include determining a reference equivalent series resistance value using the reference quality factor value and the reference peak frequency value, and determining a value reduced by a predetermined ratio from the reference equivalent series resistance value as the first threshold equivalent series resistance value.

In addition, in the wireless charging method according to the embodiment, the threshold peak frequency value may be greater than the reference peak frequency value.

In addition, in the wireless charging method according to the embodiment, when the measured peak frequency value is greater than or equal to the threshold peak frequency value and the measured equivalent series resistance value is less than or equal to the first threshold equivalent series resistance value, information indicating that the foreign object is not detected may be transmitted to the wireless power receiver.

A wireless charging apparatus according to an embodiment including: an inverter configured to convert DC power into AC power; a resonance circuit including a resonance capacitor and a transmission coil and to which the AC power is applied; a communication unit configured to demodulate an in-band signal modulated in the wireless power receiver; a sensor configured to measure a voltage of the resonance circuit; and a controller, wherein the controller may detect an object in a charging region, may determine a quality factor value and a peak frequency value based on the voltage measured by the sensor, may receive information including a reference quality factor value and a reference peak frequency value through the communication unit, may determine a first threshold equivalent series resistance value and a threshold peak frequency value, and may be set to detect a foreign object using the measured equivalent series resistance value, the measured peak frequency value, the first threshold equivalent series resistance value, and the threshold peak frequency value, and the wireless power transmitter may determine that the foreign object is present and stop transmitting power when the measured equivalent series resistance value is greater than or equal to the first threshold equivalent series resistance value and the measured peak frequency value is greater than or equal to the threshold peak frequency value.

In addition, in the wireless charging apparatus according to the embodiment, the first threshold equivalent series resistance value may be determined based on the reference quality factor value and the reference peak frequency value.

Advantageous Effects

Effects of a wireless charging method and an apparatus and system therefor according to the present invention will be described as follows.

The present invention may provide a wireless charging method and an apparatus and system therefor.

In addition, the present invention may determine a foreign object accurately.

In addition, the present invention may accurately determine a foreign object to prevent a heat generation phenomenon, a decrease in charging efficiency, and a loss of power consumption.

In addition, the present invention may solve a problem that wireless charging is not performed by erroneously recognizing that a foreign object is present in the related art.

In addition, the present invention may solve a problem in which wireless charging is not performed unnecessarily by determining to distinguish that a charging distance between a wireless power transmitter and a wireless power receiver is increased and presence of a foreign object.

BRIEF DESCRIPTION OF THE DRAWINGS

The accompanying drawings are to help understanding of the present invention, and provide embodiments of the present invention in conjunction with the detailed description. However, the technical features of the present invention are not limited to specific drawings, and features disclosed in the drawings may combine with each other to form a new embodiment.

FIG. 13 is a view for describing a wireless charging method on a wireless charging system according to still another embodiment.

FIG. 16 is a view for describing a wireless charging method on a wireless charging system according to still another embodiment.

FIG. 23 is a view for describing a wireless charging method in a wireless power transmitter according to another embodiment of FIG. 22.

FIG. 24 is a view for describing a foreign object detection method according to an equivalent series resistance value.

FIG. 25 is a view for describing a wireless charging method on a wireless charging system according to still another embodiment.

DETAILED DESCRIPTION OF THE EMBODIMENTS

Figure 1:
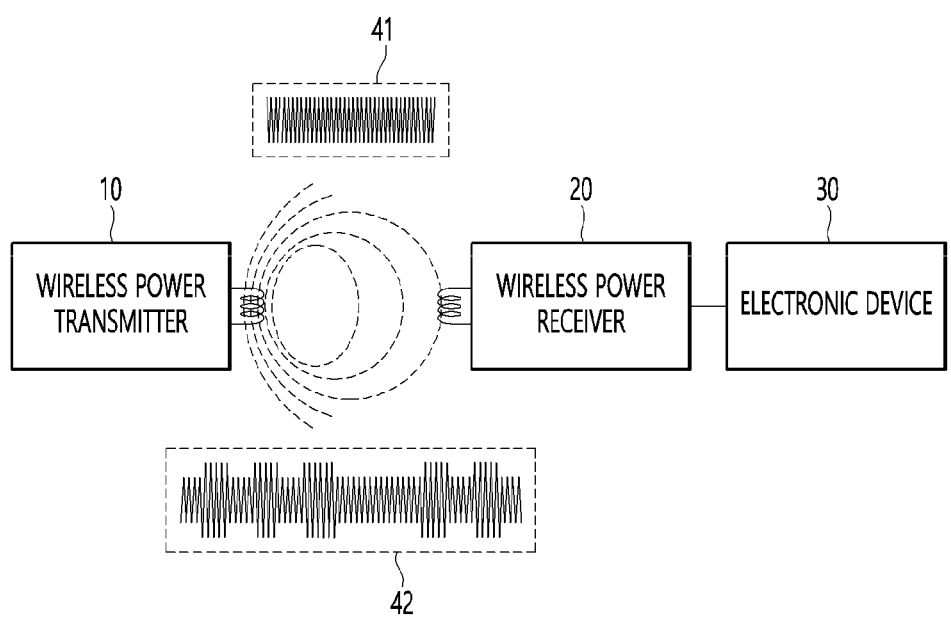
FIG. 1 is a block diagram for describing a wireless charging system according to one embodiment.

Hereinafter, apparatus and various methods according to embodiments will be described in detail with reference to the accompanying drawings. Suffixes "module" and "part" for elements used in the following descriptions are given or used just for convenience in writing the specification, and do not have meanings or roles distinguishable between them.

Although all elements described in above embodiments are combined into one or operate as they are combined, the present disclosure is not limited to the embodiments. In other words, one or more elements among all of them may be selectively combined and operate without departing from the scope of the present disclosure. Further, all the elements may be respectively materialized as single independent hardware components, but some or all of them may be selectively combined and materialized as a computer program having a program module to perform some or all functions combined in a single or plural hardware components. Codes and code segments of the computer program may be easily conceived by a person having an ordinary skill in the art. Such a computer program may be stored in computer readable media, and read and executed by a computer, thereby materializing the embodiments. The medium for storing the computer program may include a magnetic recording medium, an optical recording medium, a carrier wave medium, etc.

In describing the embodiments, when elements are described with terms "above (up) or below (down)", "front (head) or back (rear)", the terms "above (up) or below (down)", "front (head) or back (rear)" may refer to meanings of direct contact between two elements or one or more elements interposed between the two elements.

Further, it will be understood that the term "include", "comprise" or "have", etc. used as above means a presence of an element unless otherwise stated, and does not preclude the presence or addition of one or more other elements. Unless otherwise defined, all terms including technical and scientific terms used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Further, elements of the present disclosure may be described with terms first, second, A, B, (a), (b), etc. These terms are only used to distinguish one element from another, and do not limit the element's own meaning, sequence, order, etc. It will be understood that when an element is referred to as being "connected", "combined" or "coupled" to another element, it may be directly connected or coupled to the other element or intervening elements may be "connected", "combined" or "coupled" between the elements.

Further, in the present disclosure, detailed descriptions of the related well-known art may be omitted when the well-known art is obvious to those skilled in the art and may cloud the gist of the present disclosure.

In describing embodiments, an apparatus for wirelessly transmitting electric power in a wireless power charging system may be also called a wireless power transmitter, a wireless power transmission apparatus, a transmitting terminal, a transmitter, a transmitting apparatus, a transmitting side, a wireless power transmitting apparatus, a wireless power transmitter, a wireless charging apparatus, or the like for convenience of description. Further, an apparatus for wirelessly receiving electric power from the wireless power sending apparatus may be also called a wireless power receiving apparatus, a wireless power receiver, a receiving terminal, a receiving side, a receiving apparatus, a receiver terminal, or the like for convenience of description.

The wireless charging apparatus according to an embodiment may be provided as a pad type, a support type, an access point (AP) type, a small base station type, a stand type, a ceiling embedded type, a wall mount type, etc. and one transmitter may transmit electric power to a plurality of wireless power receiving apparatuses.

As an example, the wireless power transmitter may be typically used when put on a desk or table and also used in a vehicle when developed for a vehicle. The wireless power transmitter installed in the vehicle may be provided as a support type to be conveniently and stably held and supported.

A terminal according to an embodiment may be used for a small electronic device such as a mobile phone, a smart phone, a notebook computer (or a laptop computer), a digital broadcasting terminal, a personal digital assistant (PDA), a portable multimedia player (PMP), a global positioning system (GPS), an MP3 player, an electric toothbrush, an electronic tag, an illumination system, a remote controller, a fishing float, or the like, but not limited thereto. Alternatively, the terminal may include any mobile device (hereinafter referred to as a "device") provided with a wireless power receiving means according to an embodiment and capable of battery charging, and the terms "terminal" and "device" may both be used. According to another embodiment, the wireless power receiver may be mounted to a vehicle, an unmanned aircraft, an air drone, etc.

According to an embodiment, the wireless power receiver may employ at least one wireless power transmission manner, and may simultaneously receive wireless power from two or more wireless power transmitters. Herein, the wireless power transmission manner may include at least one among an electromagnetic induction manner, an electromagnetic resonance manner, and an RF wireless power transmission manner. In general, the wireless power transmitter and the wireless power receiver of the wireless power system may exchange a control signal or information through in-band communication or Bluetooth low energy (BLE) communication. Herein, in-band communication and BLE communication may be performed by a pulse width modulation (PWM) method, a frequency modulation (FM) method, a phase modulation (PM) method, an amplitude modulation (AM) method, an AM-PM method, etc. For example, the wireless power receiver generates a feedback signal by applying a predetermined on/off switching pattern to an electric current induced through a receiving coil and thus transmits various control signals and information to the wireless power transmitter. The information received from the wireless power receiver may include various pieces of information such as a level of received power. In this case, the wireless power transmitter may calculate a charging efficiency or a power transmission efficiency based on information about the level of the received power.

FIG. 1 is a block diagram for describing a wireless charging system according to one embodiment.

Referring to FIG. 1, the wireless charging system may generally include a wireless power transmitter 10 for wirelessly transmitting power, a wireless power receiver 20 for receiving the transmitted power, and an electronic device 30 to which the received power is supplied.

As an example, the wireless power transmitter 10 and the wireless power receiver 20 may perform in-band communication to exchange information through the same frequency band as an operation frequency used in wirelessly transmitting power. Alternatively, the wireless power transmitter 10 and the wireless power receiver 20 may perform out-of-band communication to exchange information through a separate frequency band different from the operation frequency used in wirelessly transmitting the wireless power.

As an example, the information exchanged between the wireless power transmitter 10 and the wireless power receiver 20 may include not only their state information but also control information. Herein, the state information and the control information exchanged in between the transmitting/receiving terminals will become apparent through descriptions of the following embodiments.

In-band communication and out-of-band communication may provide bidirectional communication, but the embodiment is not limited thereto. According to another embodiment, in-band communication and out-of-band communication may provide unidirectional communication or half-duplex communication.

As an example, unidirectional communication may mean that the wireless power receiver 20 transmits information only to the wireless power transmitter 10, but the embodiment is not limited thereto. Alternatively, the wireless power transmitter 10 may transmit information to the wireless power receiver 20.

The half-duplex communication allows bidirectional communication between the wireless power receiver 20 and the wireless power transmitter 10, but allows only one of them to transmit information at a time.

According to an embodiment, the wireless power receiver 20 may obtain various pieces of state information of the electronic device 30. As an example, the state information of the electronic device 30 may include information about an amount of currently used power, information for identifying running applications, information about usage of a central processing unit (CPU), information about a battery charging state, information about battery output voltage/current, etc., but the embodiment is not limited thereto. Alternatively, the state information may include any information that may be obtained from the electronic device 30 and may be usable for wireless power control.

Figure 2:
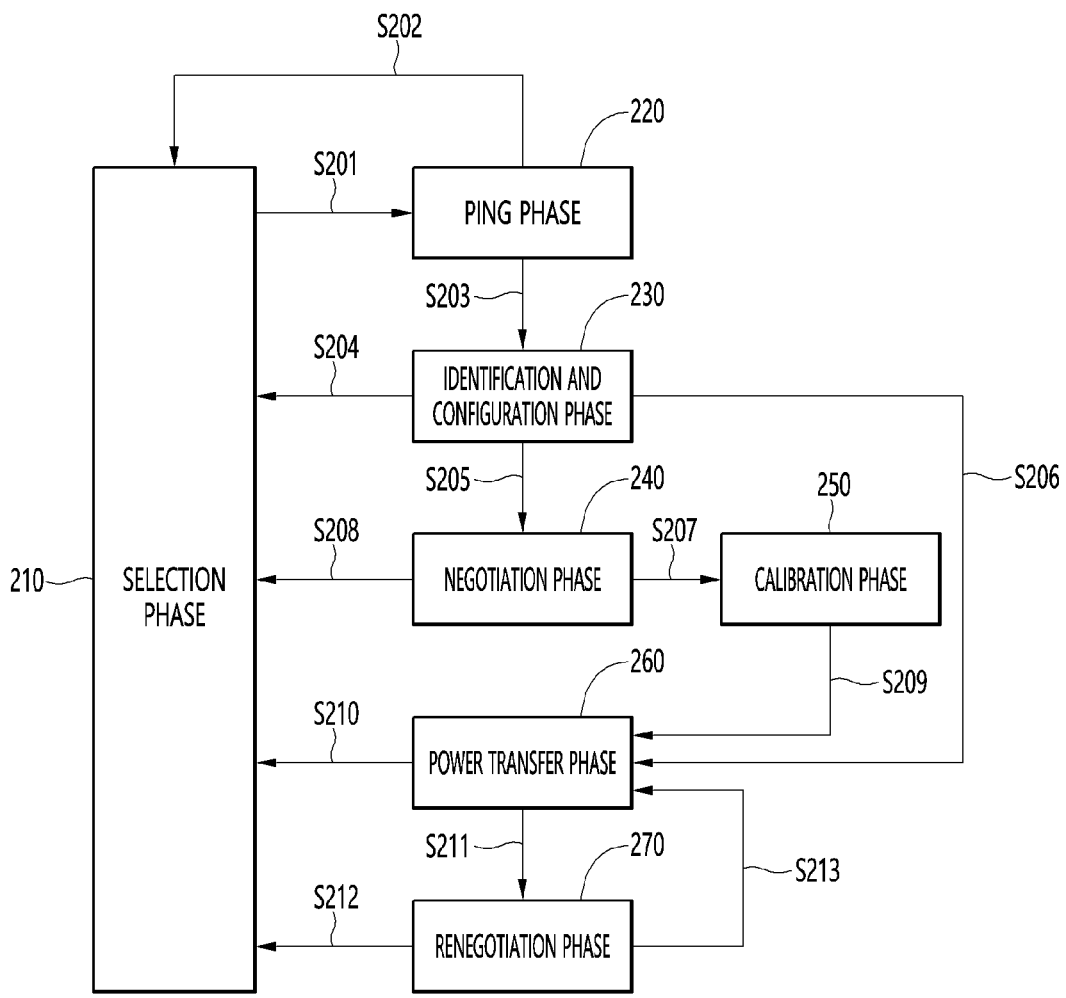
FIG. 2. is a state transition view for describing a wireless power transmission process defined in the WPC standards.

FIG. 2 is a state transition view for describing a wireless power transmission process.

Referring to FIG. 2, according to the wireless power transmission process, the power transmission from the transmitter to the receiver is generally divided into a selection phase 210, a ping phase 220, an identification and configuration phase 230, a negotiation phase 240, a calibration phase 250, a power transfer phase 260, and a renegotiation phase 270.

The selection phase 210 may be a transition phase—for example, including reference numerals of S202, S204, S208, S210, S212—when a specific error or a specific event is sensed while power transmission is started or power transmission is maintained Herein, the specific error or the specific event will become apparent through the following descriptions. Further, in the selection phase 210, the transmitter may monitor whether an object is present on an interface surface. When the transmitter senses that an object is put on the interface surface, transition to the ping phase 220 is possible. In the selection phase 210, the transmitter transmits an analog ping signal having a very short pulse and may sense whether an object is present in an active area of the interface surface based on change in a current of the transfer coil or a primary coil.

When the object is sensed in the selection phase 210, the wireless power transmitter may measure a quality factor of one end and/or the other end of a wireless power resonance circuit, e.g. the transfer coil and/or the resonance capacitor for transmitting the wireless power.

The wireless power transmitter may measure a peak frequency of the wireless power resonance circuit (e.g. the power transmission coil and/or the resonance capacitor).

Next, a quality coefficient and/or a peak frequency may be used in the negotiation phase 240 to determine whether a foreign object is present.

When an object is sensed in the ping phase 220, the transmitter wakes up the receiver and transmits a digital ping for identifying whether the sensed object is the wireless power receiver (S201). In the ping phase 220, when the transmitter receives no response signal as a response to the digital ping—for example, no signal strength packet—from the receiver, transition to the selection phase 210 is possible. Further, when the transmitter receives a signal—i.e. a charging completion packet—informing that the power transmission has been completed, transition from the ping phase 220 to the selection phase 210 may be possible (S202).

When the ping phase 220 is completed, the transmitter identifies the receiver and enters the identification and configuration phase 230 for collecting information about the configuration and state of the receiver (S203).

When an unexpected packet is received, an expected packet goes beyond a predetermined time limit (i.e. times out), there is a packet transfer error, or no power transmission contract is set in the identification and configuration phase 230, the transmitter may return to the selection phase 210 (S204).

The transmitter may determine whether there is a need for entering the negotiation phase 240 based on a negotiation field value of a configuration packet received in the identification and configuration phase 230.

As a result of determination, when the negotiation is needed, the transmitter may enter the negotiation phase 240 (S205). In the negotiation phase 240, the transmitter may perform a predetermined foreign object detection (FOD) process.

On the other hand, as a result of determination, when the negotiation is not needed, the transmitter may directly enter the power transmission phase 260 (S206).

In the negotiation phase 240, the transmitter may receive an FOD state packet including a reference quality factor value, or may receive an FOD state packet including a reference peak frequency value, or may receive a state packet including the reference quality factor value and the reference peak frequency value. In this case, the transmitter may determine a threshold quality factor value for detecting a foreign object (FO) based on the reference quality factor value. The transmitter may determine a threshold peak frequency value for detecting an FO based on the reference peak frequency value.

Using the threshold quality factor value for detecting the determined FO and the currently measured quality factor value—for example, the quality factor value measured before the ping phase—, the transmitter may detect whether an FO is present in a charging region and control the power transmission in accordance with FO detection results. For example, when the FO is detected, the power transmission may be stopped, but the embodiment is not limited thereto.

Using the threshold peak frequency value for detecting the determined FO and the current measured peak frequency value—for example, the peak frequency value measured before the ping phase—, the transmitter may detect whether an FO is present in the charging region and control the power transmission in accordance with FO detection results. As an example, when the FO is detected, the power transmission may be stopped, but the embodiment is not limited thereto.

When the FO is detected, the transmitter may return to the selection phase 210 (S208). On the other hand, when the FO is not detected, the transmitter may enter the power transmission phase 260 via the calibration phase 250 (S207 and S209). In detail, when the FO is not detected, the transmitter may receive the level of the electric power received in the receiving terminal, and may compare the level of the electric power transmitted from the transmitting terminal in the calibration phase 250 to measure power loss in the receiving terminal and the transmitting terminal. That is, the transmitter may predict the power loss based on difference between the power transmitted from the transmitting terminal and the power received in the receiving terminal during the calibration phase 250. The transmitter according to one embodiment may calibrate a power loss threshold value for detecting the FOD by reflecting the predicted power loss. That is, in the calibration phase, since there is no FO, it is determined that the power loss due to a coupling state of the receiver and a friendly metal content of the receiver, and it may be determined that a foreign object is present when additional power loss other than a predetermined power loss occurs.

When an unexpected packet is received, an expected packet goes beyond a predetermined time limit (i.e. times out), preset power transmission contract is violated, or charging is completed, the transmitter in the power transmission phase 260 may return to the selection phase 210 (S210).

Further, in the power transmission phase 260, when there is a need for reconfiguring the power transmission contract in accordance with changes in the state of the transmitter, the transmitter may enter the renegotiation phase 270 (S211). In this case, the renegotiation is normally completed, and the transmitter may return to the power transmission phase 260 (S213).

The power transmission contract may be set based on the state and characteristic information of the transmitter and the receiver. For example, the state information of the transmitter may include information about the maximum transmittable power, information about the maximum supportable number of the receivers, etc., and the state information of the receiver may include information about required electric power.

When the renegotiation is not normally completed, the transmitter may stop transmitting the electric power to the corresponding the receiver and return to the selection phase 210 (S212).

Figure 3:
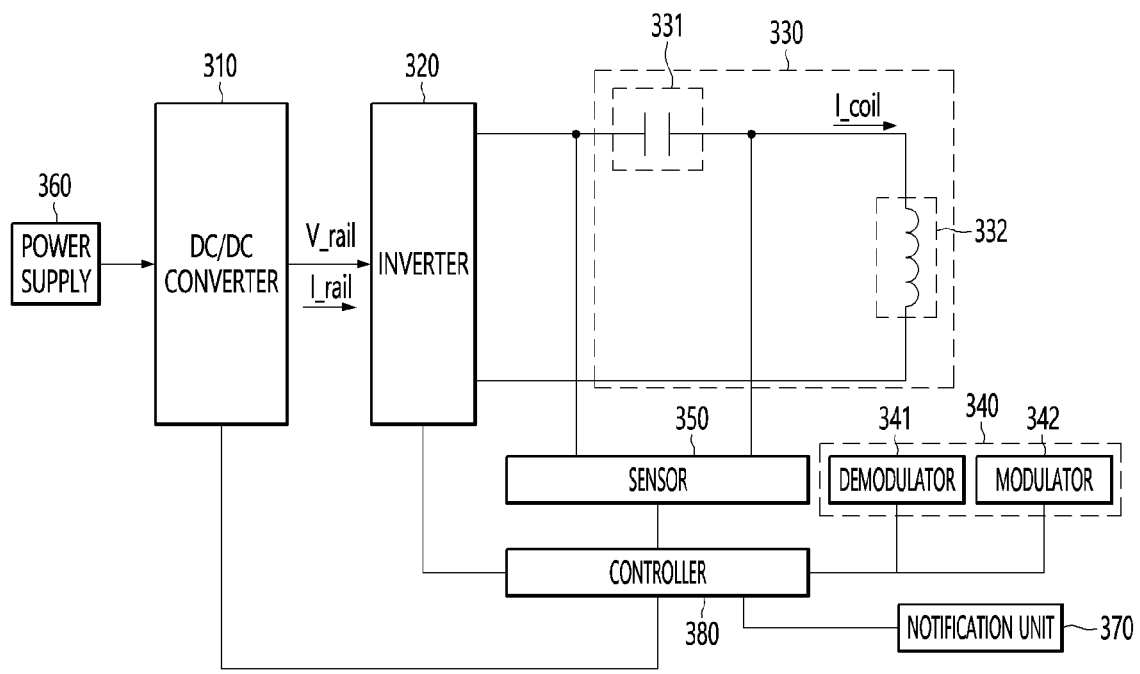
FIG. 3 is a block diagram for describing a structure of a wireless power transmitter according to one embodiment.

FIG. 3 is a block diagram describing a structure of a wireless power transmitter according to one embodiment.

Referring to FIG. 3, a wireless power transmitter 300 includes a power supply 360, a DC-DC converter 310, an inverter 320, a resonance circuit 330, a sensor 350, a communication unit 340, an alarm unit 370, and a controller 380.

The resonance circuit 330 includes a resonance capacitor 331 and an inductor (or transmission coil) 332. The communication unit 340 includes at least one of a demodulator 341 and a modulator 342.

The power supply 360 may receive DC power from an external power supply terminal or a battery and transmit it to the DC-DC converter 310. Here, the battery may be configured to be installed inside the wireless power transmitter 300 so as to be chargeable, but it is merely an example, and may be connected to the power supply 360 of the wireless power transmitter 300 via a predetermined cable in a form of an auxiliary battery or an external battery.

The DC-DC converter 310 may convert a level of DC power input from the power supply 360 into DC power having a specific level according to a control of the controller 380. As an example, the DC-DC converter 310 may be configured as a variable voltage generator capable of controlling a level of voltage, but the embodiment is not limited thereto.

The inverter 320 may convert the converted DC power into AC power.

The inverter 320 may convert a DC power signal input through control of a plurality of switches included therein into an AC power signal and output the AC power signal.

As an example, the inverter 320 may include a full-bridge circuit, but the embodiment is not limited thereto, and may include a half-bridge.

As another example, the inverter 320 may be configured to include both a half-bridge circuit and a full-bridge circuit, and in this case, the controller 380 may dynamically determine whether to operate the inverter 320 in a half-bridge or a full-bridge to control.

The wireless power transmitter according to one embodiment may adaptively control a bridge mode of the inverter 320 according to a level of power required by the wireless power receiver.

Here, the bridge mode includes a half-bridge mode and a full-bridge mode. As an example, when the wireless power receiver requires a low power of 5 W, the controller 380 may control the inverter 320 so as to operate in the half-bridge mode.

On the other hand, when the wireless power receiver requires 15 W of power, the controller 380 may control to operate in the full-bridge mode. As another example, the wireless power transmitter may adaptively determine the bridge mode according to the sensed temperature and drive the inverter 320 according to the determined bridge mode.

As an example, when a temperature of a wireless power transmission device exceeds a predetermined reference value during transmission of wireless power through the half-bridge mode, the controller 380 may control such that the half-bridge mode is disabled and the full-bridge mode is enabled. That is, the wireless power transmission device increases a voltage through a full-bridge circuit and reduces a level of current flowing in the resonance circuit 330 for the same level of power transmission, and thus the internal temperature of the wireless power transmitter may be controlled so as to be maintained below the predetermined reference value.

Generally, an amount of heat generated in an electronic component mounted on an electronic device may be more sensitive to the level of current than the level of voltage applied to the electronic component.

In addition, the inverter 320 may change a level of AC power as well as convert DC power to AC power.

As an example, the inverter 320 may adjust a frequency of a reference alternating current signal used for generating AC power according to control of the controller 380 to adjust the level of AC power. To this end, the inverter 320 may include a frequency oscillator that generates a reference AC signal having a specific frequency, but it is merely one example, and in another example, the frequency oscillator may be configured separately from the inverter 320 and mounted on one side of the wireless power transmitter 300.

As another example, the wireless power transmitter 300 may further include a gate driver (not shown) for controlling a switch provided in the inverter 320. In this case, the gate driver may receive at least one pulse width modulation signal from the controller 380, and may control the switch of the inverter 320 according to the received pulse width modulation signal. The controller 380 may control the duty cycle of the pulse width modulation signal—i.e. a duty rate—and a phase to control a level of output power of the inverter 320. The controller 380 may adaptively control the duty cycle and phase of the pulse width modulation signal based on a feedback signal received from the wireless power receiving apparatus.

The sensor 350 may measure the voltage/current of the DC-converted power to provide them to the controller 380. In addition, the sensor 350 may measure an internal temperature of the wireless power transmitter 300 or an inside of a charging interface (surface) in order to determine whether overheating occurs, and provide a measurement result to the controller 380. As an example, the controller 380 adaptively cut off the power supplied from the power supply 380 based on the voltage/current value or the internal temperature value measured by the sensor 350. To this end, a predetermined power cut-off circuit may be further provided at one side of the DC-DC converter 310 to cut off the power supplied from the power supply 360.

In addition, the sensor 350 may include various sensing elements for sensing a quality factor value, a frequency value, an equivalent series resistance value, and the like. The sensor 350 may provide the sensed quality factor, frequency value, equivalent series resistance, etc. to the controller 380. A sensing method of the sensor 350 follows descriptions of FIGS. 6 to 18.

The controller 380 may detect a foreign object using FOD state information including at least one of the sensed quality factor value, frequency value, equivalent series resistance value, and the like, and the received reference quality factor value and the reference frequency value. A foreign object detection method of the controller 380 follows descriptions of FIGS. 6 to 18.

A modulator 342 modulates the control signal generated by the controller 380 and transmits it to the resonance circuit 330. Herein, a method of modulating the control signal may include a frequency shift keying (FSK) modulation method, a Manchester coding modulation method, a phase shift keying (PSK) modulation method, a pulse width modulation (PWM) method, a differential bi-phase modulation method, etc. without limitations.

When sensing a signal received through the transmission coil, the demodulator 341 demodulates the sensed signal and transmits it to the controller 380. As an example, the demodulated signal may include a signal strength indicator, an error calibration (EC) indicator for controlling electric power during the wireless power transfer, an end-of-charge (EOC) indicator, an overvoltage/overcurrent/overheat indicator, etc. without limitations, and may include various pieces of status information for identifying the state of the wireless power receiver. As another example, the demodulated signal may include FOD state information including a value of at least one of a reference quality factor value and a reference frequency value.

As an example, the wireless power transmitter 300 may obtain the signal strength indicator via in-band communication that uses the same frequency used for wireless power transmission to communicate with the wireless power receiver.

In the foregoing description with FIG. 3, the wireless power transmitter 300 and the wireless power receiver perform the In-band communication, but this is merely an embodiment. Alternatively, they may perform a near field interactive communication through a frequency band different from the frequency band used in transmitting the wireless power signal. For example, the near field interactive communication may be one among low power Bluetooth communication, RFID communication, UWB communication, ZigBee communication, etc.

Figure 4:
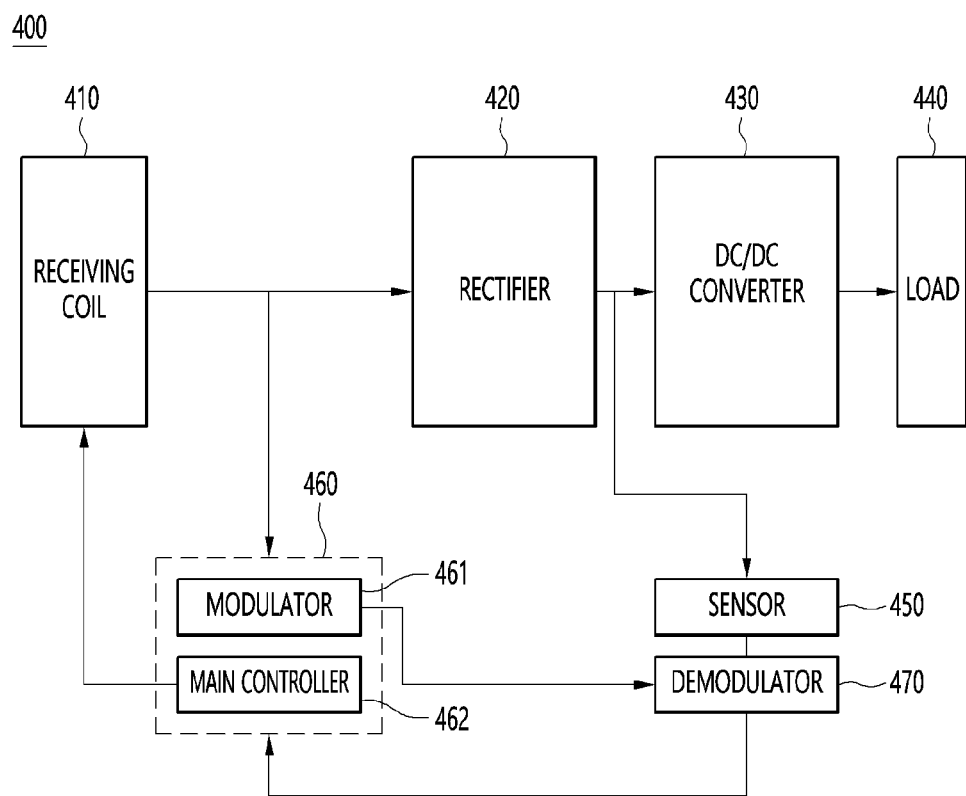
FIG. 4 is a block diagram for describing a structure of a wireless power receiver interworking with the wireless power transmitter of FIG. 3.

FIG. 4 is a block diagram for describing a structure of a wireless power receiver interworking with the wireless power transmitter according to FIG. 3.

Referring to FIG. 4, a wireless power receiver 400 may include a receiving coil 410, a rectifier 420, a DC/DC converter 430, a load 440, a sensor 450, a communication unit 460, and a main controller 470. Herein, the communication unit 460 may include at least one of a demodulator 461 and a modulator 462.

The wireless power receiver 400 shown in the example of FIG. 4 exchanges information with the wireless power transmitter through the In-band communication, but this is merely an embodiment. According to another embodiment the communication unit 460 may perform the near field interactive communication through a frequency band different from the frequency band used in transmitting the wireless power signal.

The AC power received through the receiving coil 410 may be transferred to the rectifier 420. The rectifier 420 may convert the AC power into DC power and transmission it to the DC/DC converter 430. The DC/DC converter 430 may convert the level of the DC power output from the rectifier into a specific level required by the load 440 and then transmission it to the load 440. Further, the receiving coil 410 may include a plurality of receiving coil (not shown)—i.e., the first to nth receiving coils. According to one embodiment, frequencies of the AC power transferred to the receiving coils (not shown) may be different from each other. According to another embodiment, a predetermined frequency controller having a function of adjusting the receiving coils to have different LC resonance characteristics may be used to set the resonance frequencies of the receiving coils differently.

The sensor 450 may measure the level of the DC power output from the rectifier 420, and provides it to the main controller 470. Further, the sensor 450 may measure the intensity of the current applied to the receiving coil 410 in accordance with reception of the wireless power, and transmits the measured results to the main controller 470. Further, the sensor 450 may measure the internal temperature of the wireless power receiver 700, and provides the measured temperature value to the main controller 470.

For example, the main controller 470 may compare the measured level of the DC power output from the rectifier with a predetermined reference value, and determine whether an overvoltage is generated or not. As a result of determination, when the overvoltage is generated, the main controller 470 may make a predetermined packet for informing the overvoltage, and transmits the packet to the modulator 462. Herein, a signal modulated by the modulator 462 may be transmitted to the wireless power transmitter through the receiving coil 410 or a separate coil (not shown). Further, when the level of the DC power output from the rectifier is equal to or higher than a predetermined reference value, the main controller 470 may determine that a sensing signal is received, and control the signal strength indicator corresponding to the sensing signal may be transmitted to the wireless power transmitter through the modulator 462 when the sensing signal is received. Alternatively, the demodulator 461 may modulate a DC power signal output from the rectifier 420 or an AC power signal between the receiving coil 410 and the rectifier 420 and determine whether a sensing signal is received, thereby providing a determination result to the main controller 470. In this case, the main controller 470 may perform control so that the signal strength indicator corresponding to the sensing signal may be transmitted via the modulator 462.

In addition, the main controller 470 may control so that the FOD state packet including at least one of the previously stored reference quality factor and the reference frequency value may be transmitted to the wireless power transmitter via the modulator 462.

Figure 5:
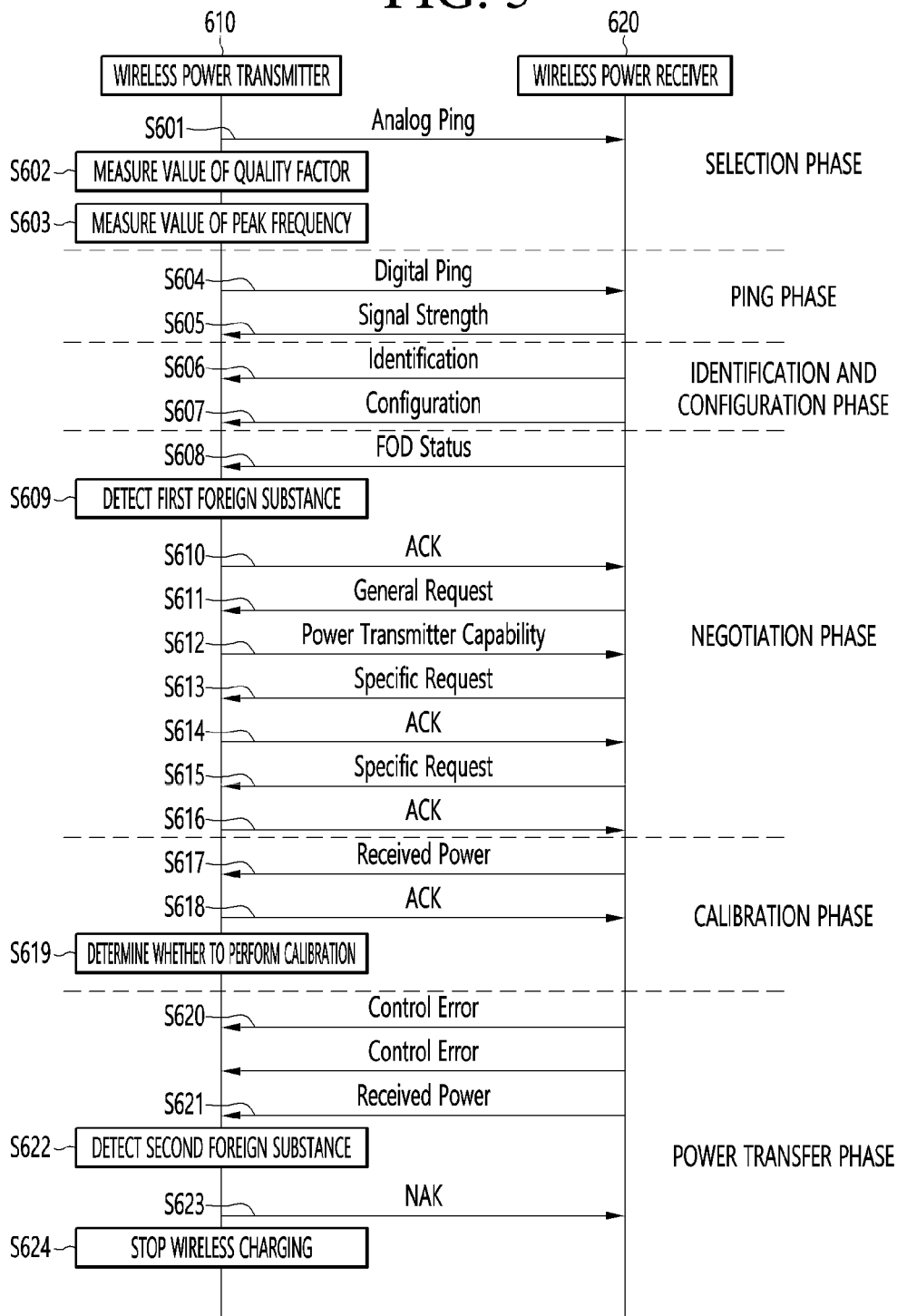
FIG. 5 is a view for describing a wireless charging method on a wireless charging system according to one embodiment.

FIG. 5 is a view for describing a wireless charging method on a wireless charging system according to one embodiment.

Referring to FIG. 5, a wireless power transmitter 610 may transmit an analog ping to a wireless power receiver 620 in a selection phase (S601).

The wireless power transmitter 610 may measure a quality factor value before a ping phase (S602). As an example, the wireless power transmitter 610 may measure the quality factor value in the selection phase (S602).

In addition, the wireless power transmitter 610 may measure a peak frequency value before the ping phase (S603). As an example, the wireless power transmitter 610 may measure the peak frequency value in the selection phase (S602). As another example, the wireless power transmitter 610 may determine an inductance value by measuring the peak frequency of the transmission coil in the selection phase. More specifically, referring to Equation 1, the frequency value f may be determined using a fixed capacitance value C and a measured inductance value.

$$f = \frac{1}{2\pi\sqrt{LC}} \qquad \text{(Equation 1)}$$

The wireless power transmitter 610 may transit from the selection phase to the ping phase when an object is sensed. The wireless power transmitter 610 may activate the wireless power receiver 620, and may transmit a digital ping to identify whether a receiver is the wireless power receiver 620 (S604). The wireless power receiver 620 may transmit a signal strength packet in response to the digital ping (S603).

When the ping phase is completed, in the identifying and configuring phase, the wireless power receiver 620 may transmit an identification packet to inform the identification information and a configuration packet to inform the configuration information (S606 to S607). The wireless power transmitter 610 and the wireless power receiver 620 may transition to a negotiation phase when a negotiation field value of the configuration packet is a value indicating to perform the negotiation phase.

In the negotiation phase, the wireless power receiver 620 may transmit a FOD status packet for FO detection (S606). The FOD state packet may include one or more of a reference quality factor value and a reference frequency value.

The wireless power transmitter 610 may perform first foreign object detection (S609). The first foreign object detection may detect a foreign object by using a measured quality factor value, a measured frequency value, and information of a received FOD status packet. The first foreign object detection is according to descriptions of a wireless charging method of FIGS. 7 to 12.

The wireless power transmitter 610 may transmit an ACK to the wireless power receiver 620 in response to the FOD status packet (S610) when it is determined to perform wireless charging after performing the first foreign object detection. Conversely, the wireless power transmitter 610 may transmit an NAK to the wireless power receiver 620 in response to the FOD status packet when it is determined to stop wireless charging after performing the first foreign object detection.

The wireless power receiver 620 may transmit a general request packet requesting a power transmitter capability packet for a power transmission contract (S611). The wireless power transmitter 620 may transmit the power transmitter capability packet in response to the general request packet (S612). In this case, a guaranteed power of the power transmitter capability packet may be a first guaranteed power value.

A potential power value may be a maximum transmission power value that may be transmitted by a wireless power transmitter regardless of power limitation due to surrounding requirements. As an example, the first guaranteed power value may be a value close to a potential power value that is not subject to power limitations due to a number of wireless power transmitters or a number of wireless power receivers based on a supply power provided from a power supply of the wireless power transmitter. As another example, the first guaranteed power value may be a maximum transmission power value that may be transmitted by the wireless power transmitter under conditions (environmental conditions) such as power limitation due to the number of wireless power transmitters or the number of wireless power receivers. The environmental conditions may refer to a temperature of the transmitter, a capacity of the transmitter's power source, the presence of foreign object, or influence of friendly metal. The wireless power receiver 620 may transmit a specific request packet to propose the guaranteed power value of the power transmission contract based on the first guaranteed power value of the power transmitter capability packet (S613). It should be noted that the first guaranteed power of the power transmitter capability packet and the guaranteed power of the power transmission contract may be distinguished. For example, the wireless power receiver 620 may request a guaranteed power value of the power transmission contract with a value equal to or less than the first guaranteed power value of the power transmitter capability packet. For convenience of description, the wireless power receiver 620 requests the guaranteed power value of the power transmission contract as the same value as the first guaranteed power value of the power transmitter capability packet. The wireless power transmitter 610 may transmit an ACK packet in response to a specific request packet for requesting a guaranteed power value of the power transmission contract (S614). That is, the wireless power transmitter 610 is in a case in which the guaranteed power value of the power transmission contract proposed by the wireless power receiver is accepted. That is, the power transmission contract may be completed with the first guaranteed power value. Thereafter, when the power transmission contract is completed, the wireless power receiver 620 may transmit a specific request packet for ending the negotiation phase (S615). The wireless power transmitter 610 may transmit an ACK packet in response to the specific request packet for ending the negotiation phase (S616). That is, the wireless power transmitter 610 may transmit an ACK packet upon acceptance of the end of the negotiation phase.

In the calibration phase, the wireless power receiver 620 may transmit the received power packet to the wireless power transmitter 610 (S617). In this case, the received power packet may be a 24-bit received power packet. The wireless power transmitter 610 may transmit an ACK packet in response to the received power packet in order to perform wireless charging (S618).

The wireless power transmitter 610 may determine whether to perform the calibration (S619). The determination of whether to perform the calibration is a case in which performing the calibration phase in FIGS. 6 to 13 is entered. As an example, when it is determined to perform the calibration, in performing the calibration, the wireless power transmitter 610 may predict power loss by using the received power value of the wireless power receiver 610 of the received power packet received at S617 and the measured transmission power value. In addition, in performing the calibration, the wireless power transmitter 610 may calibrate a threshold value of power loss used in the second foreign object detection (S623) performed in the power transfer phase by using a predicted power loss value. In addition, in performing the calibration, the wireless power transmitter 610 may increase strength of the transmission power by using the predicted power loss value. The wireless power transmitter may not perform the calibration according to the presence or absence of foreign object (when it is present).

When the calibration phase is completed, the power transfer phase may be performed with the first guaranteed power. The wireless power receiver 620 may transmit one or more control error packets in order to control the current of the transmission coil of the wireless power transmitter 610 (S620). The wireless power transmitter 610 may control the transmission power by controlling the current of the transmission coil based on the control error packet transmitted from the wireless power receiver 620. The wireless power receiver 620 may transmit the received power packet periodically or arbitrarily (S621).

The wireless power transmitter 610 may perform the second foreign object detection (S622). For example, the wireless power transmitter 610 may determine power loss using the received power value of the received power packet and the measured transmission power value, and may detect the presence or absence of a foreign object according to a power loss value. That is, when the power loss value exceeds a predetermined threshold power loss value, it may be determined that the foreign object is present. In this case, the wireless power transmitter 610 may transmit a NAK packet to the wireless power receiver 620 in response to the received power packet to stop charging (S623). Thereafter, the wireless power transmitter 610 may stop wireless charging (S624). As another example, the wireless power transmitter 610 may detect the presence or absence of a foreign object by using the measured internal temperature value regardless of whether or not the received power packet is received. That is, when the internal temperature value exceeds a predetermined threshold temperature value, it may be determined that a foreign object is present. In this case, the wireless power transmitter 610 may stop wireless charging.

Therefore, the wireless charging system according to the embodiment may provide a wireless charging method and an apparatus and system therefor. In addition, the wireless charging system according to the embodiment may determine a foreign object accurately. Further, the wireless charging system according to the embodiment may accurately determine a foreign object to prevent a heat generation phenomenon, a decrease in charging efficiency, and a loss of power consumption.

Figure 6:
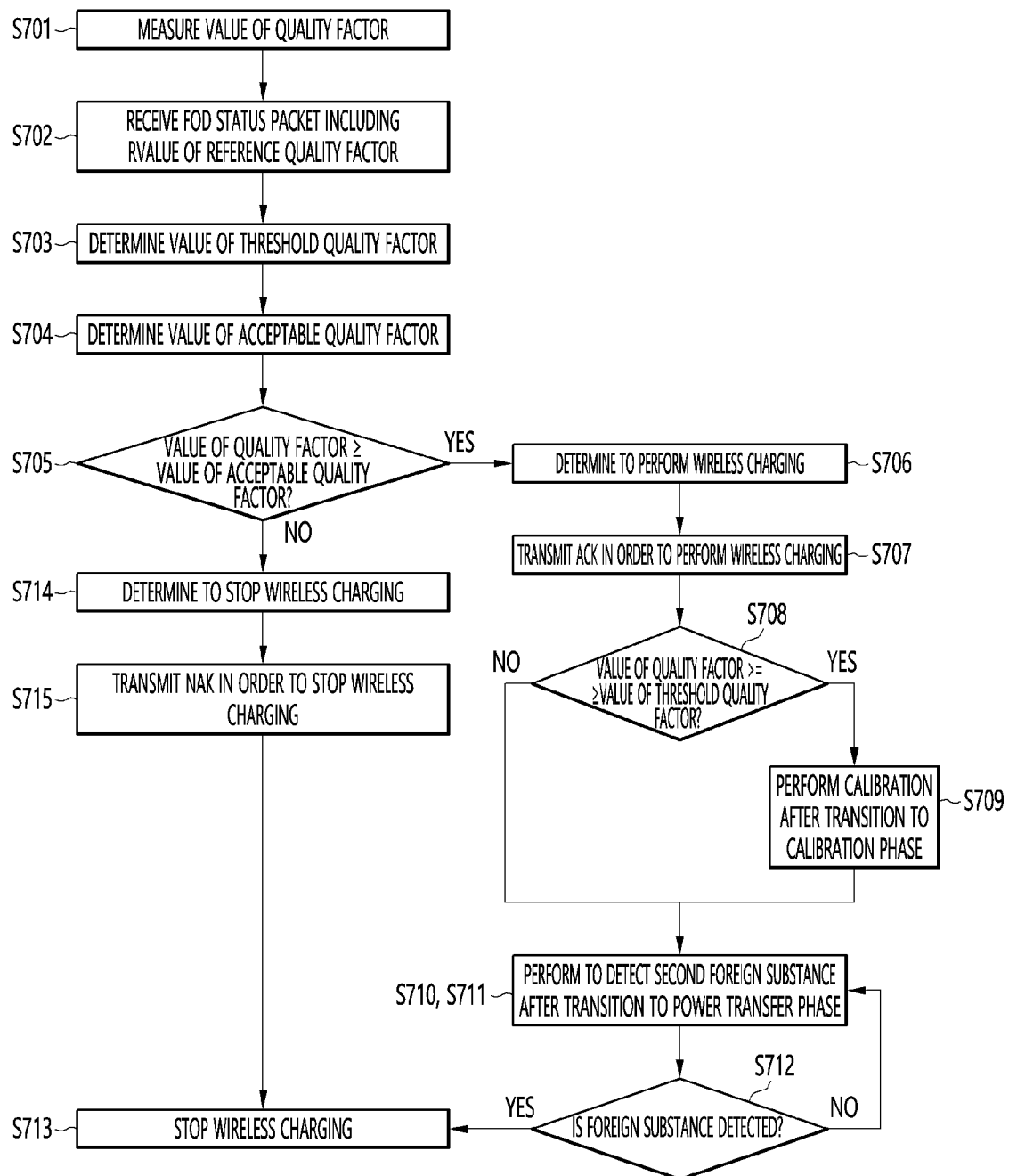
FIG. 6 is a view for describing a wireless charging method in a wireless power transmitter according to one embodiment.
Figure 7:
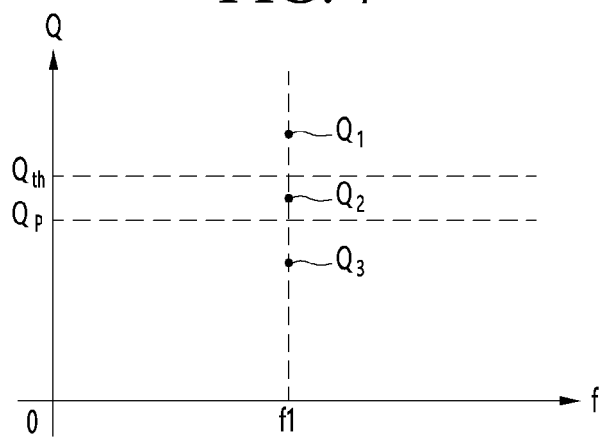
FIG. 7 is a view for describing a foreign object detection method according to a quality factor value.

FIG. 6 is a view for describing a wireless charging method in a wireless power transmitter according to an embodiment, FIG. 7 is a view for describing a foreign object detection method according to a quality factor value.

Referring to FIG. 6, the wireless charging method in the wireless power transmitter may include measuring a quality factor value before a ping phase (S701). For example, the wireless power transmitter may measure the quality factor value using a sensor in a selection phase.

The wireless charging method in the wireless power transmitter may include receiving a FOD status packet including a reference quality factor value (S702). As an example, the wireless power transmitter may receive an FOD status packet using a communication unit in a negotiation phase. The reference quality factor value is a quality factor value stored in the wireless power receiver, and may be a quality factor value measured in a specific coil unit. Here, the specific coil unit is a coil unit used as a reference for comparing the quality factor value, and the wireless power transmitter should to calibrate the quality factor value to be similar to the value measured in the reference coil unit according to the characteristics of the coil unit. Alternatively, on the contrary, the reference quality factor value measured in the reference coil unit may be calibrated to the value measured in the wireless power transmitter.

However, it is very difficult to calibrate (convert) the reference quality factor value according to the characteristics of the wireless power transmitter or to calibrate (convert) the measured value according to the specific coil unit. This is because a quality factor is an intrinsic characteristic value of the coil unit, and energy storage and loss are shown differently depending on the characteristic. Therefore, detecting a foreign object using the quality factor value may be erroneous. For example, even when only the wireless power receiver is disposed in a charging region, it may be determined as a foreign object by a measurement error and/or a calibration error. A terminal equipped with a wireless power receiver such as a mobile phone has a plurality of components other than the wireless power receiver, and thus the reference quality factor value may be very low. When a measured quality factor value or a calibrated quality factor value has a difference greater than the reference quality factor value (e.g., more than a tolerance), a false alarm may be generated as a foreign object. Therefore, even though the foreign object is determined in detecting a first foreign object, it is possible to determine whether or not the foreign object is present by an additional operation without interrupting the power transmission.

The wireless charging method in the wireless power transmitter may include determining a threshold quality factor value (S703). More specifically, the wireless power transmitter may calculate the threshold quality factor value using the received reference quality factor value. As an example, the wireless power transmitter may determine a value less than 10% in the reference quality factor value as a threshold quality factor value. 10% is a tolerance of the reference quality factor value, and when a foreign object is present, the foreign object may be detected by using that a measured quality factor value which is at least the tolerance or more becomes smaller than the reference quality factor value.

The wireless charging method in the wireless power transmitter may include determining an acceptable quality factor value (S704). More specifically, the wireless power transmitter may calculate the acceptable quality factor value using the determined threshold quality factor value. As an example, as shown in FIG. 7, the wireless power transmitter may determine a value reduced by more than 0% and 20% or less in a threshold quality factor value Qth as an acceptable quality factor value Qp. More specifically, the wireless power transmitter may determine a value reduced by 20% in the threshold quality factor value as the acceptable quality factor value.

The wireless charging method in the wireless power transmitter may include determining whether the measured quality factor value is greater than or equal to the determined acceptable quality factor value (S705).

Figure 8:
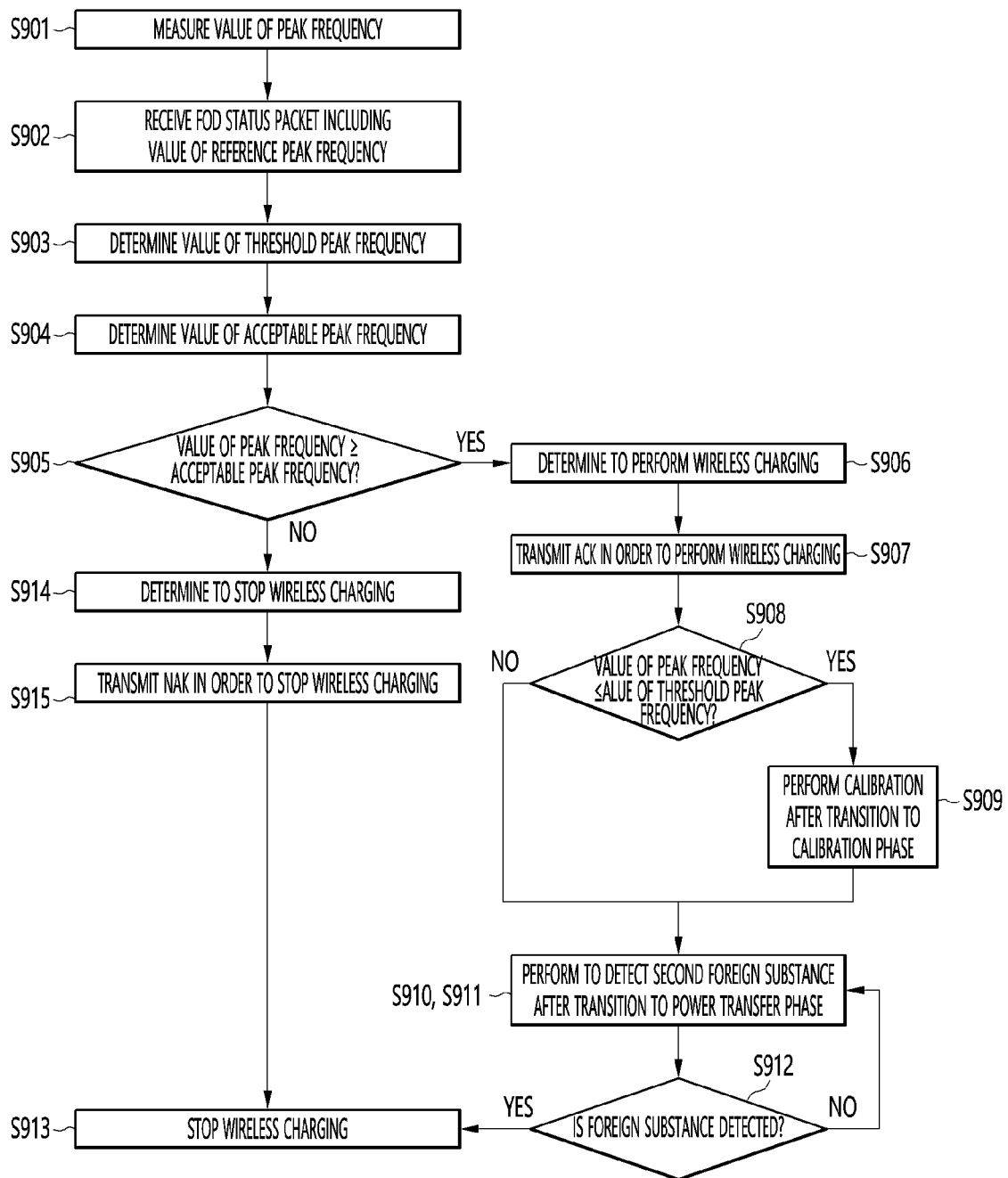
FIG. 8 is a view for describing a wireless charging method in a wireless power transmitter according to another embodiment.

When the quality factor value is equal to or greater than the acceptable quality factor value, the wireless power transmitter may determine to perform wireless charging (S706). When the quality factor value is less than the acceptable quality factor value, the wireless power transmitter may determine to stop wireless charging (S714). For example, as shown in FIG. 8, when a frequency of the transmission power is a first frequency, the quality factor measured in the wireless power transmitter may be a first quality factor value Q1, a second quality factor value Q2, and a third quality factor value Q3. When measured as the first quality factor value Q1, since there is a very high probability that a foreign object is not present between the wireless power transmitter and the wireless power receiver, it is possible to determine that the foreign object is not present. When measured as the third quality factor value Q3, since the third quality factor value Q3 is much lower than the threshold quality factor value Qth, and there is a very high probability that a foreign object is not present between the wireless power transmitter and the wireless power receiver, it is possible to determine that the foreign object is not present. When measured as the second quality factor value Q2, since the second quality factor value Q2 is between the threshold quality factor value Qth and the acceptable quality factor value Qp, it may be misrecognized as a foreign object is present between the wireless power transmitter and the wireless power receiver. In order to prevent this, the wireless power transmitter may perform wireless charging when the measured quality factor value is greater than or equal to the acceptable quality factor value. Thereafter, the wireless power transmitter may determine more accurately whether a foreign object is present or not by performing detection of a second foreign object in the power transfer phase of S711. Therefore, the wireless power transmitter may determine to perform wireless charging when the quality factor value is greater than or equal to the acceptable quality factor value. Accordingly, one embodiment may determine a foreign object accurately. In addition, one embodiment may accurately determine the foreign object to prevent a heat generation phenomenon, a decrease phenomenon in charging efficiency, and a loss of power consumption. Further, one embodiment may solve a problem in which wireless charging is not performed by erroneously recognizing that a foreign object is present in the related art.

When the wireless power transmitter determines to perform wireless charging, the ACK packet may be transmitted to the wireless power receiver in response to receiving the FOD status packet (S707).

The wireless charging method in the wireless power transmitter may include a step of determining whether the wireless power transmitter has a quality factor value greater than or equal to a threshold quality factor value (S708). More specifically, the wireless power transmitter may determine whether the quality factor value is greater than or equal to the threshold quality factor value in order to determine whether to perform calibration after transition to the calibration phase after determining to perform wireless charging in the negotiation phase.

The wireless charging method in the wireless power transmitter may include a step of performing the calibration after transition to the calibration phase (S709) when the quality factor value is greater than or equal to the threshold quality factor value. As an example, in performing the calibration, the wireless power transmitter may predict power loss by using the received power value of the wireless power receiver of the received power packet and the measured transmission power value. In addition, in performing the calibration the wireless power transmitter may increase strength of the transmission power by using the predicted power loss value.

In the wireless charging method in the wireless power transmitter, when the quality factor value of the wireless power transmitter is less than the threshold quality factor value, the wireless power transmitter may transition to the power transfer phase (S710) without the calibration phase.

The wireless charging method in the wireless power transmitter may include performing detection of the second foreign object (S711) when receiving the received power packet after transition to the power transfer phase. The wireless power transmitter may stop wireless charging when it is determined that the foreign object has been detected by performing detection of the second foreign object (S712, S713). In addition, the wireless power transmitter may maintain the power transfer phase when it is determined that the foreign object is not detected by performing detection of the second foreign object, and may perform detection of the second foreign object again when the received power packet is received (S712, S711). As an example, in the power transfer phase, the wireless power transmitter may determine power loss using the received power value of the received power packet and the measured transmission power value, and may detect the presence or absence of a foreign object according to the power loss value. When the power loss value exceeds a predetermined threshold power loss value, the wireless power transmitter may determine that a foreign object is present. In this case, the wireless power transmitter may transmit an NAK packet to the wireless power receiver in response to the received power packet in order to stop charging. Thereafter, the wireless power transmitter may stop wireless charging. As another example, the wireless power transmitter may detect the presence or absence of a foreign object using the measured internal temperature value regardless of whether or not the received power packet is received. That is, when the internal temperature value exceeds a predetermined threshold temperature value, it is possible to determine that a foreign object is present. In this case, the wireless power transmitter may stop wireless charging. Therefore, in one embodiment, even though detection of foreign object is suspected in the negotiation phase, the wireless charging is performed without stopping the wireless charging, and then the foreign object is detected again in the power transfer phase to accurately determine whether the foreign object is present.

When the wireless power transmitter determines to stop wireless charging in S714, the wireless power transmitter may transmit an NAK packet to the wireless power receiver in response to receiving the FOD status packet (S715). Thereafter, the wireless power transmitter may stop wireless charging (S713).

Figure 9:
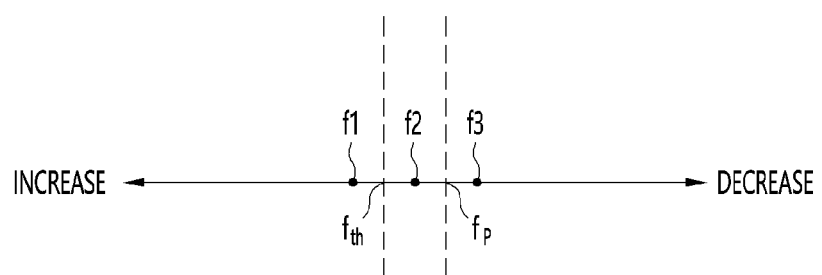
FIG. 9 is a view for describing a foreign object detection method according to a frequency value.

FIG. 8 is a view for describing a wireless charging method in a wireless power transmitter according to another embodiment, and FIG. 9 is a view for describing a foreign object detection method according to a peak frequency value.

Referring to FIG. 8, the wireless charging method in the wireless power transmitter may include measuring a peak frequency value (S901) before a ping phase. As an example, the wireless power transmitter may use a sensor to measure the peak frequency value of transmission power in a selection phase.

The wireless charging method in the wireless power transmitter may include receiving an FOD status packet including a reference peak frequency value (S902). As an example, the wireless power transmitter may receive the FOD status packet using a communication unit in a negotiation phase. The reference peak frequency value may be a peak frequency value of a received power stored in the wireless power receiver.

The wireless charging method in the wireless power transmitter may include determining a threshold peak frequency value (S903). More specifically, the wireless power transmitter may calculate the threshold peak frequency value using the received reference peak frequency value. As an example, the wireless power transmitter may determine a value increased by 10% in the reference peak frequency value as a threshold peak frequency value. 10% is a tolerance of the reference peak frequency value, and when a foreign object is present, the foreign object may be detected by using that a measured peak frequency value which is at least the tolerance or more becomes larger than the reference peak frequency value.

The wireless charging method in the wireless power transmitter may include determining the acceptable peak frequency value. More specifically, the wireless power transmitter may calculate the acceptable peak frequency value using the determined threshold peak frequency value. As an example, as shown in FIG. 9, the wireless power transmitter may determine a value reduced by more than 0% and 20% or less in a threshold peak frequency value fth as an acceptable peak frequency value fp. More specifically, the wireless power transmitter may determine a value reduced by 20% in the threshold peak frequency value as the acceptable peak frequency value.

The wireless charging method in the wireless power transmitter may include determining whether the measured peak frequency value is less than or equal to the determined acceptable peak frequency value.

When the peak frequency value is less than or equal to the acceptable peak frequency value, the wireless power transmitter may determine to perform wireless charging (S906). When the peak frequency value exceeds the acceptable peak frequency value, the wireless power transmitter may determine to stop wireless charging (S914). For example, as shown in FIG. 9, the peak frequency measured in the wireless power transmitter may be a first peak frequency value f1, a second peak frequency value f2, and a third peak frequency value f3. When measured as the first frequency value f1, since there is a very high probability that a foreign object is not present between the wireless power transmitter and the wireless power receiver, it is possible to determine that the foreign object is not present. When measured as the third peak frequency value f3, since the third peak frequency value f3 is very high than the threshold peak frequency value fth, and there is a very high probability that the foreign object is present between the wireless power transmitter and the wireless power receiver, it is possible to determine that the foreign object is present. When measured as the second peak frequency value f2, since the second peak frequency value f2 is between the threshold peak frequency value Qth and the acceptable peak frequency value fp, it may be misrecognized that the foreign object is present between the wireless power transmitter and the wireless power receiver. In order to prevent this, the wireless power transmitter may perform wireless charging when the measured peak frequency value is greater than or equal to the acceptable peak frequency value. Thereafter, the wireless power transmitter may more accurately determine whether a foreign object is present by performing second foreign object detection in the power transfer phase of S911. Therefore, the wireless power transmitter may determine to perform wireless charging when the peak frequency value is less than or equal to the acceptable peak frequency value. Accordingly, still another embodiment may accurately determine the foreign object. In addition, still another embodiment may accurately determine the foreign object to prevent a heat generation phenomenon, a reduction phenomenon in charging efficiency, and a loss of power consumption. In addition, still another embodiment may solve a problem that the wireless charging is not performed by erroneously recognizing that a foreign object is present in the related art.

When it is determined to perform wireless charging, the wireless power transmitter may transmit an ACK packet to the wireless power receiver in response to receiving the FOD status packet (S907).

The wireless charging method in the wireless power transmitter may include the determining of whether the peak frequency value is less than or equal to the threshold peak frequency value (S908). More specifically, the wireless power transmitter may determine whether the peak frequency is less than or equal to the threshold peak frequency value in order to determine whether to perform calibration after transition to the calibration phase after determining to perform wireless charging in the negotiation phase.

The wireless charging method in the wireless power transmitter may include performing calibration after transition to a calibration phase when the peak frequency value is less than or equal to the threshold peak frequency value (S909). As an example, in performing the calibration, the wireless power transmitter may predict power loss by using the received power value of the wireless power receiver of the received power packet and the measured transmission power value. In addition, in performing the calibration, the wireless power transmitter may increase strength of the transmission power by using the predicted power loss value.

In the wireless charging method in a wireless power transmitter, when the wireless power transmitter exceeds the threshold peak frequency value, the wireless power transmitter may transition to power transfer phase (S910) without a calibration phase.

The wireless charging method in the wireless power transmitter may include performing the second foreign object detection (S911) when receiving the received power packet after transition to the power transfer phase. The wireless power transmitter may stop wireless charging when it is determined that the foreign object has been detected by performing the second foreign object detection (S912, S913). In addition, the wireless power transmitter may maintain the power transfer phase when it is determined that the foreign object is not detected by performing the second foreign object detection, and may perform the second foreign object detection again when the received power packet is received (S912, S911). As an example, in the power transfer phase, the wireless power transmitter may determine power loss using the received power value of the received power packet and the measured transmission power value, and may detect the presence or absence of a foreign object according to a power loss value. When the power loss value exceeds a predetermined threshold power loss value, the wireless power transmitter may determine that a foreign object is present. In this case, the wireless power transmitter may transmit an NAK packet to the wireless power receiver in response to the received power packet in order to stop charging. Thereafter, the wireless power transmitter may stop wireless charging. As another example, the wireless power transmitter may detect the presence or absence of a foreign object using a measured internal temperature value regardless of whether or not the received power packet is received. That is, when the internal temperature value exceeds a predetermined threshold temperature value, it is possible to determine that a foreign object is present. In this case, the wireless power transmitter may stop wireless charging. Therefore, in another embodiment, even though foreign object detection is suspected in the negotiation phase, the wireless charging is performed without stopping the wireless charging, and then the foreign object is detected again in the power transfer phase to accurately determine whether the foreign object is present.

When the wireless power transmitter determines to stop wireless charging in S914, the wireless power transmitter may transmit the NAK packet to the wireless power receiver in response to receiving the FOD status packet (S915). Thereafter, the wireless power transmitter may stop wireless charging (S913).

Figure 10:
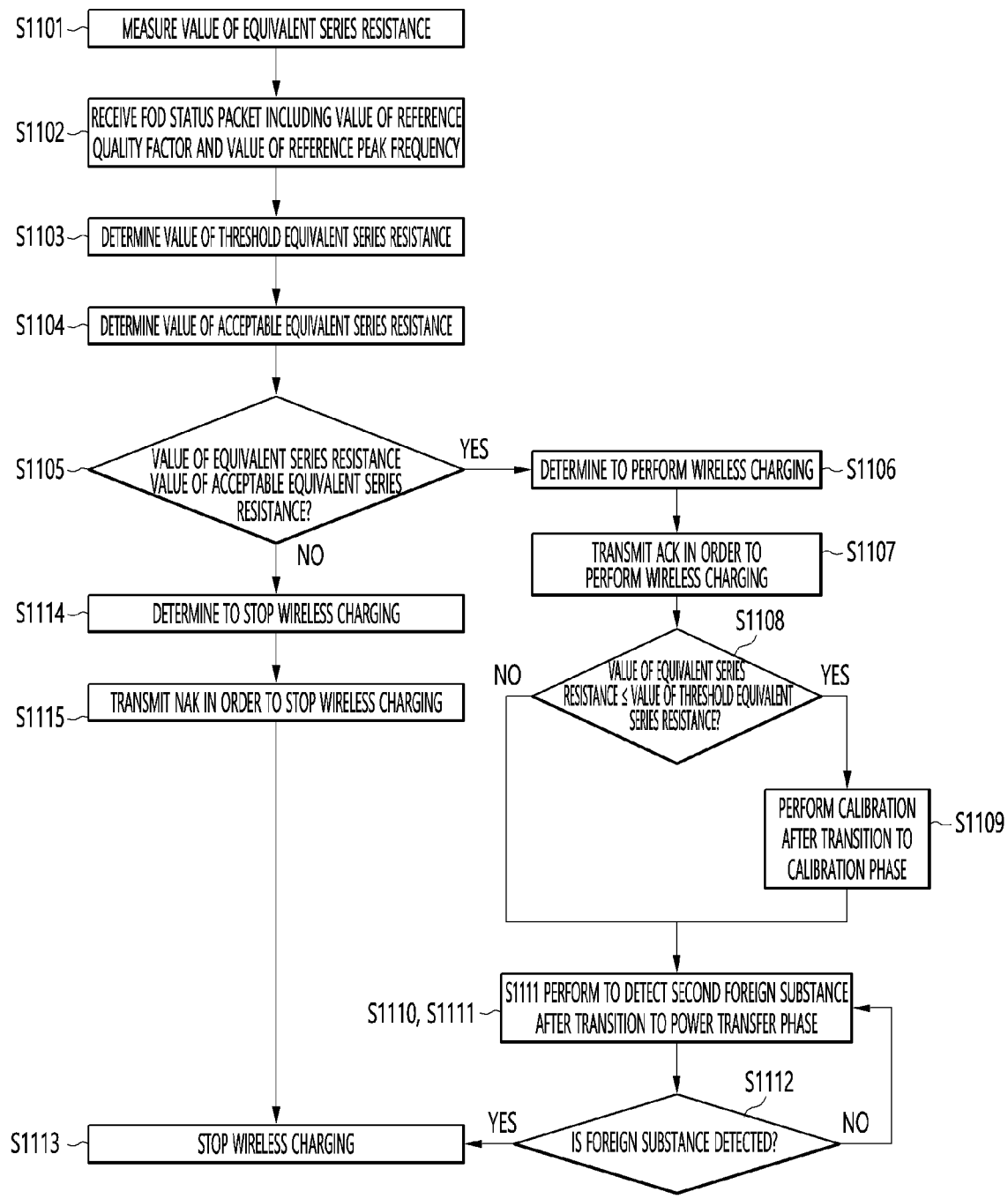
FIG. 10 is a view for describing a wireless charging method in a wireless power transmitter according to still another embodiment.
Figure 11:
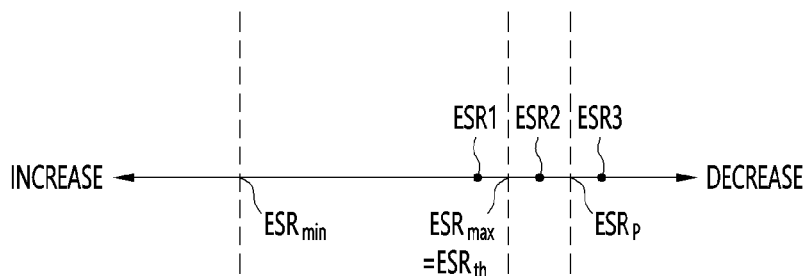
FIG. 11 is a view for describing a foreign object detection method according to an equivalent series resistance value.

FIG. 10 is a view for describing a wireless charging method in a wireless power transmitter according to still another embodiment, and FIG. 11 is a view for describing a foreign object detection method according to an equivalent series resistance value.

Referring to FIG. 10, the wireless charging method in the wireless power transmitter may include measuring the equivalent series resistance value before a ping phase (S1101). As an example, the wireless power transmitter may measure the equivalent series resistance value using a sensor in a selection phase.

The wireless charging method in the wireless power transmitter may include receiving an FOD status packet including a reference quality factor value and a reference peak frequency value (S1102). As an example, the wireless power transmitter may receive the FOD status packet using a communication unit in a negotiation phase. The reference quality factor value and the reference peak frequency value may be a quality factor value and a peak frequency value stored in the wireless power receiver.

The wireless charging method in the wireless power transmitter may include determining a threshold equivalent series resistance value (S1103). More specifically, the wireless power transmitter may determine the reference equivalent series resistance value using the received reference quality factor value and the reference peak frequency value. More specifically, a reference equivalent series resistance value ESRr may be calculated by substituting a reference peak frequency value fr, a reference quality factor value Qr, and a reference peak frequency value Lr into Equation 2. Referring to Equation 3, the reference peak frequency value Lr may be determined using a fixed capacitance value Cr of the wireless power receiver and a received reference peak frequency value fr.

$$ESRr = \frac{2\pi frLr}{Qr} \quad \text{(Equation 2)}$$

$$fr = \frac{1}{2\pi\sqrt{LrCr}} \quad \text{(Equation 3)}$$

As an example, the wireless power transmitter may determine a value increased by 10% in the reference equivalent series resistance value as a threshold equivalent series resistance value ESRth. As another example, the wireless power transmitter may determine a maximum reference equivalent series resistance value ESRmax as the threshold equivalent series resistance value ESRth. 10% is a tolerance of the reference equivalent series resistance value, and when a foreign object is present, the foreign object may be detected by using that a measured equivalent series resistance value which is at least the tolerance or more becomes greater than the reference equivalent series resistance value.

The wireless charging method in the wireless power transmitter may include determining an acceptable equivalent series resistance value (S1104). More specifically, the wireless power transmitter may calculate the acceptable equivalent series resistance value using the determined threshold equivalent series resistance value. As an example, as shown in FIG. 11, the wireless power transmitter may determine a value increased by more than 0% and 20% or less in the threshold equivalent series resistance value ESRth as an acceptable equivalent series resistance value ESRp.

More specifically, the wireless power transmitter may determine a value increased by 20% in the threshold equivalent series resistance value as the acceptable equivalent series resistance value.

The wireless charging method in the wireless power transmitter may include determining whether the measured equivalent series resistance value is less than or equal to the determined acceptable equivalent series resistance value (S1105).

When the equivalent series resistance value is less than or equal to the acceptable equivalent series resistance value, the wireless power transmitter may determine to perform wireless charging (S1106). When the equivalent series resistance value exceeds the acceptable equivalent series resistance value, the wireless power transmitter may determine to stop wireless charging (S1114). For example, as shown in FIG. 11, the equivalent series resistance measured in the wireless power transmitter may be a first equivalent series resistance value ESR1, a second equivalent series resistance value ESR2, and a third equivalent series resistance value ESR3. When measured as the first equivalent series resistance value ESR1, since there is a very high probability that a foreign object is not present between the wireless power transmitter and the wireless power receiver, it is possible to determine that the foreign object is not present. When measured as the third equivalent series resistance value ESR3, since the third equivalent series resistance value (ESR3) is very higher than the threshold equivalent series resistance value ESRth, and there is a very high probability that the foreign object is not present between the wireless power transmitter and the wireless power receiver, it is possible to determine that the foreign object is present. When measured as the second equivalent series resistance value ESR2, since the second equivalent series resistance value ESR2 is between the threshold equivalent series resistance value ESRth and the acceptable equivalent series resistance value ESRp, it may be misrecognized as being the foreign object is present between the wireless power transmitter and the wireless power receiver. In order to prevent this, the wireless power transmitter may perform wireless charging when the measured equivalent series resistance value is greater than or equal to the acceptable equivalent series resistance value. Thereafter, the wireless power transmitter may determine more accurately whether a foreign object is present or not by performing detection of a second foreign object in the power transfer phase of S1111. Therefore, the wireless power transmitter may determine to perform wireless charging when the equivalent series resistance value is less than or equal to the acceptable equivalent series resistance value. Accordingly, another embodiment may accurately determine the foreign object. In addition, another embodiment may accurately determine the foreign object to prevent a heat generation phenomenon, a reduction phenomenon in charging efficiency, a loss of power consumption. In addition, another embodiment may solve a problem that the wireless charging is not performed by erroneously recognizing that a foreign object is present in the related art.

When the wireless power transmitter determines to perform wireless charging, the ACK packet may be transmitted to the wireless power receiver in response to receiving the FOD status packet (S1107).

The wireless charging method in the wireless power transmitter may include a step of determining whether the wireless power transmitter has an equivalent series resistance value less than or equal to a threshold equivalent series resistance value (S1108). More specifically, the wireless power transmitter may determine whether the equivalent series resistance value is less than or equal to the threshold equivalent series resistance value in order to determine whether to perform calibration after transition to the calibration phase after determining to perform wireless charging in the negotiation phase.

The wireless charging method in the wireless power transmitter may include a step of performing calibration after transition to the calibration phase (S1109) when the equivalent series resistance value is less than or equal to the threshold equivalent series resistance value. As an example, in performing the calibration, the wireless power transmitter may predict power loss by using the received power value of the wireless power receiver of the received power packet and the measured transmission power value. In addition, in performing the calibration the wireless power transmitter may increase strength of the transmission power by using the predicted power loss value.

In the wireless charging method in the wireless power transmitter, when the equivalent series resistance value exceeds the threshold equivalent series resistance value, the wireless power transmitter may transition to the power transfer phase (S910) without a calibration phase.

The wireless charging method in the wireless power transmitter may include performing the second foreign object detection (S1111) when receiving the received power packet after transition to the power transfer phase. The wireless power transmitter may stop wireless charging when it is determined that the foreign object has been detected by performing the second foreign object detection (S1112, S1113). In addition, the wireless power transmitter may maintain the power transfer phase when it is determined that the foreign object is not detected by performing the second foreign object detection, and may perform the second foreign object detection again when the received power packet is received (S1112, S1111). As an example, in the power transfer phase, the wireless power transmitter may determine power loss using the received power value of the received power packet and the measured transmission power value, and may detect the presence or absence of a foreign object according to a power loss value. When the power loss value exceeds a predetermined threshold power loss value, the wireless power transmitter may determine that a foreign object is present. In this case, the wireless power transmitter may transmit an NAK packet to the wireless power receiver in response to the received power packet in order to stop charging. Thereafter, the wireless power transmitter may stop wireless charging. As another example, the wireless power transmitter may detect the presence or absence of a foreign object using a measured internal temperature value regardless of whether or not the received power packet is received. That is, when the internal temperature value exceeds a predetermined threshold temperature value, it is possible to determine that a foreign object is present. In this case, the wireless power transmitter may stop wireless charging. Therefore, in still another embodiment, even though foreign object detection is suspected in the negotiation phase, the wireless charging is performed without stopping the wireless charging, and then the foreign object is detected again in the power transfer phase to accurately determine whether the foreign object is present.

When the wireless power transmitter determines to stop wireless charging in S1114, the wireless power transmitter may transmit an NAK packet to the wireless power receiver in response to receiving the FOD status packet (S1115). Thereafter, the wireless power transmitter may stop wireless charging (S1113).

Figure 12A:
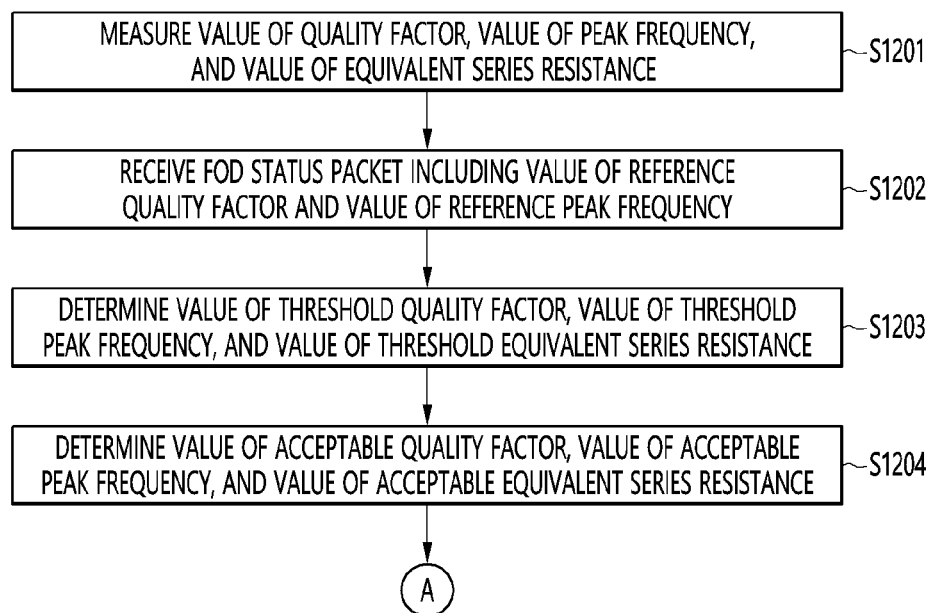
FIGS. 12A and 12B are views for describing a wireless charging method in a wireless power transmitter according to still another embodiment.
Figure 12B:
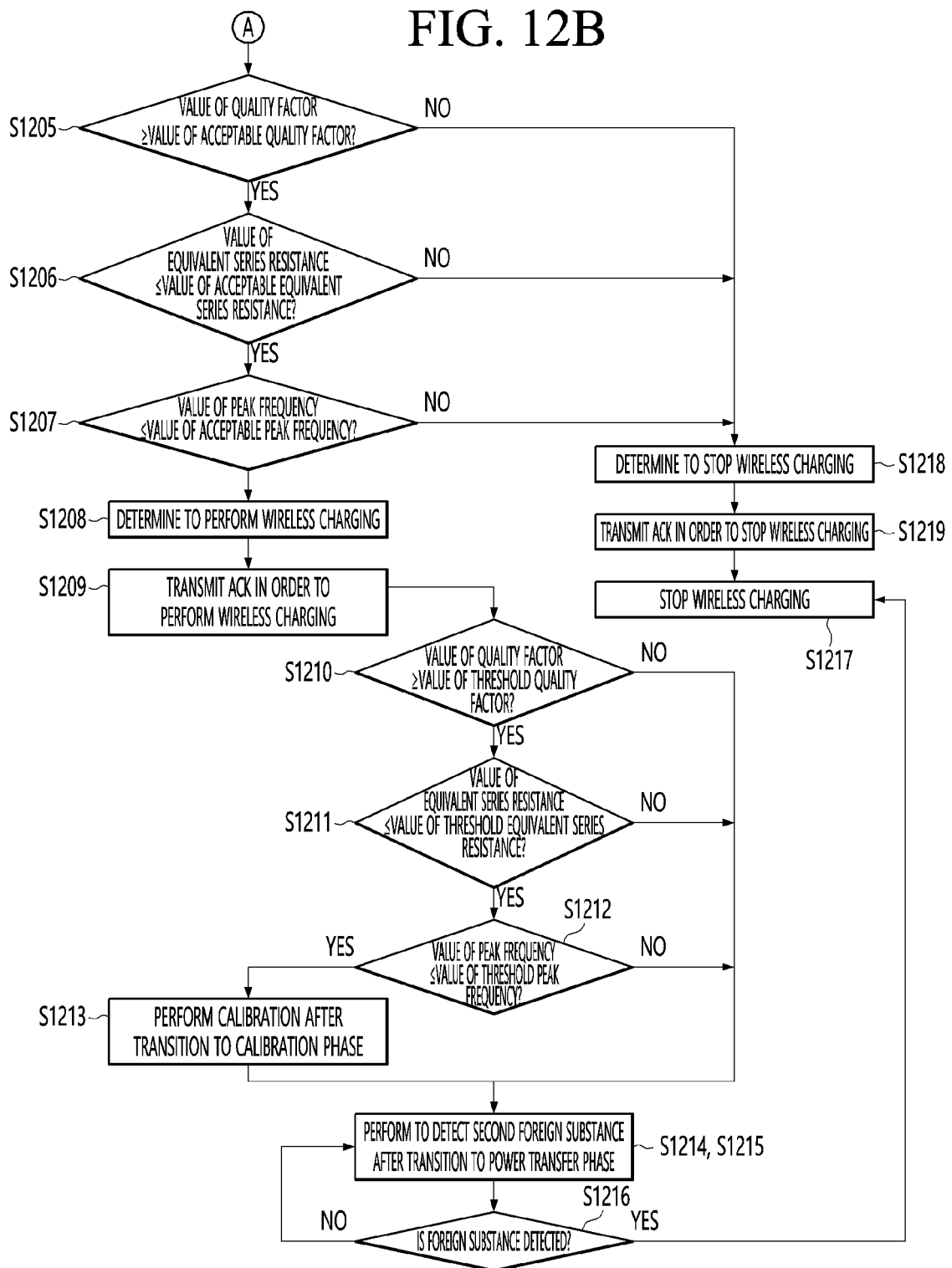

FIGS. 12A and 12B are views for describing a wireless charging method in a wireless power transmitter according to still another embodiment.

Referring to FIGS. 12A and 12B, the wireless charging method in the wireless power transmitter may include measuring a quality factor value, a peak frequency value, and an equivalent series resistance value before a ping phase (S1101). As an example, the wireless power transmitter may measure the quality factor value, the peak frequency value, and the equivalent series resistance value using a sensor in a selection phase.

The wireless charging method in the wireless power transmitter may include receiving an FOD status packet including a reference quality factor value and a reference peak frequency value (S1202). As an example, the wireless power transmitter may receive the FOD status packet using a communication unit in a negotiation phase. The reference quality factor value and the reference peak frequency value may be a quality factor value and a peak frequency value stored in the wireless power receiver.

The wireless charging method in the wireless power transmitter may include determining a threshold quality factor value, a threshold frequency value, and a threshold equivalent series resistance value (S1203). More specifically, the wireless power transmitter may calculate the threshold quality factor value using a received reference quality factor value. As an example, the wireless power transmitter may determine a value decreased by 10% in the reference quality factor value as the threshold quality factor value. 10% is a tolerance of the reference quality factor value, and when a foreign object is present, the foreign object may be detected by using that a measured quality factor value which is at least the tolerance or more becomes smaller than the reference quality factor value. In addition, the wireless power transmitter may calculate a threshold peak frequency value using a received reference frequency value. As an example, the wireless power transmitter may determine a value increased by 10% in the reference frequency value as the threshold frequency value. 10% is a tolerance of the reference peak frequency value, and when a foreign object is present, the foreign object may be detected by using that a measured peak frequency value which is at least the tolerance or more becomes greater than the reference peak frequency value. In addition, the wireless power transmitter may determine a reference equivalent series resistance value using the received reference quality factor value and reference peak frequency value. As an example, the wireless power transmitter may determine a value increased by 10% in the reference equivalent series resistance value as a threshold equivalent series resistance value ESRth. As another example, the wireless power transmitter may determine a maximum value ESRmax of the reference equivalent series resistance as the threshold equivalent series resistance ESRth. 10% is a tolerance of the reference equivalent series resistance value, and when a foreign object is present, the foreign object may be detected by using that a measured equivalent series resistance value which is at least the tolerance or more becomes greater than the reference equivalent series resistance value.

The wireless charging method in the wireless power transmitter may include determining an acceptable quality factor value, an acceptable frequency value, and an acceptable equivalent series resistance value (S1204). More specifically, the wireless power transmitter may calculate the acceptable quality factor value using the threshold quality factor value determined as S704 of FIG. 6. In addition, the wireless power transmitter may calculate an acceptable peak frequency value using the threshold peak frequency value determined as S904 in FIG. 8. Further, the wireless power transmitter may calculate the acceptable equivalent series resistance value using the threshold equivalent series resistance value determined as S1104 in FIG. 10.

The wireless charging method in the wireless power transmitter may include determining whether a measured quality factor value is greater than or equal to the determined quality factor value (S1205). The wireless power transmitter may determine to stop wireless charging when the quality factor value is not greater than or equal to the acceptable quality factor value (S1218).

The wireless charging method in the wireless power transmitter may include determining whether the measured equivalent series resistance value is less than or equal to the determined acceptable equivalent series resistance value when the quality factor value is greater than or equal to the acceptable quality factor value. When the equivalent series resistance value is not less than or equal to the acceptable equivalent series resistance value, the wireless power transmitter may determine to stop wireless charging (S1218).

The wireless charging method in the wireless power transmitter may determine to perform wireless charging when the peak frequency value is less than or equal to the acceptable peak frequency value (S1208). That is, when a measurement value used for foreign object detection does not reach a threshold value that is a reference for the wireless charging, but reaches an acceptable value, the wireless power transmitter may determine to perform wireless charging. Accordingly, still another embodiment may determine a foreign object accurately. In addition, still another embodiment may accurately determine the foreign object to prevent a heat generation phenomenon, a decrease phenomenon in charging efficiency, and a loss of power consumption, and a waste of power consumption. Further, still another embodiment may solve a problem in which wireless charging is not performed by erroneously recognizing that a foreign object is present in the related art.

When the wireless power transmitter determines to perform wireless charging, the ACK packet may be transmitted to the wireless power receiver in response to receiving the FOD status packet (S1209).

The wireless charging method in the wireless power transmitter may include determining whether the wireless power transmitter has a quality factor value greater than or equal to a threshold quality factor value (S1210). When the quality factor value is not greater than or equal to the threshold quality factor value, the wireless power transmitter may transition to a power transfer phase S1214 without a calibration phase.

The wireless charging method in the wireless power transmitter may include determining whether the equivalent series resistance value is greater than or equal to a threshold equivalent series resistance value when the quality factor value is greater than or equal to the threshold quality factor value (S1211). When the equivalent series resistance value is not less than or equal to the threshold equivalent series resistance value, the wireless power transmitter may transition to the power transfer phase without the calibration phase (S1214).

The wireless charging method in the wireless power transmitter may include determining whether the peak frequency value greater than or equal to a threshold peak frequency value when the equivalent series resistance value is less than or equal to the threshold equivalent series resistance value (S1212). When the peak frequency value is not less than or equal to the threshold peak frequency value, the wireless power transmitter may transition to the power transfer phase without the calibration phase (S1214).

The wireless charging method in the wireless power transmitter may include performing calibration after transition to a calibration phase when the peak frequency value is less than or equal to the threshold peak frequency value (S1213).

The wireless charging method in the wireless power transmitter may include performing the second foreign object detection (S1215) when receiving the received power packet after transition to the power transfer phase. The wireless power transmitter may stop wireless charging when it is determined that the foreign object has been detected by performing the second foreign object detection (S1216, S1217). In addition, the wireless power transmitter may maintain the power transfer phase when it is determined that the foreign object is not detected by performing the second foreign object detection, and may perform the second foreign object detection again when the received power packet is received (S1216, S1215). As an example, in the power transfer phase, the wireless power transmitter may determine power loss using the received power value of the received power packet and the measured transmission power value, and may detect the presence or absence of a foreign object according to a power loss value. When the power loss value exceeds a predetermined threshold power loss value, the wireless power transmitter may determine that a foreign object is present. In this case, the wireless power transmitter may transmit an NAK packet to the wireless power receiver in response to the received power packet in order to stop charging. Thereafter, the wireless power transmitter may stop wireless charging. As another example, the wireless power transmitter may detect the presence or absence of a foreign object using a measured internal temperature value regardless of whether or not the received power packet is received. That is, when the internal temperature value exceeds a predetermined threshold temperature value, it is possible to determine that a foreign object is present. In this case, the wireless power transmitter may stop wireless charging. Therefore, in another embodiment, even though foreign object detection is suspected in the negotiation phase, the wireless charging is performed without stopping the wireless charging, and then the foreign object is detected again in the power transfer phase to accurately determine whether the foreign object is present.

When the wireless power transmitter determines to stop wireless charging in S1218, the wireless power transmitter may transmit the NAK packet to the wireless power receiver in response to receiving the FOD status packet (S1219). Thereafter, the wireless power transmitter may stop wireless charging (S1217).

FIG. 13 is a view for describing a wireless charging method on a wireless charging system according to still another embodiment.

Referring to FIG. 13, a wireless power transmitter 1310 may transmit an analog ping to a wireless power receiver 1320 in a selection phase (S1301).

The wireless power transmitter 1310 may measure a quality factor value before a ping phase (S1302). As an example, the wireless power transmitter 1310 may measure the quality factor value in the selection phase (S1302).

The wireless power transmitter 1310 may transition from the selection phase to the ping phase when an object is detected. The wireless power transmitter 1310 activates the wireless power receiver 1320, and may transmit a digital ping in order to identify whether a receiver is the wireless power receiver 1320 (S1303). The wireless power receiver 1320 may transmit a signal strength packet in response to the digital ping (S1304).

When the ping phase is completed, in an identification and configuration phase, the wireless power receiver 1320 may transmit an identification packet for informing identification information and a configuration packet for informing configuration information (S1305 to S1306). When a negotiation field value of the configuration packet is a value indicating to perform a negotiation phase, the wireless power transmitter 1310 and the wireless power receiver 1320 may transition to the negotiation phase.

In the negotiation phase, the wireless power receiver 1320 may transmit an FOD status packet for FO detection (S1307). The FOD status packet may include a reference quality factor value.

The wireless power transmitter 1310 may perform foreign object detection (S1308). The foreign object detection may detect the foreign object by using a measured quality factor value and information of a received FOD state packet. The foreign object detection follows descriptions of the wireless charging method of FIGS. 14A and 15A.

The wireless power transmitter 1310 may transmit an NAK to the wireless power receiver 1320 in response to the FOD status packet when it is determined that a foreign object is present after performing the first foreign object detection (S1309). Conversely, the wireless power transmitter 1310 may transmit an ACK to the wireless power receiver 1320 in response to the FOD status packet when it is determined that the foreign object is not present after performing the first foreign object detection.

When the NAK is transmitted, the wireless power transmitter 1310 may determine whether to perform wireless charging (S1310). The determination of whether to perform wireless charging may use the measured quality factor value and the information of the received FOD status packet. The determination of whether to perform wireless charging follows descriptions of the wireless charging methods of FIGS. 14A and 15B.

The wireless power receiver 1320 may transmit a general request packet requesting a power transmitter capability packet for a power transmission contract (S1311).

When the wireless power transmitter 1320 determines to perform wireless charging after transmitting the NAK, the wireless power transmitter 1320 may transmit the power transmitter capability packet in response to the general request packet (S1312). In this case, a guaranteed power of the power transmitter capability packet may be a second guaranteed power value. Conversely, when the wireless power transmitter 1320 transmits the ACK in S1309, the guaranteed power of the power transmitter capability packet may be a first guaranteed power value. As an example, the first guaranteed power value may be greater than the second guaranteed power value. In particular, the second guaranteed power value may be a minimum guaranteed power strength of the wireless power transmitter 1310. As another example, the first guaranteed power value may be greater than 5 W and 15 W or less. The second guaranteed power value may be 5 W or less.

The wireless power receiver 1320 may transmit a specific request packet for proposing a guaranteed power value of the power transmission contract based on the second guaranteed power value of the power transmitter capability packet (S1313). It should be noted that the second guaranteed power of the power transmitter capability packet and the guaranteed power of the power transmission contract may be distinguished. For example, the wireless power receiver 1320 may request the guaranteed power value of the power transmission contract to a value equal to or less than the second guaranteed power value of the power transmitter capability packet. For convenience of description, the wireless power receiver 1320 requests the guaranteed power value of the power transmission contract as the same value as the second guaranteed power value of the power transmitter capability packet. The wireless power transmitter 1310 may transmit an ACK packet in response to a specific request packet for requesting the guaranteed power value of the power transmission contract (S1314). That is, the wireless power transmitter 1310 is in a case in which the guaranteed power value of the power transmission contract proposed by the wireless power receiver is accepted. That is, the power transmission contract may be completed to the second guaranteed power value. Thereafter, when the power transmission contract is completed, the wireless power receiver 1320 may transmit a specific request packet for ending the negotiation phase (S1315). The wireless power transmitter 1310 may transmit the ACK packet in response to the specific request packet for ending the negotiation phase (S1316). That is, the wireless power transmitter 1310 may transmit the ACK packet upon acceptance of the end of the negotiation phase.

The wireless power transmitter 1310 may measure an internal temperature in the wireless power transmitter such as a charging region after transition to a power transfer phase (S1317). In particular, when the NAK is transmitted in response to the FOD status packet in the negotiation phase, the wireless power transmitter 1310 may transition to the power transfer phase rather than a calibration phase after ending of the negotiation phase.

The wireless power transmitter 1310 may determine whether to increase transmission power strength (S1319). The determination of the increase in transmit power intensity may use the measured internal temperature, a stored preset period and preset temperature. The determination of the increase in the transmission power strength follows a description of the wireless charging method of FIG. 14B. When the wireless power transmitter 1310 determines to increase the transmission power strength, a renegotiation phase may be performed. More specifically, the wireless power receiver 1320 may transmit the received power packet to the wireless power transmitter 1310 (S1319). In this case, the received power packet may be a received power packet of 24 bits. When the wireless power transmitter 1310 determines to increase the transmission power strength, the wireless power transmitter 1310 may transmit the NAK packet in response to the received power packet (S1320). Thereafter, the wireless power transmitter 1310 may receive a renegotiation packet and transmit the ACK packet that accepts the transition to the renegotiation phase (S1321 to S1322). The wireless power receiver 1320 may transmit the general request packet requesting the power transmitter capability packet (S1323). The wireless power transmitter 1310 may transmit the power transmitter capability packet in response to the general request packet (S1324). In this case, the guaranteed power of the power transmitter capability packet may be a third guaranteed power value. As an example, the third guaranteed power value may be greater than the second guaranteed power value. As another example, the third guaranteed power value may be greater than 5 W and 15 W or less. The wireless power receiver 1320 may transmit the specific request packet for proposing a guaranteed power value of the power transmission contract based on the third guaranteed power value of the power transmitter capability packet (S1325). It should be noted that the guaranteed power of the power transmitter capability packet and the guaranteed power of the power transmission contract may be distinguished. For example, the wireless power receiver 1320 may propose the guaranteed power value of the power transmission contract to a value equal to or less than the third guaranteed power value of the power transmitter capability packet. For convenience of description, the wireless power receiver 1320 proposes the guaranteed power value of the power transmission contract as the same value as the third guaranteed power value of the power transmitter capability packet. The wireless power transmitter 1310 may transmit an ACK packet in response to a specific request packet for proposing a guaranteed power value of the power transmission contract (S1326). That is, the wireless power transmitter 1310 is in a case in which the guaranteed power value of the power transmission contract proposed by the wireless power receiver is accepted. That is, the power transmission contract may be completed to the third guaranteed power value. Thereafter, when the power transmission contract is completed, the wireless power receiver 1320 may transmit a specific request packet for ending the renegotiation phase (S1327). The wireless power transmitter 1310 may transmit the ACK packet in response to the specific request packet for ending the renegotiation phase (S1327). That is, the wireless power transmitter 1310 may transmit the ACK packet upon acceptance of the end of the negotiation phase. The wireless power transmitter 1310 and the wireless power receiver 1320 may transition to the power transfer phase to perform wireless charging with the third guaranteed power.

Therefore, the wireless charging system according to the embodiment may provide a wireless charging method and an apparatus and system therefor. In addition, the wireless charging system according to the embodiment may determine a foreign object accurately. Further, the wireless charging system according to the embodiment may accurately determine a foreign object to prevent a heat generation phenomenon, a decrease in charging efficiency, and a loss of power consumption.

Figure 14A:
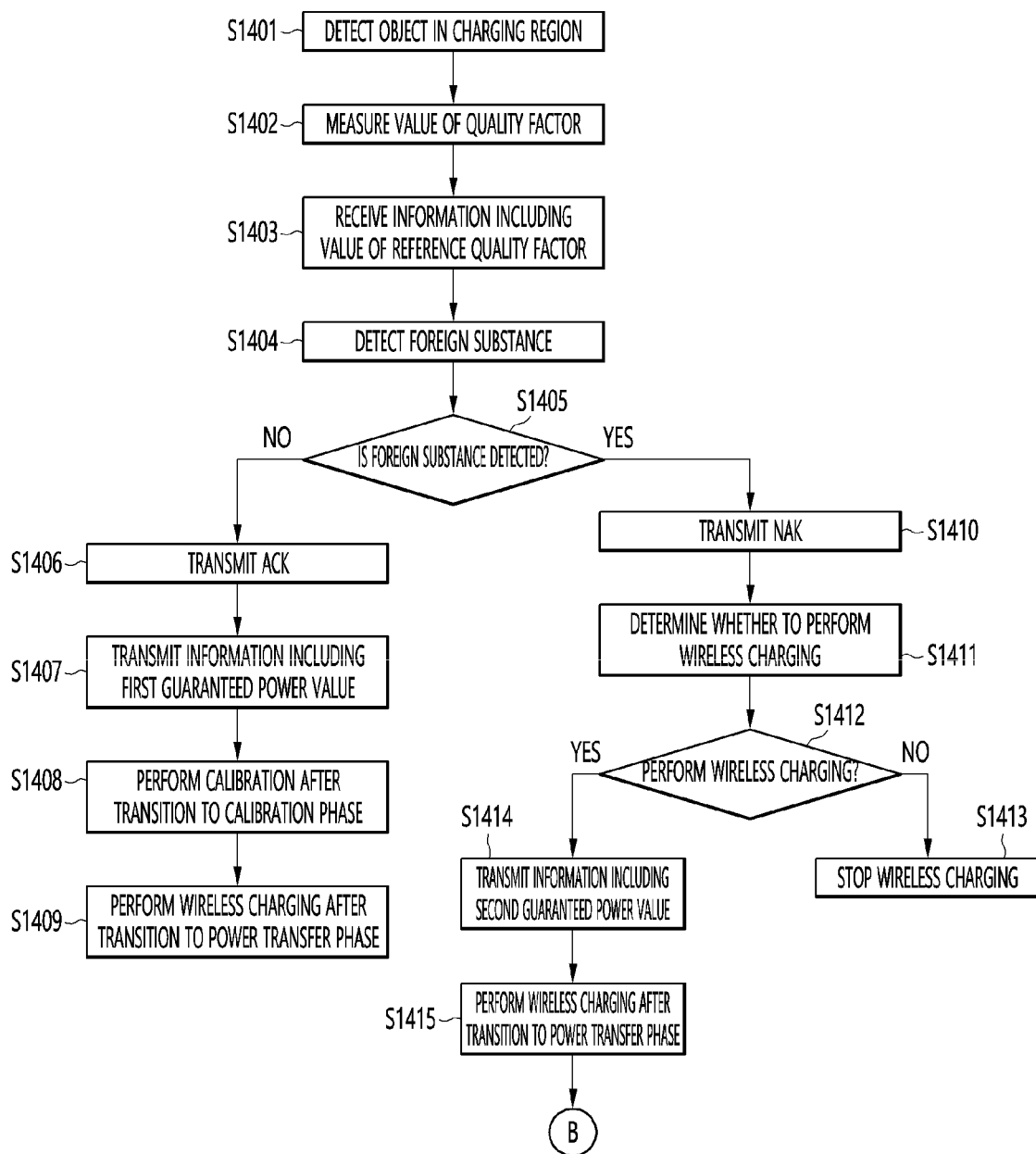
FIGS. 14A and 14B are views for describing a wireless charging method in a wireless power transmitter according to still another embodiment of FIG. 13.
Figure 14B:
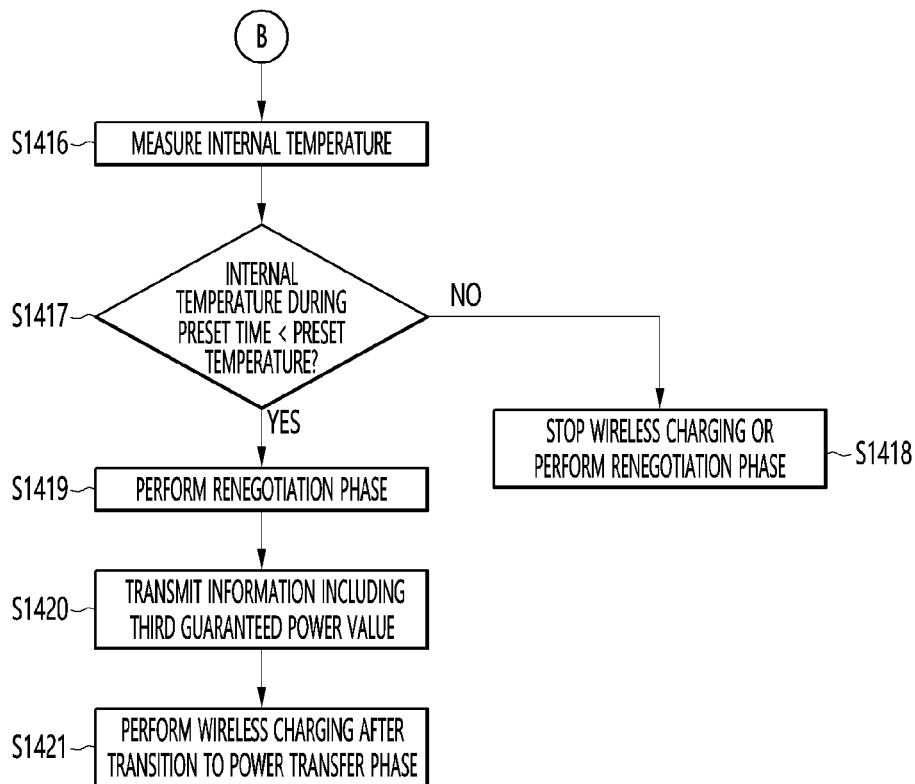
Figure 15A:
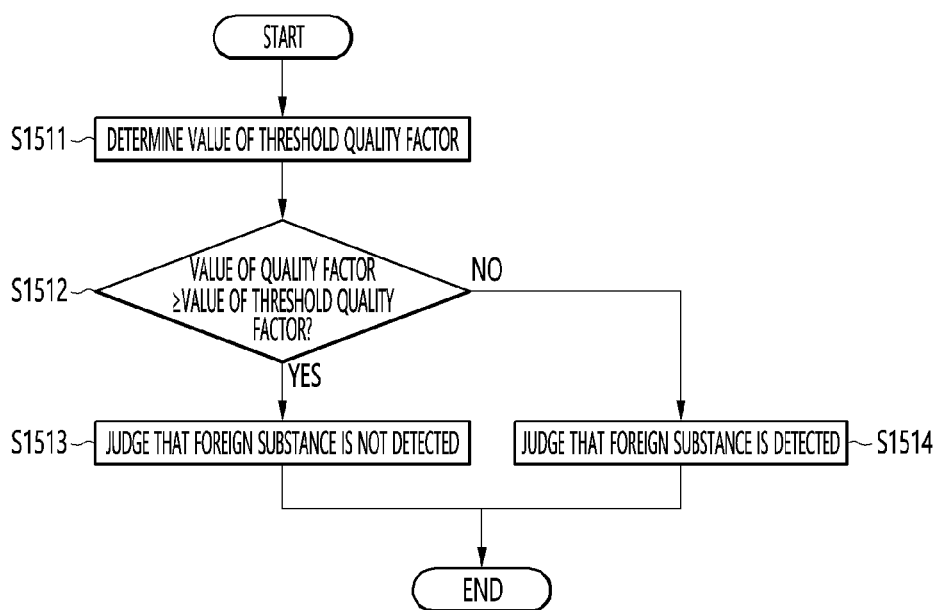
FIG. 15A is a view for describing a foreign object detection method of the wireless charging method of FIG. 14A.
Figure 15B:
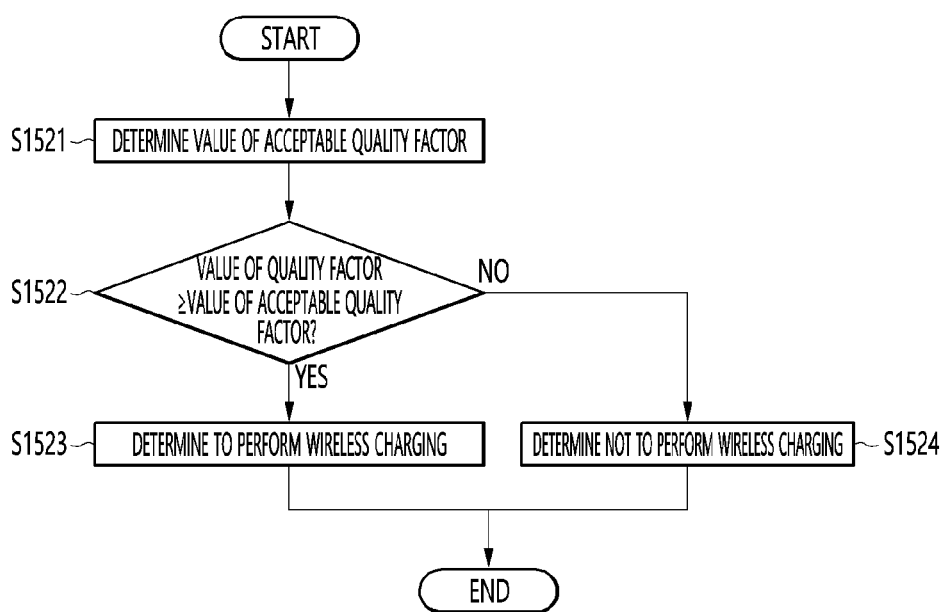
FIG. 15B is a view describing a method of determining whether to perform wireless charging in the wireless charging method of FIG. 14A.

FIGS. 14A and 14B are views for describing a wireless charging method in a wireless power transmitter according to still another embodiment of FIG. 13, FIG. 15A is a view for describing a foreign object detection method of the wireless charging method of FIG. 14A, and FIG. 15B is a view describing a method of determining whether to perform wireless charging in the wireless charging method of FIG. 14A.

Referring to FIGS. 14A and 14B, the wireless charging method in the wireless power transmitter may include sensing an object in a charging region (S1401). More specifically, the wireless power transmitter may sense the object based on a change in current of a transmission coil by transmitting an analog ping.

The wireless charging method in the wireless power transmitter may include measuring a quality factor value before a ping phase (S1402). As an example, the wireless power transmitter may measure the quality factor value using a sensor in a selection phase.

The wireless charging method in the wireless power transmitter may include receiving information including a reference quality factor value (S1403). More specifically, the wireless power transmitter may receive an FOD status packet including the reference quality factor value.

The wireless charging method in the wireless power transmitter may include detecting a foreign object (S1404 to S1405) using the measured quality factor value and reference quality factor value. As an example, as shown in FIG. 15A, the detecting of the foreign object may include determining a threshold quality factor value (S1511). More specifically, the wireless power transmitter may calculate the threshold quality factor value using the received reference quality factor value. The wireless power transmitter may determine a value less than at least 10% in the reference quality factor value as a threshold quality factor value. 10% is a tolerance of the reference quality factor value, and when a foreign object is present, the foreign object may be detected by using that a measured quality factor value which is at least the tolerance or more becomes smaller than the reference quality factor value. In addition, the detecting of the foreign object detection may include determining whether the measured quality factor value is greater than or equal to the threshold quality factor value (S1512). When the measured quality factor value is greater than or equal to the threshold quality factor value, the wireless power transmitter may determine that the foreign object is not detected (S1513). Further, when the measured quality factor value is less than the threshold quality factor value, the wireless power transmitter may determine that the foreign object is detected (S1514).

The wireless charging method in the wireless power transmitter may transmit an ACK to the wireless power receiver when it is determined that the foreign object is not detected (S1406). That is, the wireless power transmitter may transmit an ACK packet to the wireless power receiver in response to receiving the FOD status packet.

The wireless charging method in the wireless power transmitter may include transmitting information including a first guaranteed power value to the wireless power transmitter when the ACK is transmitted (S1407). In this case, the wireless power transmitter may execute a power transmission contract based on the first guaranteed power value with the wireless power receiver. As an example, the first guaranteed power value may be greater than 5 W.

The wireless charging method in the wireless power transmitter may include performing calibration after transition to a calibration phase (S1408) when information including the first guaranteed power value is transmitted. As an example, in performing the calibration, the wireless power transmitter may predict power loss by using the received power value of the wireless power receiver of the received power packet and the measured transmission power value. In addition, in performing the calibration, the wireless power transmitter may increase strength of the transmission power by using the predicted power loss value.

The wireless charging method in the wireless power transmitter may include performing wireless charging with the first guaranteed power by transitioning to a power transfer phase after performing the calibration (S1409). In this case, the performing of wireless charging with the first guaranteed power may refer to performing wireless charging according to the guaranteed power value according to the executed power transmission contract based on the first guaranteed power value.

The wireless charging method in the wireless power transmitter may transmit the NAK to the wireless power receiver when it is determined that a foreign object is not detected in S1706 (S1410). That is, the wireless power transmitter may transmit the NAK packet to the wireless power receiver in response to receiving the FOD status packet.

The wireless charging method in the wireless power transmitter may include determining whether to perform wireless charging (S1411 to S1412) when transmitting the NAK. As an example, as shown in FIG. 15B, the determining of whether to perform wireless charging may include determining an acceptable quality factor value (S1521). More specifically, the wireless power transmitter may calculate the acceptable quality factor value using the determined threshold quality factor value. As an example, as shown in FIG. 7, the wireless power transmitter may determine a value reduced by more than 0% and 20% or less in the threshold quality factor value Qth as an acceptable quality factor value Qp. More specifically, the wireless power transmitter may determine a value reduced by 20% in the threshold quality factor value as the acceptable quality factor value. The determining of whether to perform wireless charging may include determining whether the measured quality factor value is greater than or equal to the determined acceptable quality factor value (S1522). When the measured quality factor value is greater than or equal to the acceptable quality factor value, the wireless power transmitter may determine to perform wireless charging (S1523). In addition, when the measured quality factor value is less than the acceptable quality factor value, the wireless power transmitter may determine that wireless charging is not performed (S1524). For example, as shown in FIG. 8, when a frequency of the transmission power is a first frequency, the quality factor measured in the wireless power transmitter may be a first quality factor value Q1, a second quality factor value Q2, and a third quality factor value Q3. When measured as the first quality factor value Q1, since there is a very high probability that a foreign object is not present between the wireless power transmitter and the wireless power receiver, it is possible to determine that the foreign object is not present. When measured as the third quality factor value Q3, since the third quality factor value Q3 is very lower than the threshold quality factor value Qth, and there is a very high probability that the foreign object is present between the wireless power transmitter and the wireless power receiver, it is possible to determine that the foreign object is present. When measured as the second quality factor value Q2, since the second quality factor value Q2 is between the threshold quality factor value Qth and the acceptable quality factor value Qp, it may be misrecognized that the foreign object is present between the wireless power transmitter and the wireless power receiver. In order to prevent this, the wireless power transmitter may perform wireless charging when the measured quality factor value is greater than or equal to the acceptable quality factor value. Thereafter, the wireless power transmitter may determine again whether to stop wireless charging based on the internal temperature in S1417. Therefore, the wireless power transmitter may determine to perform wireless charging when the quality factor value is greater than or equal to the acceptable quality factor value. Accordingly, still another embodiment may accurately determine the foreign object. In addition, still another embodiment may accurately determine the foreign object to prevent a heat generation phenomenon, a reduction phenomenon in charging efficiency, a loss of power consumption. In addition, still another embodiment may solve a problem that the wireless charging is not performed by erroneously recognizing that a foreign object is present in the related art.

The wireless charging method in the wireless power transmitter may include stopping wireless charging (S1413) when it is determined that the wireless power transmitter does not perform wireless charging. More specifically, in this case, the wireless power transmitter may transition to the selection phase after a predetermined time has passed in the negotiation phase.

The wireless charging method in the wireless power transmitter may include transmitting information including a second guaranteed power value to the wireless power receiver (S1414) when it is determined that wireless charging is to be performed. In this case, the wireless power transmitter may have the power transmission contract based on the second guaranteed power value with the wireless power receiver. As an example, the first guaranteed power value may be greater than the second guaranteed power value. In particular, the second guaranteed power value may be a minimum guaranteed power strength of the wireless power transmitter. As another example, the second guaranteed power value may be 5 W or less.

The wireless charging method in the wireless power transmitter may include performing wireless charging with the second guaranteed power by transitioning to a power transfer phase (S1415) without a calibration phase when information including the second guaranteed power value is transmitted. In this case, the performing of wireless charging with the second guaranteed power may refer to performing wireless charging according to the guaranteed power value according to the executed power transmission contract based on the second guaranteed power value.

The following is an example of foreign object detection in a power transfer phase after a foreign object is detected before the power transfer phase. When it is determined that the foreign object is present, heat generation may be further caused by the foreign object, and thus overheat protection means needs to be strengthened. Alternatively, since the foreign object may absorb a large amount of power, it is possible to detect the foreign object by comparing a preset power loss value with a difference between power received by the receiver and transmission power. At this time, the preset power loss value may be smaller than a power loss threshold value in a state in which it is determined that the foreign object is present.

For the enhanced overheat protection means, the wireless charging method in the wireless power transmitter may include measuring a temperature of the wireless power transmitter such as a charging region (S1416). The temperature of the wireless power transmitter may refer to a surface temperature or a temperature sensed by a sensor in the transmitter.

The wireless charging method in the wireless power transmitter may include the determining of whether an internal temperature measured for a preset period is less than a preset temperature (S1417). The preset period and the preset temperature may be stored values.

The wireless charging method in the wireless power transmitter may include stopping wireless charging when the internal temperature is greater than or equal to the preset temperature for the preset period (S1418). More specifically, in this case, the wireless power transmitter may transition to the selection phase after a predetermined time has passed in the power transfer phase. That is, the wireless power transmitter stops wireless charging by determining that a foreign object is present when the internal temperature is greater than or equal to the preset temperature for the preset period. Alternatively, renegotiation may be performed to lower transmission power. As an example, the wireless power transmitter may transmit an NAK packet to the wireless power receiver in response to the received power packet, and then the wireless power transmitter may transmit a renegotiation packet to the wireless power transmitter to perform the renegotiation phase. That is, the wireless power transmitter may decrease transmission power strength by determining that a foreign object is present when the internal temperature is greater than or equal to the preset temperature for the preset period.

The wireless charging method in the wireless power transmitter may include performing a renegotiation phase when the internal temperature is less than the preset temperature for the preset period (S1419). As an example, the wireless power transmitter may transmit an NAK packet to the wireless power receiver in response to the received power packet, and then the wireless power transmitter may transmit a renegotiation packet to the wireless power transmitter to perform the renegotiation phase. That is, the wireless power transmitter may increase transmission power strength by determining that a foreign object is not present when the internal temperature is less than the preset temperature for the preset period.

The wireless charging method in the wireless power transmitter may include transmitting information including a third guaranteed power value to the wireless power receiver when transitioning to the renegotiation phase (S1420). In this case, the wireless power transmitter may execute a power transmission contract based on the third guaranteed power value with the wireless power receiver. As an example, the third guaranteed power value may be greater than the second guaranteed power value. As another example, the third guaranteed power value may be greater than 5 W.

The wireless charging method in the wireless power transmitter may include performing wireless charging with the third guaranteed power by transitioning to the power transfer phase (S1421). In this case, the performing of wireless charging with the third guaranteed power may refer to performing wireless charging according to the guaranteed power value according to the power transmission contract based on the third guaranteed power value. Accordingly, the wireless power transmitter protects a system by lowering the transmission power strength by determining that a foreign object has been detected in the negotiation phase, but it is possible to increases wireless charging efficiency by increasing the transmission power strength by determining that the foreign object is not detected finally in the power transfer phase.

In still another embodiment, in transmitting the NAK (s1410), the wireless power receiver may request a minimum power required for the receiver to charge a battery to the transmitter (negotiation phase).

In addition, when it is determined that a foreign object is not present after a predetermined time has passed, the receiver may increase the guaranteed power through renegotiation.

FIG. 16 is a view for describing a wireless charging method on a wireless charging system according to still another embodiment.

Referring to FIG. 16, a wireless power transmitter 1610 may transmit an analog ping to a wireless power receiver 1620 in a selection phase (S1601).

The wireless power transmitter 1610 may measure a quality factor value before a ping phase (S1602). As an example, the wireless power transmitter 1610 may measure the quality factor value in the selection phase (S1602).

The wireless power transmitter 1610 may transition from the selection phase to the ping phase when an object is detected. The wireless power transmitter 1610 activates the wireless power receiver 1620, and may transmit a digital ping in order to identify whether a receiver is the wireless power receiver 1620 (S1603). The wireless power receiver 1620 may transmit a signal strength packet in response to the digital ping (S1604).

When the ping phase is completed, in an identification and configuration phase, the wireless power receiver 1620 may transmit an identification packet for informing identification information and a configuration packet for informing configuration information (S1605 to S1606). When a negotiation field value of the configuration packet is a value indicating to perform a negotiation phase, the wireless power transmitter 1610 and the wireless power receiver 1620 may transition to the negotiation phase.

In the negotiation phase, the wireless power receiver 1620 may transmit an FOD status packet for FO detection (S1607). The FOD status packet may include a reference quality factor value.

The wireless power transmitter 1610 may check whether a received reference quality factor value is less than a preset quality factor value (for example, 50) (S1608). When the reference quality factor value is less than a preset quality factor value, a step according to performing first foreign object detection may be performed. When the reference quality factor value is greater than or equal to the preset quality factor value, a step according to performing second foreign object detection may be performed. That is, as the reference quality factor value becomes lower to be less than the preset quality factor value, an error in foreign object detection using the quality factor value may be large. On the other hand, when the reference quality factor value is greater than or equal to the preset quality factor value, the error in foreign object detection using the quality factor value may be small. Therefore, it is possible to further increase accuracy of foreign object detection and reduce unnecessary power consumption by making each step of a wireless power transmission method to be different after detecting the foreign object according to a size of the reference quality factor value. The method for wireless power transmission after detecting foreign objects according to the size of the reference quality factor value follows descriptions of FIGS. 17A and 17B.

When the reference quality factor value is less than the preset quality factor value, the wireless power transmitter 1610 may perform the first foreign object detection (S1609). In the first foreign object detection, the foreign object may be detected using a measured quality factor value and information of a received FOD status packet. The first foreign object detection follows descriptions of the wireless charging method of FIGS. 17A and 15A.

The wireless power transmitter 1610 may transmit an NAK to the wireless power receiver 1620 in response to the FOD status packet when it is determined that a foreign object is present after performing the first foreign object detection (S1610). Conversely, the wireless power transmitter 1610 may transmit an ACK to the wireless power receiver 1620 in response to the FOD status packet when it is determined that the foreign object is not present after performing the first foreign object detection.

When the NAK is transmitted, the wireless power transmitter 1610 may determine whether to perform wireless charging (S1611). The determination of whether to perform wireless charging may use the measured quality factor value and the information of the received FOD status packet. The determination of whether to perform wireless charging follows descriptions of the wireless charging methods of FIGS. 16A and 15B. On the other hand, when the wireless power transmitter 1610 transmits the NAK after the second foreign object detection, the wireless charging may be stopped without determining whether to perform wireless charging.

As another example, when the reference quality factor value is less than the preset quality factor value of the wireless power transmitter, wireless charging may be stopped. In addition, when the reference quality factor value is greater than or equal to the preset quality factor value of the wireless power transmitter, the first foreign object detection may be performed.

The wireless power receiver 1620 may transmit a general request packet requesting a power transmitter capability packet for a power transmission contract (S1612).

When the wireless power transmitter 1610 determines to perform wireless charging after transmitting the NAK, the wireless power transmitter 1610 may transmit the power transmitter capability packet in response to the general request packet (S1613). In this case, a guaranteed power of the power transmitter capability packet may be a second guaranteed power value. Conversely, when the wireless power transmitter 1610 transmits the ACK in S1610, the guaranteed power of the power transmitter capability packet may be a first guaranteed power value. As an example, the first guaranteed power value may be greater than the second guaranteed power value. In particular, the second guaranteed power value may be a minimum guaranteed power strength of the wireless power transmitter 1610. As another example, the first guaranteed power value may be greater than 5 W and 15 W or less. The second guaranteed power value may be 5 W or less.

The wireless power receiver 1620 may transmit a specific request packet for proposing a guaranteed power value of the power transmission contract based on the second guaranteed power value of the power transmitter capability packet (S1614). It should be noted that the second guaranteed power of the power transmitter capability packet and the guaranteed power of the power transmission contract may be distinguished. For example, the wireless power receiver 1620 may request the guaranteed power value of the power transmission contract to a value equal to or less than the second guaranteed power value of the power transmitter capability packet. For convenience of description, the wireless power receiver 1620 requests the guaranteed power value of the power transmission contract as the same value as the second guaranteed power value of the power transmitter capability packet. The wireless power transmitter 1610 may transmit an ACK packet in response to a specific request packet for requesting the guaranteed power value of the power transmission contract (S1615). That is, the wireless power transmitter 1610 is in a case in which the guaranteed power value of the power transmission contract proposed by the wireless power receiver is accepted. That is, the power transmission contract may be completed to the second guaranteed power value. Thereafter, when the power transmission contract is completed, the wireless power receiver 1620 may transmit a specific request packet for ending the negotiation phase (S1616). The wireless power transmitter 1610 may transmit the ACK packet in response to the specific request packet for ending the negotiation phase (S1617). That is, the wireless power transmitter 1610 may transmit the ACK packet upon acceptance of the end of the negotiation phase.

The wireless power transmitter 1610 may measure an internal temperature in the wireless power transmitter such as a charging region after transition to a power transfer phase (S1618). In particular, when the NAK is transmitted in response to the FOD status packet in the negotiation phase, the wireless power transmitter 1610 may transition to the power transfer phase rather than a calibration phase after ending of the negotiation phase.

The wireless power transmitter 1610 may determine whether to increase transmission power strength (S1619). The determination of the increase in transmit power intensity may use the measured internal temperature, a stored preset period and preset temperature. The determination of the increase in the transmission power strength follows a description of the wireless charging method of FIG. 17B. When the wireless power transmitter 1610 determines to increase the transmission power strength, a renegotiation phase may be performed. More specifically, the wireless power receiver 1620 may transmit the received power packet to the wireless power transmitter 1610 (S1620). In this case, the received power packet may be a received power packet of 24 bits. When the wireless power transmitter 1610 determines to increase the transmission power strength, the wireless power transmitter 1610 may transmit the NAK packet in response to the received power packet (S1621). Thereafter, the wireless power transmitter 1610 may receive a renegotiation packet and transmit the ACK packet that accepts the transition to the renegotiation phase (S1622 to S1623). The wireless power receiver 1620 may transmit the general request packet requesting the power transmitter capability packet (S1624). The wireless power transmitter 1610 may transmit the power transmitter capability packet in response to the general request packet (S1625). In this case, the guaranteed power of the power transmitter capability packet may be a third guaranteed power value. As an example, the third guaranteed power value may be greater than the second guaranteed power value. As another example, the third guaranteed power value may be greater than 5 W and 15 W or less. The wireless power receiver 1620 may transmit the specific request packet for proposing a guaranteed power value of the power transmission contract based on the third guaranteed power value of the power transmitter capability packet (S1626). It should be noted that the guaranteed power of the power transmitter capability packet and the guaranteed power of the power transmission contract may be distinguished. For example, the wireless power receiver 1620 may propose the guaranteed power value of the power transmission contract to a value equal to or less than the third guaranteed power value of the power transmitter capability packet. For convenience of description, the wireless power receiver 1620 proposes the guaranteed power value of the power transmission contract as the same value as the third guaranteed power value of the power transmitter capability packet. The wireless power transmitter 1610 may transmit an ACK packet in response to a specific request packet for proposing a guaranteed power value of the power transmission contract (S1627). That is, the wireless power transmitter 1610 is in a case in which the guaranteed power value of the power transmission contract proposed by the wireless power receiver is accepted. That is, the power transmission contract may be completed to the third guaranteed power value. Thereafter, when the power transmission contract is completed, the wireless power receiver 1620 may transmit a specific request packet for ending the renegotiation phase (S1628). The wireless power transmitter 1610 may transmit the ACK packet in response to the specific request packet for ending the renegotiation phase (S1628). That is, the wireless power transmitter 1610 may transmit the ACK packet upon acceptance of the end of the negotiation phase. The wireless power transmitter 1610 and the wireless power receiver 1620 may transition to the power transfer phase to perform wireless charging with the third guaranteed power.

Therefore, the wireless charging system according to the embodiment may provide a wireless charging method and an apparatus and system therefor. In addition, the wireless charging system according to the embodiment may determine a foreign object accurately. Further, the wireless charging system according to the embodiment may accurately determine a foreign object to prevent a heat generation phenomenon, a decrease in charging efficiency, and a loss of power consumption.

Figure 17A:
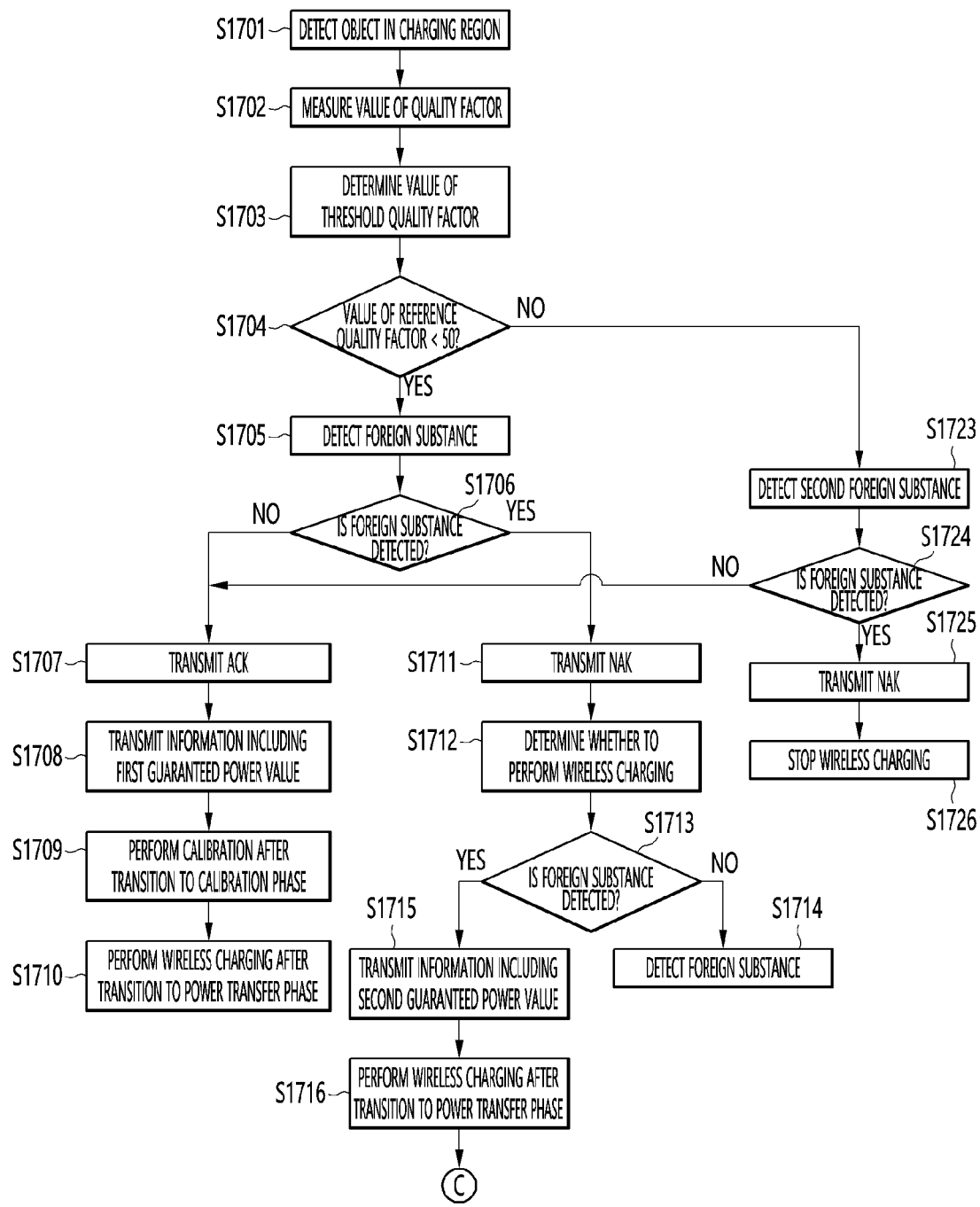
FIGS. 17A and 17B are views for describing a wireless charging method in a wireless power transmitter according to still another embodiment of FIG. 16.
Figure 17B:
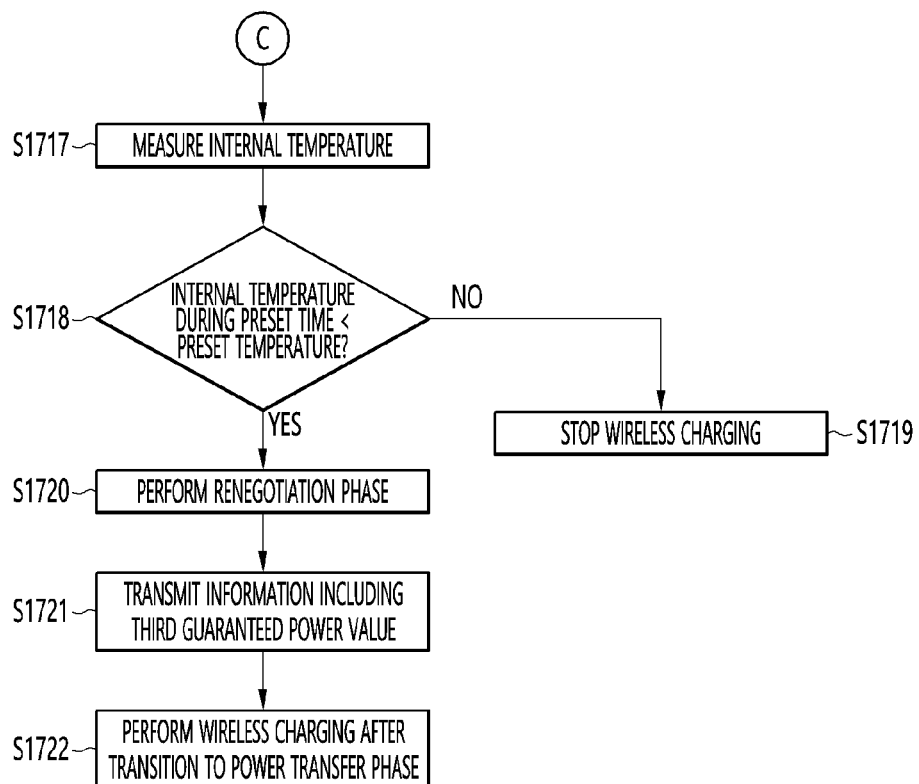

FIGS. 17A and 17B are views for describing a wireless charging method in a wireless power transmitter according to still another embodiment of FIG. 16.

Referring to FIGS. 17A and 17B, the wireless charging method in the wireless power transmitter may include sensing an object in a charging region (S1701). More specifically, the wireless power transmitter may sense the object based on a change in current of a transmission coil by transmitting an analog ping.

The wireless charging method in the wireless power transmitter may include measuring a quality factor value before a ping phase (S1702). As an example, the wireless power transmitter may measure the quality factor value using a sensor in a selection phase.

The wireless charging method in the wireless power transmitter may include receiving information including a reference quality factor value (S1703). More specifically, the wireless power transmitter may receive an FOD status packet including the reference quality factor value. As an example, the wireless power transmitter may receive the FOD status packet using a communication unit in a negotiation phase. The reference quality factor value is a quality factor value stored in a wireless power receiver and may be a quality factor value measured in a specific coil unit.

The wireless charging method in the wireless power transmitter may include determining whether the reference quality factor value is less than a preset quality factor value (for example, 50) (S1704). When the reference quality factor value is less than the preset quality factor value, a step according to performing first foreign object detection may be performed. When the reference quality factor value is greater than or equal to the preset quality factor value, a step according to performing second foreign object detection may be performed. That is, as the reference quality factor value becomes lower to be less than the preset quality factor value (for example, 50), an error in foreign object detection using the quality factor value may be large. On the other hand, when the reference quality factor value is greater than or equal to the preset quality factor value, the error in foreign object detection using the quality factor value may be small. Therefore, it is possible to further increase accuracy of foreign object detection and reduce unnecessary power consumption by making each step of a wireless power transmission method to be different after detecting the foreign object according to a size of the reference quality factor value.

The wireless charging method in the wireless power transmitter may include detecting the first foreign object using a measured quality factor value and the reference quality factor value when the reference quality factor value is less than the preset quality factor value (S1705 to S1706).

As another example, when the reference quality factor value is less than the preset quality factor value of the wireless power transmitter, wireless charging may be stopped. When the reference quality factor value is greater than or equal to the preset quality factor value of the wireless power transmitter, the first foreign object detection may be performed.

As another example, the wireless power transmitter may modulate a positive acknowledge (ACK) signal, a negative acknowledge (NAK) signal, not defined (ND) signal, and a caution (warning) signal to transmit to the wireless power receiver in response to a foreign object detection status packet. The ACK signal is a response signal for continuing a wireless charging procedure when there is no foreign object. The NAK signal may be a response signal for stopping the wireless charging procedure as it is determined that a foreign object is present. The caution signal may be used when it is difficult to determine whether a foreign object is present. When it is difficult to determine whether the foreign object is present, it may be a case that the reference quality factor value of the wireless power receiver is less than the preset value (for example, 50). When a change in the quality factor is reduced by a friendly metal (a phenomenon in which the quality factor damping due to electric power leakage is obscured), it may be difficult to determine whether a foreign object is present only by comparing the reference quality factor value and the measured quality factor value. At this time, the caution signal is transmitted, and foreign object detection based on power loss may be performed while charging with a minimum guaranteed power.

As another example, the caution signal and the NAK signal may be used according to threshold levels of two reference quality factor values. When the reference quality factor value received from the wireless power receiver is between a preset first threshold quality factor value and a preset second threshold quality factor value (less than a first threshold value), first foreign object detection is performed, and when it is determined that a foreign object is present as a result of performing the first foreign object detection, the caution signal may be transmitted. When the received reference quality factor value is smaller than the second threshold quality factor value, the NAK signal may be transmitted.

As an example, as shown in FIG. 15A, the detecting of the foreign object may include determining a threshold quality factor value (S1511). More specifically, the wireless power transmitter may calculate the threshold quality factor value using the received reference quality factor value. The wireless power transmitter may determine a value less than at least 10% in the reference quality factor value as a threshold quality factor value. 10% is a tolerance of the reference quality factor value, and when a foreign object is present, the foreign object may be detected by using that a measured quality factor value which is at least the tolerance or more becomes smaller than the reference quality factor value. In addition, the detecting of the foreign object detection may include determining whether the measured quality factor value is greater than or equal to the threshold quality factor value (S1512). When the measured quality factor value is greater than or equal to the threshold quality factor value, the wireless power transmitter may determine that the foreign object is not detected (S1513). Further, when the measured quality factor value is less than the threshold quality factor value, the wireless power transmitter may determine that the foreign object is detected (S1514).

The wireless charging method in the wireless power transmitter may transmit an ACK to the wireless power receiver when it is determined that the foreign object is not detected in the first foreign object detection (S1707). That is, the wireless power transmitter may transmit an ACK packet to the wireless power receiver in response to receiving the FOD status packet.

The wireless charging method in the wireless power transmitter may include transmitting information including a first guaranteed power value to the wireless power transmitter when the ACK is transmitted (S1708). In this case, the wireless power transmitter may execute a power transmission contract based on the first guaranteed power value with the wireless power receiver. As an example, the first guaranteed power value may be greater than 5 W and 15 W or less.

The wireless charging method in the wireless power transmitter may include performing calibration after transition to a calibration phase (S1709) when information including the first guaranteed power value is transmitted. As an example, in performing the calibration, the wireless power transmitter may predict power loss by using the received power value of the wireless power receiver of the received power packet and the measured transmission power value. In addition, in performing the calibration, the wireless power transmitter may increase strength of the transmission power by using the predicted power loss value.

The wireless charging method in the wireless power transmitter may include performing wireless charging with the first guaranteed power by transitioning to a power transfer phase after performing the calibration (S1710). In this case, the performing of wireless charging with the first guaranteed power may refer to performing wireless charging according to the guaranteed power value according to the executed power transmission contract based on the first guaranteed power value.

The wireless charging method in the wireless power transmitter may transmit the NAK to the wireless power receiver when it is determined that a foreign object is not detected in S1706 (S1711). That is, the wireless power transmitter may transmit the NAK packet to the wireless power receiver in response to receiving the FOD status packet.

The wireless charging method in the wireless power transmitter may include determining whether to perform wireless charging (S1712 to S1713) when transmitting the NAK in S1711. As an example, as shown in FIG. 15B, the determining of whether to perform wireless charging may include determining an acceptable quality factor value (S1521). More specifically, the wireless power transmitter may calculate the acceptable quality factor value using the determined threshold quality factor value. As an example, as shown in FIG. 7, the wireless power transmitter may determine a value reduced by more than 0% and 20% or less in the threshold quality factor value Qth as an acceptable quality factor value Qp. More specifically, the wireless power transmitter may determine a value reduced by 20% in the threshold quality factor value as the acceptable quality factor value. The determining of whether to perform wireless charging may include determining whether the measured quality factor value is greater than or equal to the determined acceptable quality factor value (S1522). When the measured quality factor value is greater than or equal to the acceptable quality factor value, the wireless power transmitter may determine to perform wireless charging (S1523). In addition, when the measured quality factor value is less than the acceptable quality factor value, the wireless power transmitter may determine that wireless charging is not performed (S1524). For example, as shown in FIG. 8, when a frequency of the transmission power is a first frequency, the quality factor measured in the wireless power transmitter may be a first quality factor value Q1, a second quality factor value Q2, and a third quality factor value Q3. When measured as the first quality factor value Q1, since there is a very high probability that a foreign object is not present between the wireless power transmitter and the wireless power receiver, it is possible to determine that the foreign object is not present. When measured as the third quality factor value Q3, since the third quality factor value Q3 is very lower than the threshold quality factor value Qth, and there is a very high probability that the foreign object is present between the wireless power transmitter and the wireless power receiver, it is possible to determine that the foreign object is present. When measured as the second quality factor value Q2, since the second quality factor value Q2 is between the threshold quality factor value Qth and the acceptable quality factor value Qp, it may be misrecognized that the foreign object is present between the wireless power transmitter and the wireless power receiver. In order to prevent this, the wireless power transmitter may perform wireless charging when the measured quality factor value is greater than or equal to the acceptable quality factor value. Thereafter, the wireless power transmitter may determine again whether to stop wireless charging based on the internal temperature in S1718. Therefore, the wireless power transmitter may determine to perform wireless charging when the quality factor value is greater than or equal to the acceptable quality factor value. Accordingly, still another embodiment may accurately determine the foreign object. In addition, still another embodiment may accurately determine the foreign object to prevent a heat generation phenomenon, a reduction phenomenon in charging efficiency, a loss of power consumption. In addition, still another embodiment may solve a problem that the wireless charging is not performed by erroneously recognizing that a foreign object is present in the related art.

The wireless charging method in the wireless power transmitter may include stopping wireless charging (S1714) when it is determined that the wireless power transmitter does not perform wireless charging. More specifically, in this case, the wireless power transmitter may transition to the selection phase after a predetermined time has passed in the negotiation phase.

The wireless charging method in the wireless power transmitter may include transmitting information including a second guaranteed power value to the wireless power receiver (S1715) when it is determined that wireless charging is to be performed. In this case, the wireless power transmitter may have the power transmission contract based on the second guaranteed power value with the wireless power receiver. As an example, the first guaranteed power value may be greater than the second guaranteed power value. In particular, the second guaranteed power value may be a minimum guaranteed power strength of the wireless power transmitter. As another example, the second guaranteed power value may be 5 W or less.

The wireless charging method in the wireless power transmitter may include performing wireless charging with the second guaranteed power by transitioning to a power transfer phase (S1716) without a calibration phase when information including the second guaranteed power value is transmitted. In this case, the performing of wireless charging with the second guaranteed power may refer to performing wireless charging according to the guaranteed power value according to the executed power transmission contract based on the second guaranteed power value.

The wireless charging method in the wireless power transmitter may include measuring an internal temperature in the wireless power transmitter such as a charging region (S1717).

The wireless charging method in the wireless power transmitter may include determining whether the internal temperature is less than a preset temperature for a preset period (S1718). The preset period and the preset temperature may be a stored value.

The wireless charging method in the wireless power transmitter may include stopping wireless charging when the internal temperature is greater than or equal to the preset temperature for the preset period (S1719). More specifically, in this case, the wireless power transmitter may transition to the selection phase after a predetermined time has passed in the power transfer phase. That is, the wireless power transmitter stops wireless charging by determining that a foreign object is present when the internal temperature is greater than or equal to the preset temperature for the preset period.

The wireless charging method in the wireless power transmitter may include performing a renegotiation phase when the internal temperature is less than the preset temperature for the preset period (S1720). As an example, the wireless power transmitter may transmit an NAK packet to the wireless power receiver in response to the received power packet, and then the wireless power transmitter may transmit a renegotiation packet to the wireless power transmitter to perform the renegotiation phase. That is, the wireless power transmitter may increase transmission power strength by determining that a foreign object is not present when the internal temperature is less than the preset temperature for the preset period.

The wireless charging method in the wireless power transmitter may include transmitting information including a third guaranteed power value to the wireless power receiver when transitioning to the renegotiation phase (S1721). In this case, the wireless power transmitter may execute a power transmission contract based on the third guaranteed power value with the wireless power receiver. As an example, the third guaranteed power value may be greater than the second guaranteed power value. As another example, the third guaranteed power value may be greater than 5 W and 15 W or less. In addition, considering that the NAK is transmitted by the friendly metal, the third guaranteed power value may be less than or equal to the first guaranteed power value.

The wireless charging method in the wireless power transmitter may include performing wireless charging with the third guaranteed power by transitioning to the power transfer phase (S1722). In this case, the performing of wireless charging with the third guaranteed power may refer to performing wireless charging according to the guaranteed power value according to the power transmission contract based on the third guaranteed power value. Accordingly, the wireless power transmitter protects a system by lowering the transmission power strength by determining that a foreign object has been detected in the negotiation phase, but it is possible to increases wireless charging efficiency by increasing the transmission power strength by determining that the foreign object is not detected finally in the power transfer phase.

The wireless charging method in the wireless power transmitter may include detecting the second foreign object (S1723 to S1724) when the reference quality factor value is not less than 50 in S1704. As an example, as shown in FIG. 15A, the detecting of the foreign object may include determining a threshold quality factor value (S1511). More specifically, the wireless power transmitter may calculate the threshold quality factor value using the received reference quality factor value. The wireless power transmitter may determine a value less than at least 10% in the reference quality factor value as a threshold quality factor value. 10% is a tolerance of the reference quality factor value, and when a foreign object is present, the foreign object may be detected by using that a measured quality factor value which is at least the tolerance or more becomes smaller than the reference quality factor value. In addition, the detecting of the foreign object may include determining whether the measured quality factor value is greater than or equal to the threshold quality factor value (S1512). When the measured quality factor value is greater than or equal to the threshold quality factor value, the wireless power transmitter may determine that the foreign object is not detected (S1513). Further, when the measured quality factor value is less than the threshold quality factor value, the wireless power transmitter may determine that the foreign object is detected (S1514).

When it is determined that the foreign object is not detected in the second foreign object detection, the wireless power transmitter may transition to S1707.

The wireless charging method in the wireless power transmitter may transmit an NAK to the wireless power receiver when it is determined that the foreign object is not detected in S1724 (S1725). That is, the wireless power transmitter may transmit the NAK packet to the wireless power receiver in response to receiving the FOD status packet.

The wireless charging method in the wireless power transmitter may include stopping wireless charging (S1726) when the NAK is transmitted in S1725. That is, when the wireless power transmitter transmits the NAK after the second foreign object detection, the wireless charging may be stopped without determining whether to perform the wireless charging. More specifically, in this case, the wireless power transmitter may transition to the selection phase after a predetermined time has passed in the negotiation phase.

Figure 18:
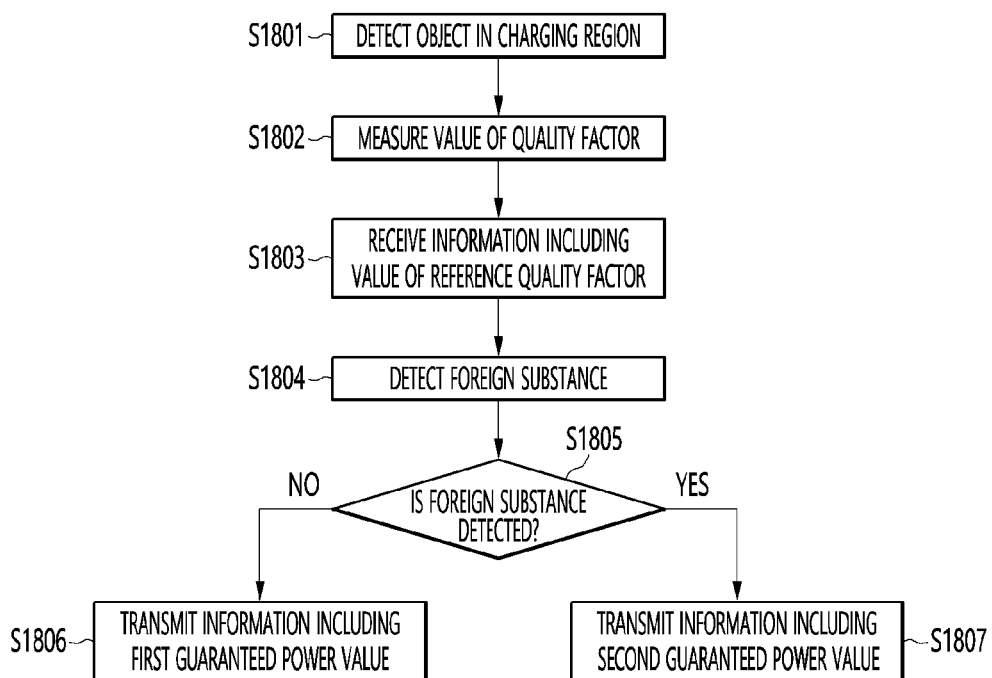
FIG. 18 is a view for describing a wireless charging method in a wireless power transmitter according to still another embodiment.

FIG. 18 is a view for describing a wireless charging method in a wireless power transmitter according to still another embodiment.

Referring to FIG. 18, the wireless charging method in the wireless power transmitter may include sensing an object in a charging region (S1801). More specifically, the wireless power transmitter may sense the object based on a change in current of a transmission coil by transmitting an analog ping.

The wireless charging method in the wireless power transmitter may include measuring a quality factor value before a ping phase (S1802). As an example, the wireless power transmitter may measure the quality factor value using a sensor in a selection phase.

The wireless charging method in the wireless power transmitter may include receiving information including a reference quality factor value (S1803). More specifically, the wireless power transmitter may receive an FOD status packet including the reference quality factor value.

The wireless charging method in the wireless power transmitter may include detecting a foreign object (S1804 to S1805) using the measured quality factor value and reference quality factor value. As an example, as shown in FIG. 15A, the detecting of the foreign object may include determining a threshold quality factor value (S1511). More specifically, the wireless power transmitter may calculate the threshold quality factor value using the received reference quality factor value. The wireless power transmitter may determine a value less than at least 10% in the reference quality factor value as a threshold quality factor value. 10% is a tolerance of the reference quality factor value, and when a foreign object is present, the foreign object may be detected by using that a measured quality factor value which is at least the tolerance or more becomes smaller than the reference quality factor value. In addition, the detecting of the foreign object detection may include determining whether the measured quality factor value is greater than or equal to the threshold quality factor value (S1512). When the measured quality factor value is greater than or equal to the threshold quality factor value, the wireless power transmitter may determine that the foreign object is not detected (S1513). Further, when the measured quality factor value is less than the threshold quality factor value, the wireless power transmitter may determine that the foreign object is detected (S1514).

The wireless charging method in the wireless power transmitter may include transmitting information including a first guaranteed power value to the wireless power transmitter when it is determined that the foreign object is not detected (S1807). In this case, the wireless power transmitter may execute a power transmission contract based on the first guaranteed power value with the wireless power receiver. As an example, the first guaranteed power value may be greater than 5 W. Thereafter, the wireless power transmitter may transition to a power transfer phase to perform wireless charging with the first guaranteed power value. In this case, the performing of wireless charging with the first guaranteed power may refer to performing wireless charging according to the guaranteed power value according to the executed power transmission contract based on the first guaranteed power value.

The wireless charging method in the wireless power transmitter may include transmitting information including a second guaranteed power value to the wireless power receiver when it is determined that a foreign object is detected in S1805 (S1807). In this case, the wireless power transmitter may execute a power transmission contract based on the second guaranteed power value with the wireless power receiver. As an example, the first guaranteed power value may be greater than or equal to the second guaranteed power value. In particular, the second guaranteed power value may be a minimum guaranteed power strength of the wireless power transmitter. As another example, the second guaranteed power value may be 5 W or less. Thereafter, the wireless power transmitter may transition to the power transfer phase without a calibration phase to perform wireless charging with the second guaranteed power. In this case, the performing of wireless charging with the second guaranteed power may refer to performing wireless charging according to the guaranteed power value according to the power transmission contract based on the second guaranteed power value. In addition, when it is determined that a foreign object is not present after a predetermined time has passed, the receiver may increase the guaranteed power through renegotiation.

Figure 19:
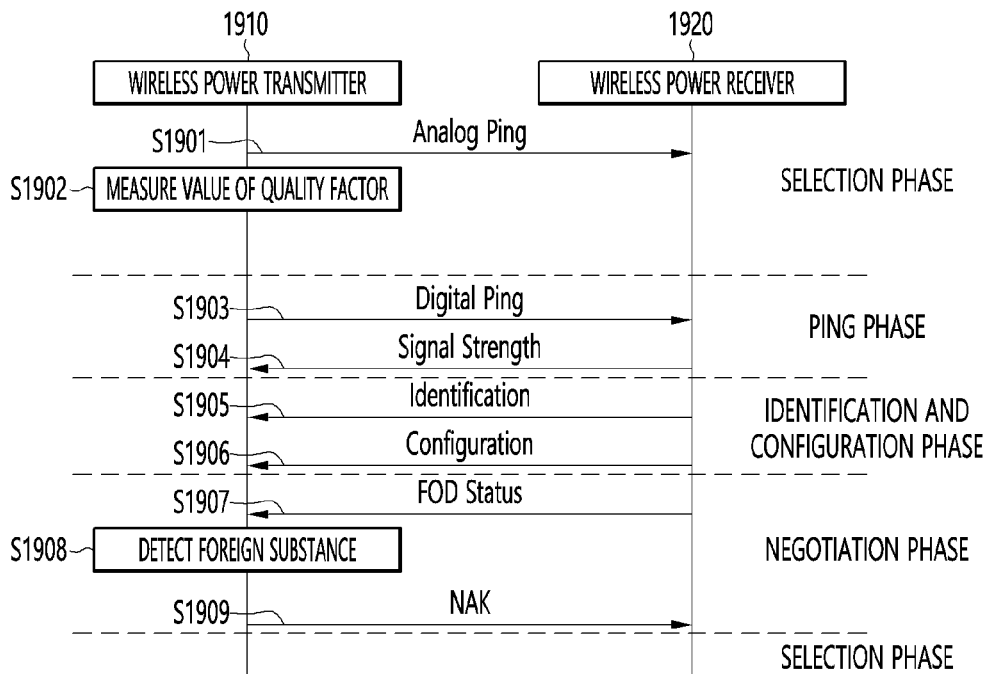
FIG. 19 is view for describing a wireless charging method on a wireless charging system according to still another embodiment.

FIG. 19 is view for describing a wireless charging method on a wireless charging system according to still another embodiment.

Referring to FIG. 19, a wireless power transmitter 1910 may transmit an analog ping to a wireless power receiver 1920 in a selection phase (S1902).

The wireless power transmitter 1910 may measure a quality factor value before a ping phase (S1602). As an example, the wireless power transmitter 1910 may measure the quality factor value in the selection phase.

The wireless power transmitter 1910 may transition from the selection phase to the ping phase when an object is detected. The wireless power transmitter 1910 activates the wireless power receiver 1920, and may transmit a digital ping in order to identify whether a receiver is the wireless power receiver 1920 (S1903). The wireless power receiver 1920 may transmit a signal strength packet in response to the digital ping (S1904).

When the ping phase is completed, in an identification and configuration phase, the wireless power receiver 1920 may transmit an identification packet for informing identification information and a configuration packet for informing configuration information (S1905 to S1906). When a negotiation field value of the configuration packet is a value indicating to perform a negotiation phase, the wireless power transmitter 1910 and the wireless power receiver 1920 may transition to the negotiation phase.

In the negotiation phase, the wireless power receiver 1920 may transmit an FOD status packet for FO detection (S1907). The FOD status packet may include a reference quality factor value.

The wireless power transmitter 1910 may perform foreign object detection (S1908). The foreign object detection may detect a foreign object by using a measured quality factor value and information of the received FOD state packet. The foreign object detection follows the description of the wireless charging method of FIG. 20

The wireless power transmitter 1910 may transmit an NAK to the wireless power receiver 1920 in response to the FOD status packet when it is determined that a foreign object is present after performing foreign object detection (S1909). Conversely, the wireless power transmitter 1910 may transmit an ACK to the wireless power receiver 1920 in response to the FOD status packet when it is determined that the foreign object is not present after performing the first foreign object detection. In addition, the wireless power transmitter 1910 may stop wireless charging when it is determined that a foreign object is present. That is, the wireless power transmitter 1910 may transition to the selection phase after a predetermined time has passed in the negotiation phase.

Figure 20:
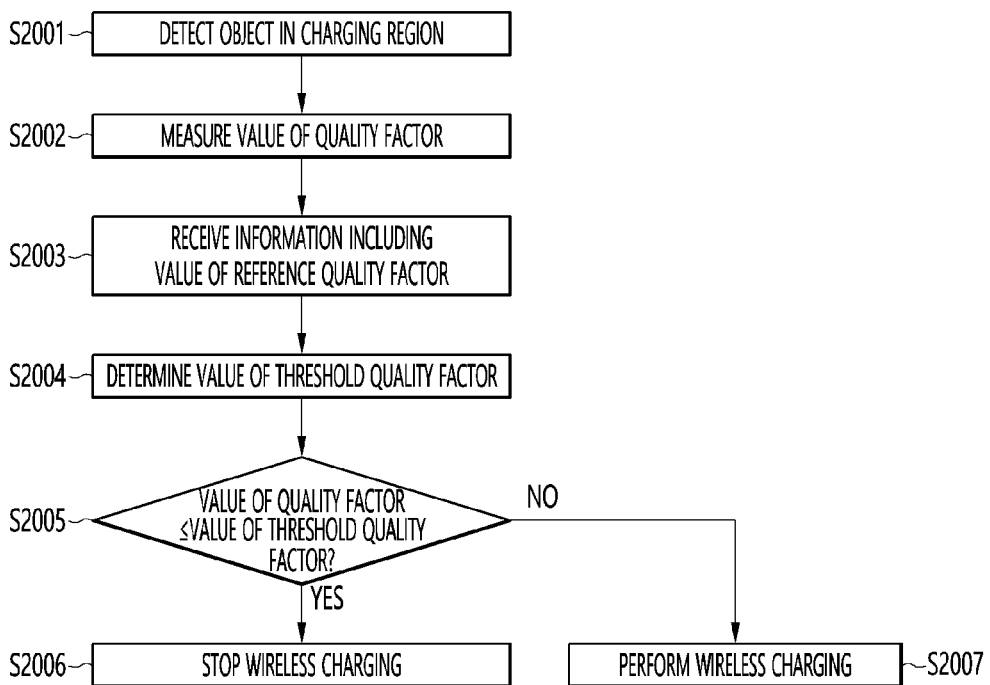
FIG. 20 is a view for describing a wireless charging method in a wireless power transmitter according to still another embodiment of FIG. 19.
Figure 21:
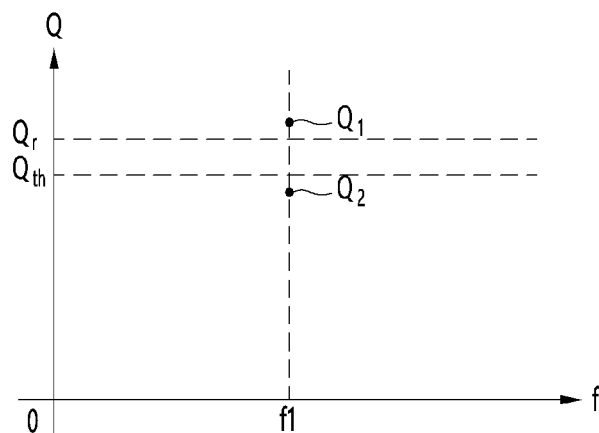
FIG. 21 is a view for describing a foreign object detection method according to a quality factor value in FIG. 20.

FIG. 20 is a view for describing a wireless charging method in a wireless power transmitter according to one embodiment of FIG. 19, and FIG. 21 is a view for describing a foreign object detection method according to a quality factor value in FIG. 20.

Referring to FIG. 20, the wireless charging method in the wireless power transmitter may include sensing an object in a charging region (S2001). More specifically, the wireless power transmitter may sense the object based on a change in current of a transmission coil by transmitting an analog ping.

The wireless charging method in the wireless power transmitter may include measuring a quality factor value before a ping phase (S2002). As an example, the wireless power transmitter may measure the quality factor value using a sensor in a selection phase.

The wireless charging method in the wireless power transmitter may include receiving information including a reference quality factor value (S2003). More specifically, the wireless power transmitter may receive an FOD status packet including the reference quality factor value.

The wireless charging method in the wireless power transmitter may include determining a threshold quality factor value (S2004). More specifically, the wireless power transmitter may calculate the threshold quality factor value using the received reference quality factor value. As an example, as shown in FIG. 21, the wireless power transmitter may determine a value less than at least 10% in a reference quality factor value Qr as a threshold quality factor value Qth. 10% is a tolerance of the reference quality factor value, and when a foreign object is present, the foreign object may be detected by using that a measured quality factor value which is at least the tolerance or more becomes smaller than the reference quality factor value.

The wireless charging method in the wireless power transmitter may include determining whether the measured quality factor value is less than or equal to the threshold quality factor value (S2005). The wireless power transmitter may determine that a foreign object is present when the measured quality factor value is less than or equal to the threshold quality factor value. Conversely, the wireless power transmitter may determine that the foreign object is not present when the measured quality factor value is not less than or equal to the threshold quality factor value. 21. As an example, as shown in FIG. 21, when a frequency of transmission power is a first frequency f1, the quality factor measured in the wireless power transmitter may be a first quality factor value Q1 and a second quality factor value Q2. Since the first quality factor value Q1 is greater than the threshold quality factor value Qth, it is possible to determine that a foreign object is present between the wireless power transmitter and the wireless power receiver. Since the second quality factor value Q2 is less than the threshold quality factor value Qth, it is possible to determine that a foreign object is present between the wireless power transmitter and the wireless power receiver.

The wireless power transmitter may stop wireless charging when the measured quality factor value is less than or equal to the threshold quality factor value (S2006). That is, the wireless power transmitter may stop wireless charging when it is determined that a foreign object is present. Conversely, the wireless power transmitter may perform wireless charging when the measured quality factor value is not less than or equal to the threshold quality factor value (S2007). That is, the wireless power transmitter may perform wireless charging when it is determined that the foreign object is present.

Therefore, one embodiment may determine a foreign object accurately. In addition, one embodiment may accurately determine the foreign object to prevent a heat generation phenomenon, a decrease phenomenon in charging efficiency, and a loss of power consumption.

Figure 22:
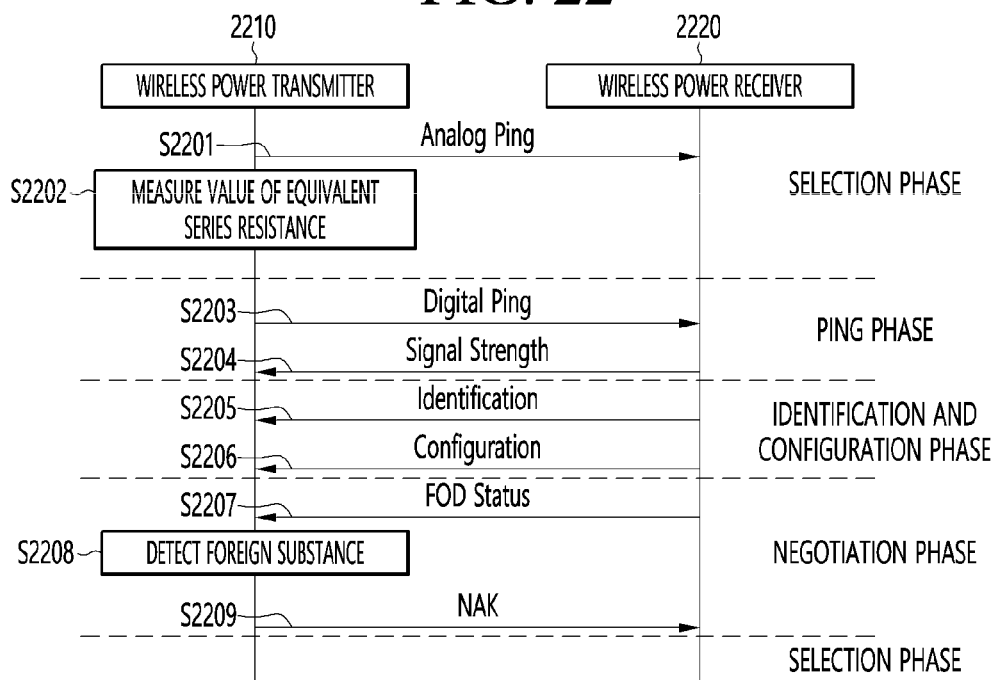
FIG. 22 is a view for describing a wireless charging method on a wireless charging system according to still another embodiment.

FIG. 22 is a view for describing a wireless charging method on a wireless charging system according to still another embodiment.

Referring to FIG. 22, a wireless power transmitter 2210 may transmit an analog ping to a wireless power receiver 2220 in a selection phase (S2201)

The wireless power transmitter 2210 may measure an equivalent series resistance value before a ping phase (S2202). As an example, the wireless power transmitter 2210 may measure the equivalent series resistance value in the selection phase (S2202).

The wireless power transmitter 2210 may transition from the selection phase to the ping phase when an object is detected. The wireless power transmitter 2210 activates the wireless power receiver 2220, and may transmit a digital ping in order to identify whether a receiver is the wireless power receiver 2220 (S2203). The wireless power receiver 2220 may transmit a signal strength packet in response to the digital ping (S2204).

When the ping phase is completed, in an identification and configuration phase, the wireless power receiver 2220 may transmit an identification packet for informing identification information and a configuration packet for informing configuration information (S2205 to S2206). When a negotiation field value of the configuration packet is a value indicating to perform a negotiation phase, the wireless power transmitter 2210 and the wireless power receiver 2220 may transition to the negotiation phase.

In the negotiation phase, the wireless power receiver 2220 may transmit an FOD status packet for FO detection (S2207). The FOD status packet may include a reference quality factor value.

The wireless power transmitter 2210 may perform the foreign object detection (S2208). In the foreign object detection, the foreign object may be detected using a measured equivalent series resistance value and information of a received FOD state packet. The foreign object detection follows a description of the wireless charging method of FIG. 23.

The wireless power transmitter 2210 may transmit an NAK to the wireless power receiver 2220 in response to the FOD status packet when it is determined that a foreign object is present after performing first foreign object detection (S2210). Conversely, the wireless power transmitter 2210 may transmit an ACK to the wireless power receiver 2220 in response to the FOD status packet when it is determined that the foreign object is not present after performing the first foreign object detection. In addition, the wireless power transmitter 2210 may stop wireless charging when it is determined that the foreign object is not present. That is, the wireless power transmitter 2210 may transition to the selection phase after a predetermined time has passed in the negotiation phase.

FIG. 23 is a view for describing a wireless charging method in a wireless power transmitter according to another embodiment of FIG. 22, and FIG. 24 is a view for describing a foreign object detection method according to an equivalent series resistance value.

Referring to FIG. 23, the wireless charging method in the wireless power transmitter according to one embodiment may include sensing an object in a charging region (S2301). More specifically, the wireless power transmitter may sense the object based on a change in current of a transmission coil by transmitting an analog ping.

The wireless charging method in the wireless power transmitter may include measuring an equivalent series resistance value before a ping phase (S2302). As an example, the wireless power transmitter may measure the equivalent series resistance value using a sensor in a selection phase.

The wireless charging method in the wireless power transmitter may include receiving information including a reference quality factor value and a reference peak frequency value (S2303). More specifically, the wireless power transmitter may receive an FOD status packet including the reference quality factor value and the reference peak frequency value. As an example, the wireless power transmitter may receive the FOD status packet using a communication unit in a negotiation phase. The reference quality factor value and the reference peak frequency value are a quality factor value and a peak frequency value stored in a wireless power receiver.

The wireless charging method in the wireless power transmitter may include determining a first threshold equivalent series resistance value (S2304). Here, the first threshold equivalent series resistance value may be determined based on a reference equivalent series resistance value. Since the reference equivalent series resistance value has been described already based on Equations 2 and 3, a detailed description thereof will be omitted.

Referring to FIG. 24, as an example, the wireless power transmitter may determine a value increased by a predetermined ratio in a reference equivalent series resistance value ESRr as a first threshold equivalent series resistance value ESRth1. At this time, the predetermined ratio may be 10%. The wireless power transmitter may determine a value decreased by a predetermined ratio in the reference equivalent series resistance value ESRr as a second threshold equivalent series resistance value ESRth2. At this time, the predetermined ratio may be 10%. 10% is a tolerance of the reference equivalent series resistance value, and when a foreign object is present, the foreign object may be detected by using that a measured equivalent series resistance value which is at least the tolerance or more becomes greater than the reference equivalent series resistance value. As another example, the wireless power transmitter may determine a maximum value of the reference equivalent series resistance ESRr as the first threshold equivalent series resistance value ESRth1 and a minimum value of the reference equivalent series resistance ESRr as the second threshold equivalent series resistance value ESRth2. As still another example, the first threshold equivalent series resistance value ESRth1 may be a value of 50 mΩ or less, and the second threshold equivalent series resistance value ESRth2 may be a value of 500 mΩ or more. As still another example, the first threshold equivalent series resistance value ESRth1 may be smaller than the second threshold equivalent series resistance value ESRth2.

The wireless charging method in the wireless power transmitter may include determining whether a measured equivalent series resistance value is greater than or equal to the first threshold equivalent series resistance value (S2305). The wireless power transmitter may determine that a foreign object is present when the measured equivalent series resistance value is greater than or equal to the first equivalent series resistance value. Conversely, the wireless power transmitter may determine that a foreign object is present when the measured equivalent series resistance value is not greater than or equal to the first threshold equivalent series resistance value. As an example, as shown in FIG. 24, the equivalent series resistance value measured in the wireless power transmitter may be the first equivalent series resistance value ESR1 and the second equivalent series resistance value ESR2. Since the first equivalent series resistance value ESR1 is smaller than the first threshold equivalent series resistance value ESRth1, it is possible to determine that a foreign object is not present between the wireless power transmitter and the wireless power receiver. Since the second equivalent series resistance value ESR2 is greater than the first threshold equivalent series resistance value ESRth1, it is possible to determine that a foreign object is present between the wireless power transmitter and the wireless power receiver.

The wireless power transmitter may stop wireless charging when the measured equivalent series resistance value is less than or equal to the first threshold equivalent series resistance value (S2306). That is, the wireless power transmitter may stop wireless charging when it is determined that a foreign object is present. Conversely, the wireless power transmitter may perform wireless charging when the measured equivalent series resistance value is not less than or equal to the first threshold equivalent series resistance value (S2007). That is, the wireless power transmitter may perform wireless charging when it is determined that the foreign object is present.

Therefore, another embodiment may determine a foreign object accurately. In addition, another embodiment may accurately determine the foreign object to prevent a heat generation phenomenon, a decrease phenomenon in charging efficiency, and a loss of power consumption.

FIG. 25 is a view for describing a wireless charging method on a wireless charging system according to still another embodiment.

Referring to FIG. 25, a wireless power transmitter 2510 may transmit an analog ping to a wireless power receiver 2520 in a selection phase (S2501).

The wireless power transmitter 2510 may measure an equivalent series resistance value before a ping phase (S2502). As an example, the wireless power transmitter 2510 may measure the equivalent series resistance value in the selection phase (S2502).

In addition, the wireless power transmitter 2510 may measure a peak frequency value before the ping phase (S2503). As an example, the wireless power transmitter 2510 may measure the peak frequency value in the selection phase (S2502). As another example, the wireless power transmitter 2510 may determine an inductance value by measuring the peak frequency of transmission coil in the selection phase.

The wireless power transmitter 2510 may transition from the selection phase to the ping phase when an object is detected. The wireless power transmitter 2510 activates the wireless power receiver 2520, and may transmit a digital ping in order to identify whether a receiver is the wireless power receiver 2520 (S2504). The wireless power receiver 2520 may transmit a signal strength packet in response to the digital ping (S2505).

When the ping phase is completed, in an identification and configuration phase, the wireless power receiver 2520 may transmit an identification packet for informing identification information and a configuration packet for informing configuration information (S2506 to S2510). When a negotiation field value of the configuration packet is a value indicating to perform a negotiation phase, the wireless power transmitter 2510 and the wireless power receiver 2520 may transition to the negotiation phase.

In the negotiation phase, the wireless power receiver 2520 may transmit an FOD status packet for FO detection (S2508). The FOD status packet may include one or more of a reference quality factor value and a reference peak frequency value.

The wireless power transmitter 2510 may perform the foreign object detection (S2509). In the foreign object detection, the foreign object may be detected using a measured equivalent series resistance value and information of a received FOD state packet. The foreign object detection follows the description of the wireless charging method of FIG. 26.

The wireless power transmitter 2510 may transmit an ACK to the wireless power receiver 2520 in response to the FOD status packet when it is determined that the foreign object is not present after performing the foreign object detection (S2510). Conversely, the wireless power transmitter 2510 may transmit an NAK to the wireless power receiver 2520 in response to the FOD status packet when it is determined that the foreign object is present after performing the second foreign object detection (S2520).

The wireless power receiver 2520 may transmit a general request packet requesting a power transmitter capability packet for a power transmission contract (S2511). The wireless power transmitter 2520 may transmit the power transmitter capability packet in response to the general request packet (S2512). In this case, a guaranteed power of the power transmitter capability packet may be a first guaranteed power value. The wireless power receiver 2520 may transmit a specific request packet for proposing a guaranteed power value of the power transmission contract based on the second guaranteed power value of the power transmitter capability packet (S2513). The wireless power transmitter 2510 may transmit an ACK packet in response to a specific request packet for requesting a guaranteed power value of the power transmission contract (S2514). That is, the wireless power transmitter 2510 is in a case in which the guaranteed power value of the power transmission contract proposed by the wireless power receiver is accepted. That is, the power transmission contract may be completed with the first guaranteed power value. Thereafter, when the power transmission contract is completed, the wireless power receiver 2520 may transmit a specific request packet for ending the negotiation phase (S2515). The wireless power transmitter 2510 may transmit an ACK packet in response to the specific request packet for ending the negotiation phase (S2516). That is, the wireless power transmitter 2510 may transmit an ACK packet upon acceptance of the end of the negotiation phase.

In the calibration phase, the wireless power receiver 2520 may transmit the received power packet to the wireless power transmitter 2510 (S2517). In this case, the received power packet may be a 24-bit received power packet. The wireless power transmitter 2510 may transmit an ACK packet in response to the received power packet in order to perform wireless charging (S2518).

When the calibration phase is completed, the power transfer phase may be performed with the first guaranteed power. The wireless power receiver 2520 may transmit one or more control error packets in order to control transmission power of the wireless power transmitter 2510 (S2519). The wireless power receiver 2520 may transmit the received power packet periodically or arbitrarily (S2520).

Figure 26:
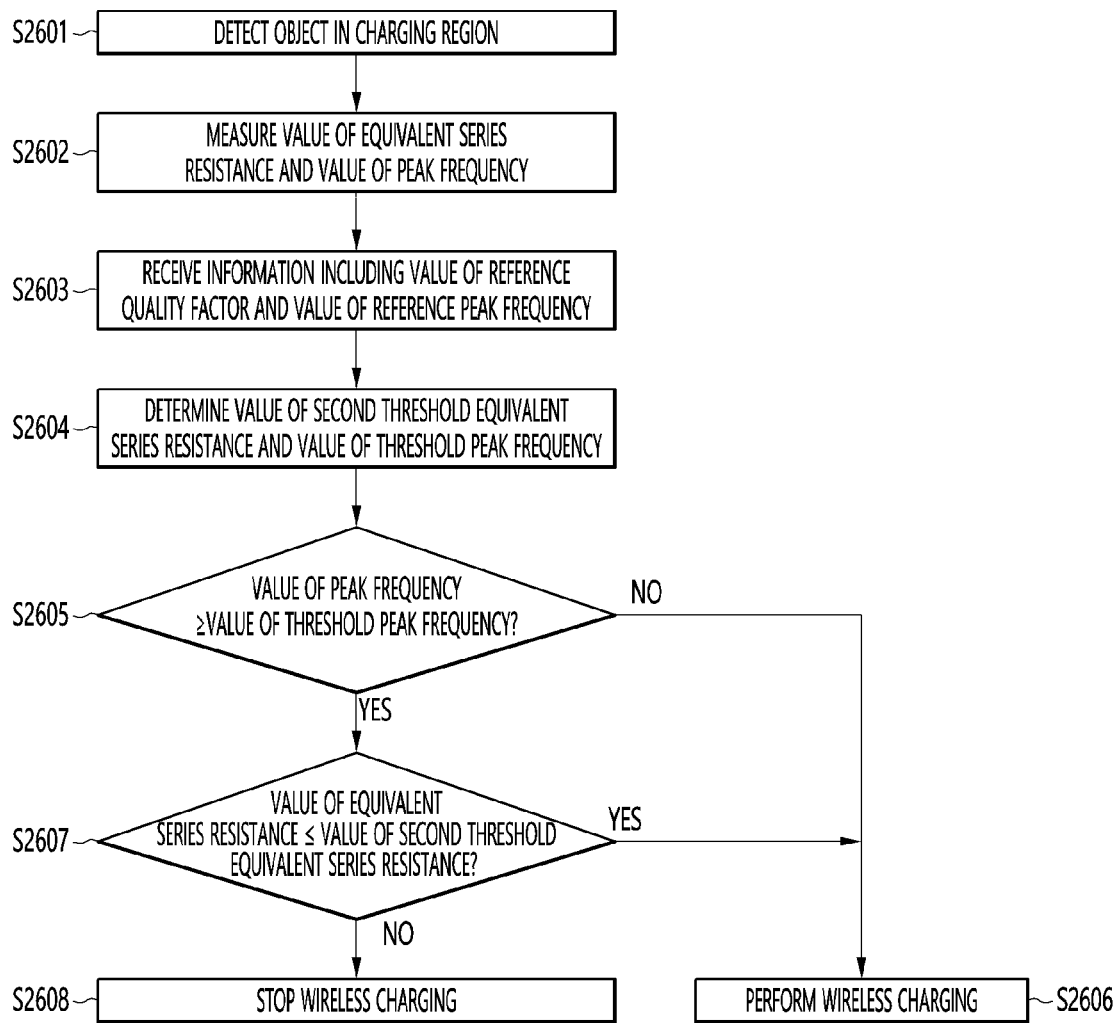
FIG. 26 is a view for describing a wireless charging method in a wireless power transmitter according to still another embodiment of FIG. 25.
Figure 27:
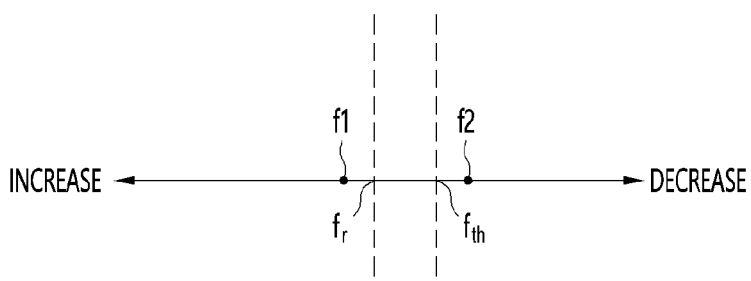
FIG. 27 is a view for describing a foreign object detection method according to a frequency value.

FIG. 26 is a view for describing a wireless charging method in a wireless power transmitter according to still another embodiment of FIG. 25, and FIG. 27 is a view for describing a foreign object detection method according to a frequency value of FIG. 26.

Referring to FIG. 26, the wireless charging method in the wireless power transmitter may include sensing an object in a charging region (S2601). More specifically, the wireless power transmitter may sense the object based on a change in current of a transmission coil by transmitting an analog ping.

The wireless charging method in the wireless power transmitter may include measuring an equivalent series resistance value and a peak frequency value before a ping phase (S2602). As an example, the wireless power transmitter may measure the equivalent series resistance value using a sensor in a selection phase. In addition, the wireless power transmitter may measure the peak frequency value of transmission power using the sensor in the selection phase.

The wireless charging method in the wireless power transmitter may include receiving information including a reference quality factor value and a reference peak frequency value (S2603). More specifically, the wireless power transmitter may receive an FOD status packet including the reference quality factor value and the reference peak frequency value. As an example, the wireless power transmitter may receive the FOD status packet using a communication unit in a negotiation phase. The reference quality factor value and the reference peak frequency value are a quality factor value and a peak frequency value stored in a wireless power receiver.

The wireless charging method in the wireless power transmitter may include determining a second threshold equivalent series resistance value and a threshold peak frequency value (S2604). More specifically, a method of determining the second threshold equivalent series resistance value may be the same as a method of determining the second threshold equivalent series resistance value of FIG. 23. The wireless power transmitter may calculate the threshold peak frequency value using the received reference peak frequency value. As an example, as shown in FIG. 27, the wireless power transmitter may determine a value that is at least 5 kHz greater than a reference peak frequency fr as a threshold peak frequency fth. 5 kHz is a tolerance of the reference peak frequency value, and when a foreign object is present, the foreign object may be detected by using that a measured peak frequency value which is at least the tolerance or more becomes greater than the reference peak frequency value.

The wireless charging method in the wireless power transmitter may include determining whether the measured peak frequency value is greater than or equal to the threshold peak frequency value (S2605). More specifically, the wireless power transmitter may determine that a foreign object is present when the measured peak frequency value is not greater than or equal to the threshold peak frequency value. The wireless power transmitter may perform wireless charging when the peak frequency value measured in S2605 is not the threshold peak frequency value (S2606). As an example, as shown in FIG. 27, the measured peak frequency value of the wireless power transmitter may be a first peak frequency value f1. Since the first peak frequency value f1 is smaller than the threshold peak frequency value fth, it is possible to determine that a foreign object is not present. In this case, since the measured peak frequency value is not greater than or equal to the threshold peak frequency value, the wireless power transmitter determines that a foreign object is present, and may transmit information indicating that the foreign object has been detected to the wireless power receiver.

The wireless charging method in the wireless power transmitter may include determining whether the measured equivalent series resistance value is less than or equal to the second threshold equivalent series resistance value when the measured peak frequency value is greater than or equal to the threshold peak frequency value (S2607). The wireless power transmitter may perform wireless charging when the measured peak frequency value is greater than or equal to the threshold peak frequency value and the measured equivalent series resistance value is less than or equal to the second threshold equivalent series resistance value (S2606). The wireless power transmitter may stop wireless charging when the measured peak frequency value is greater than or equal to the threshold peak frequency value and the measured equivalent series resistance value is not less than or equal to the second threshold equivalent series resistance value (S2608). More specifically, when the measured peak frequency value is greater than or equal to the threshold peak frequency value and the measured equivalent series resistance value is less than or equal to the second threshold equivalent series resistance value, the wireless power transmitter determines that a foreign object is not present, and may transmit information indicating that the foreign object is not detected to the wireless power receiver. When the measured peak frequency value is greater than or equal to the threshold peak frequency value and the measured equivalent series resistance value is not less than or equal to the second threshold equivalent series resistance value, the wireless power transmitter determines that a foreign object is present, and may transmit information indicating that the foreign object has been detected to the wireless power receiver. More specifically, as a charging distance between the wireless power transmitter and the wireless power receiver increases, for example, as a height of the wireless power receiver from the wireless power transmitter increases, the peak frequency value measured at the wireless power transmitter increases and the equivalent series resistance value decreases. When a foreign object is present in charging regions of the wireless power transmitter and the wireless power receiver, the peak frequency value increases and the equivalent series resistance value increases. Therefore, the wireless power transmitter may determine that the charging distance between the wireless power transmitter and the wireless power receiver is increased and the foreign object is not present when satisfying all a condition in which the measured equivalent series resistance value is low and the measured peak frequency value is high. Accordingly, the wireless power transmitter may prevent erroneous recognition that a foreign object is present due to an increase in the measured peak frequency value. As an example, as shown in FIG. 27, the measured peak frequency value of the wireless power transmitter may be a second peak frequency value f2. Since the second peak frequency value f2 is larger than the threshold peak frequency value fth, the second peak frequency value f2 may be a situation in which a foreign object is present or a situation in which a charging distance is increased. At the same time, as shown in FIG. 24, the measured equivalent series resistance value of the wireless power transmitter may be a third equivalent series resistance value ESR3. Since the third equivalent series resistance value ESR3 is smaller than the second threshold equivalent series resistance value ESRth2, it may be determined in the situation in which the charging distance is increased, not in a situation in which a foreign object is finally present.

Therefore, still another embodiment may determine a foreign object accurately. In addition, still another embodiment may accurately determine the foreign object to prevent a heat generation phenomenon, a decrease phenomenon in charging efficiency, and a loss of power consumption. Yet another embodiment solves a problem in which wireless charging is not performed unnecessarily by determining to distinguish that a charging distance between a wireless power transmitter and a wireless power receiver is increased and presence of a foreign object.

Figure 28:
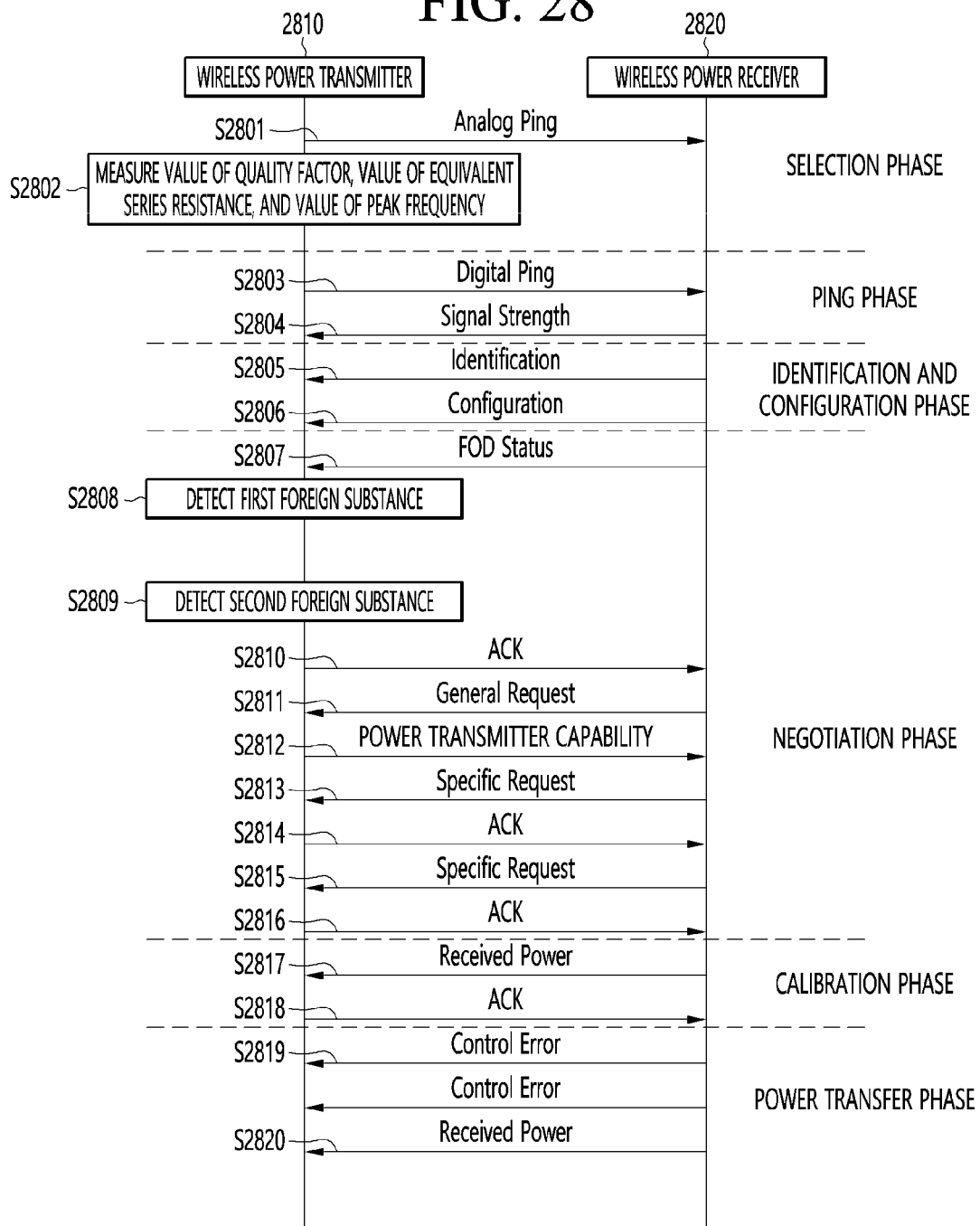
FIG. 28 is a view for describing a wireless charging method on a wireless charging system according to still another embodiment.

FIG. 28 is a view for describing a wireless charging method on a wireless charging system according to still another embodiment.

Referring to FIG. 28, a wireless power transmitter 2810 may transmit an analog ping to a wireless power receiver 2820 in a selection phase (S2801)

The wireless power transmitter 2810 may measure a quality factor value, an equivalent series resistance value, and a peak frequency value before a ping phase (S2802). As an example, the wireless power transmitter 2810 may measure the equivalent series resistance value in the selection phase (S2802). The measurement of the peak frequency value may be the same as the description of FIG. 25.

The wireless power transmitter 2810 may transit from the selection phase to the ping phase when an object is sensed. The wireless power transmitter 2810 may activate the wireless power receiver 2820, and may transmit a digital ping to identify whether a receiver is the wireless power receiver 2820 (S2803). The wireless power receiver 2820 may transmit a signal strength packet in response to the digital ping (S2804).

When the ping phase is completed, in the identifying and configuring phase, the wireless power receiver 2820 may transmit an identification packet to inform the identification information and a configuration packet to inform the configuration information (S2805 to S2806). The wireless power transmitter 2810 and the wireless power receiver 2820 may transition to a negotiation phase when a negotiation field value of the configuration packet is a value indicating to perform the negotiation phase.

In the negotiation phase, the wireless power receiver 2820 may transmit a FOD status packet for FO detection (S2808). The FOD state packet may include one or more of a reference quality factor value and a reference frequency value.

The wireless power transmitter 2810 may perform first foreign object detection (S2808). The foreign object detection may detect a foreign object by using any one measured value of the quality factor value and the equivalent series resistance value, and information of a received FOD status packet. The first foreign object detection follows the description of the foreign object detection method of FIG. 20, the foreign object detection method of FIG. 23, and the wireless charging method of FIG. 29.

When it is determined that the foreign object is not detected through the first foreign object, the wireless power transmitter 2810 may perform second foreign object detection (S2809). The foreign object detection may detect a foreign object by using the measured peak frequency value and the information of the received FOD state packet. The second foreign object detection follows the description of the foreign object detection method of FIG. 26 and the wireless charging method of FIG. 29.

The wireless power transmitter 2810 may transmit an ACK to the wireless power receiver 2820 in response to the FOD status packet when it is determined that the foreign object is not present after performing the second foreign object detection (S2810). Conversely, the wireless power transmitter 2810 may transmit an NAK to the wireless power receiver 2820 in response to the FOD status packet when it is determined that the foreign object is present after performing the second foreign object detection (S2820).

The wireless power receiver 2820 may transmit a general request packet requesting a power transmitter capability packet for a power transmission contract (S2811). The wireless power transmitter 2810 may transmit the power transmitter capability packet in response to the general request packet (S2812). In this case, a guaranteed power of the power transmitter capability packet may be a first guaranteed power value. A potential power value may be a maximum transmission power value that may be transmitted by a wireless power transmitter regardless of power limitation due to surrounding requirements. As an example, the first guaranteed power value may be a value close to a potential power value that is not subject to power limitations due to a number of wireless power transmitters or a number of wireless power receivers based on a supply power provided from a power supply of the wireless power transmitter. As another example, the first guaranteed power value may be a maximum transmission power value that may be transmitted by the wireless power transmitter under conditions (environmental conditions) such as power limitation due to the number of wireless power transmitters or the number of wireless power receivers. The environmental conditions may refer to a temperature of the transmitter, a capacity of the transmitter's power source, the presence of foreign object, or influence of friendly metal. The wireless power receiver 2820 may transmit a specific request packet to propose the guaranteed power value of the power transmission contract based on the first guaranteed power value of the power transmitter capability packet (S2813). It should be noted that the first guaranteed power of the power transmitter capability packet and the guaranteed power of the power transmission contract may be distinguished. For example, the wireless power receiver 2820 may request a guaranteed power value of the power transmission contract with a value equal to or less than the first guaranteed power value of the power transmitter capability packet. For convenience of description, the wireless power receiver 2820 requests the guaranteed power value of the power transmission contract as the same value as the first guaranteed power value of the power transmitter capability packet. The wireless power transmitter 2810 may transmit an ACK packet in response to a specific request packet for requesting a guaranteed power value of the power transmission contract (S2814). That is, the wireless power transmitter 2810 is in a case in which the guaranteed power value of the power transmission contract proposed by the wireless power receiver is accepted. That is, the power transmission contract may be completed with the first guaranteed power value. Thereafter, when the power transmission contract is completed, the wireless power receiver 2820 may transmit a specific request packet for ending the negotiation phase (S2815). The wireless power transmitter 2810 may transmit an ACK packet in response to the specific request packet for ending the negotiation phase (S2816). That is, the wireless power transmitter 2810 may transmit an ACK packet upon acceptance of the end of the negotiation phase.

In the calibration phase, the wireless power receiver 2820 may transmit the received power packet to the wireless power transmitter 2810 (S2817). In this case, the received power packet may be a 24-bit received power packet. The wireless power transmitter 2810 may transmit an ACK packet in response to the received power packet in order to perform wireless charging (S2818).

When the calibration phase is completed, the power transfer phase may be performed with the first guaranteed power. The wireless power receiver 2820 may transmit one or more control error packets in order to control transmission power of the wireless power transmitter 2810 (S2819). The wireless power receiver 2820 may transmit the received power packet periodically or arbitrarily (S2820).

Figure 29:
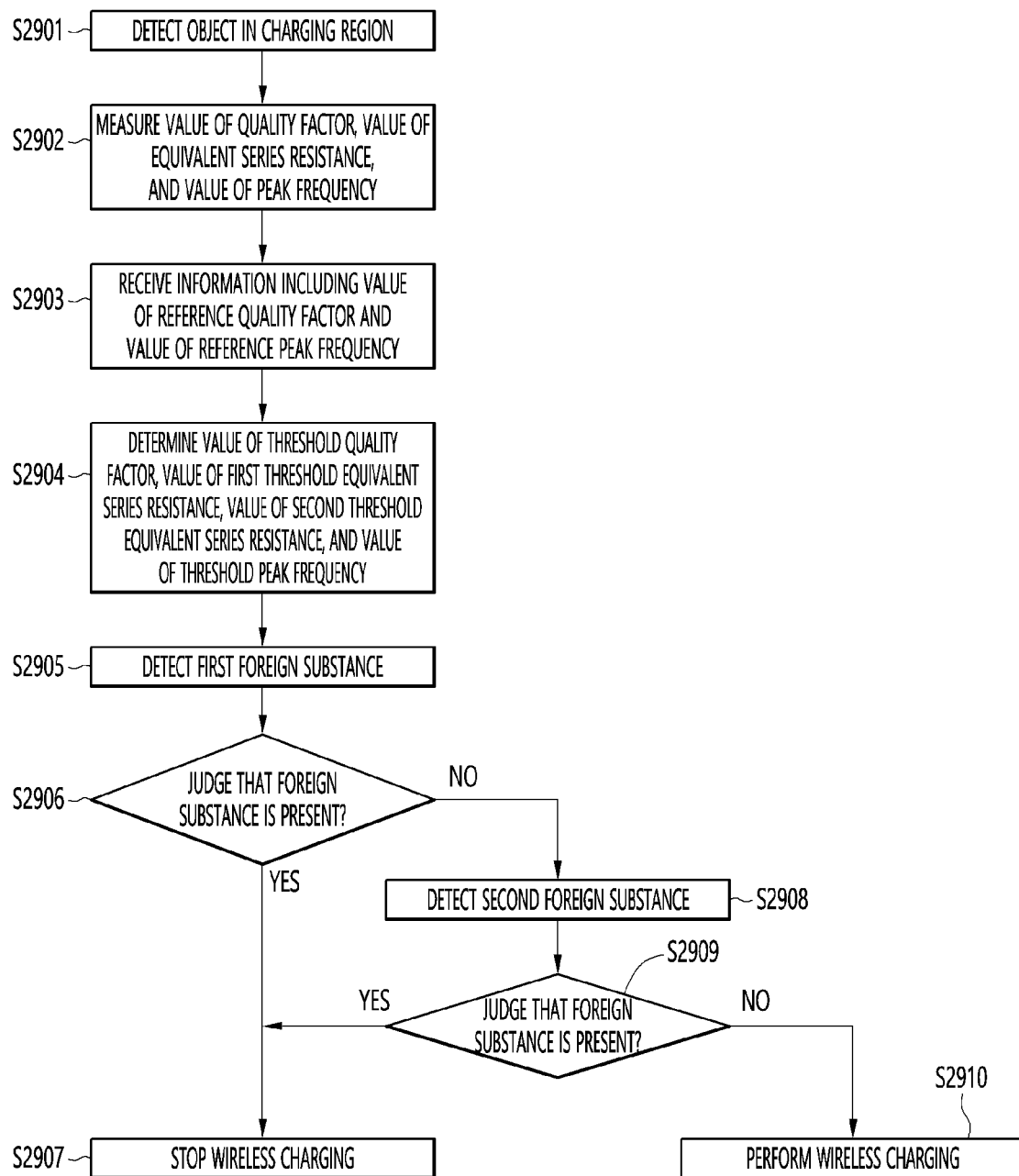
FIG. 29 is a view for describing a wireless charging method in a wireless power transmitter according to another embodiment of FIG. 28.

FIG. 29 is a view for describing a wireless charging method in a wireless power transmitter according to another embodiment of FIG. 28.

Referring to FIG. 29, the wireless charging method in the wireless power transmitter according to another embodiment may include sensing an object in a charging region (S2901). More specifically, the wireless power transmitter may sense the object based on a change in current of a transmission coil by transmitting an analog ping.

The wireless charging method in the wireless power transmitter may include measuring a quality factor value, an equivalent series resistance value, a peak frequency value before a ping phase (S2902). As an example, the wireless power transmitter may measure the quality factor value using a sensor in a selection phase. In addition, the wireless power transmitter may measure the equivalent series resistance value using the sensor in the selection phase. In addition, the wireless power transmitter may measure the peak frequency value of transmission power using the sensor in the selection phase.

The wireless charging method in the wireless power transmitter may include receiving information including a reference quality factor value and a reference peak frequency value (S2903). More specifically, the wireless power transmitter may receive an FOD status packet including the reference quality factor value and the reference peak frequency value. As an example, the wireless power transmitter may receive the FOD status packet using a communication unit in a negotiation phase. The reference quality factor value and the reference peak frequency value are a quality factor value and a peak frequency value stored in a wireless power receiver.

The wireless charging method in the wireless power transmitter may include determining a threshold quality factor value, a first threshold equivalent series resistance value, a second threshold equivalent series resistance value, and a threshold peak frequency value (S2904). A method of determining the threshold quality factor value may be the same as the method of determining the threshold quality factor value of FIG. 20. In addition, a method of determining the first threshold equivalent series resistance value and the second threshold equivalent series resistance value may be the same as the method of determining the first and second threshold equivalent series resistance values of FIG. 23. In addition, a method of determining the threshold peak frequency value may be the same as the method of determining the threshold peak frequency value of FIG. 26.

The wireless charging method in the wireless power transmitter may include detecting a first foreign object (S2905, S2906). As an example, the detecting of the first foreign object may be the same as the foreign object detection method of FIG. 20. That is, the wireless power transmitter may determine that a foreign object is present when a measured quality factor value is less than or equal to the threshold quality factor value. As another example, the detecting of the first foreign object may be the same as the foreign object detection method of FIG. 23. That is, the wireless power transmitter may determine that a foreign object is present when a measured equivalent series resistance value is greater than or equal to the first threshold equivalent series resistance value. When it is determined that a foreign object is present in S2906, the wireless power transmitter may stop wireless charging (S2907). In this case, the wireless power transmitter determines that a foreign object is present, and may transmit information indicating that the foreign object has been detected to the wireless power receiver.

The wireless charging method in the wireless power transmitter may include detecting a second foreign object (S2908, S2909) when it is determined that a foreign object is present in the first foreign object detection. The detecting of the second foreign object may be the same as the second foreign object detection method of FIG. 26. That is, the wireless power transmitter may determine that a foreign object is not present when a measured peak frequency value is not greater than or equal to the threshold peak frequency value, or the measured equivalent series resistance value is less than or equal to the second threshold equivalent series resistance value, and the measured peak frequency value is greater than or equal to the threshold peak frequency value. When it is determined that a foreign object is not present through the second foreign object detection, the wireless power transmitter may perform wireless charging (S2910). In this case, the wireless power transmitter may transmit information indicating that the foreign object is not detected to the wireless power receiver. Conversely, the wireless power transmitter may determine that a foreign object is present when the measured peak frequency value is greater than or equal to the threshold peak frequency value and the measured equivalent series resistance value is not less than or equal to the second threshold equivalent series resistance value. When it is determined that a foreign object is present through the second foreign object detection, the wireless power transmitter may stop wireless charging (S2907). In this case, the wireless power transmitter may transmit information indicating that the foreign object has been detected to the wireless power receiver.

Therefore, still another embodiment may determine a foreign object accurately. In addition, still another embodiment may accurately determine the foreign object to prevent a heat generation phenomenon, a decrease phenomenon in charging efficiency, and a loss of power consumption. Yet another embodiment solves a problem in which wireless charging is not performed unnecessarily by determining to distinguish that a charging distance between a wireless power transmitter and a wireless power receiver is increased and presence of a foreign object.

Methods according to the above-described embodiments may be implemented as a program to be executed by a computer and stored in a computer readable recording medium. Examples of the computer readable recording medium include a ROM, a RAM, a CD-ROM, a magnetic tape, a floppy disk, an optical data storage device, and the like, and also include what is realized in the form of carrier wave (for example, transmission through the Internet).

The computer readable recording medium may be distributed in computer systems connected via a network and the computer readable code may be stored and executed in a distributed manner. In addition, functional programs, codes and code segments for implementing the above-described method may be easily construed by programmers skilled in the art to which the embodiment pertains.

It will be understood by those skilled in the art that other changes may be made therein without departing the spirit and features of the present invention.

Therefore, the foregoing detailed descriptions are not restrictively construed in all aspects but have to be considered as illustrative purposes. The scope of the embodiment has to be determined by rational interpretation of appended claims, and all changes within the equivalent scope of the embodiment belong to the scope embodiment.

What is claimed is:

1. A wireless charging method in a wireless power transmitter, the method comprising:
   sensing an object in a charging region;
   measuring a quality factor value;
   entering a negotiation phase and receiving a foreign object detection status packet including a reference quality factor value;
   detecting a foreign object using the measured quality factor value and the reference quality factor value;
   transmitting a response signal that includes NAK information indicating the foreign object is detected;
   entering a power transfer phase including transmitting information including a second guaranteed power value when the response signal includes the NAK information; and
   entering a renegotiation phase for increasing or decreasing the second guaranteed power value without receiving an additional foreign object detection status packet.

2. The method of claim 1, further comprising:
   transmitting a response signal that includes ACK information indicating the foreign object is not detected;
   in the power transfer phase, transmitting information including a first guaranteed power value when the response signal includes the ACK information, wherein the first guaranteed power value is greater than the second guaranteed power value;
   measuring an internal temperature of the wireless power transmitter; and
   in the renegotiation phase, transmitting information including a third guaranteed power value when the temperature is less than a preset temperature and the response signal includes the NAK information,
   wherein the third guaranteed power value is greater than the second guaranteed power value.

3. The method of claim 2, wherein the second guaranteed power value is a minimum guaranteed power of the wireless power transmitter.

4. The method of claim 1, wherein the detecting of the foreign object includes:
   determining a threshold quality factor value using the reference quality factor value; and
   determining that the foreign object does not exist when the measured quality factor value is greater than or equal to the threshold quality factor value, and determining that the foreign object is present when the measured quality factor value is less than the threshold quality factor value.

5. The method of claim 4, wherein the threshold quality factor value is a value that is less than the reference quality factor value by a first ratio.

6. The method of claim 1, comprising:
   comparing the reference quality factor value with a preset quality factor value of the wireless power transmitter; and
   stopping wireless charging when the reference quality factor value is less than the preset quality factor value of the wireless power transmitter.

7. The method of claim 6, wherein the stopping of the wireless charging is performed when the response signal includes the NAK information.

8. The method of claim 4, wherein the detecting of the foreign object includes stopping wireless charging when the measured quality factor value is less than a value that is less than the threshold quality factor value by a second ratio.

9. The method of claim 8, wherein when the information including the second guaranteed power value is transmitted includes when the measured quality factor value is less than the threshold quality factor value and is greater than a value that is less than the reference quality factor value by the second ratio.

10. The method of claim 2, further comprising:
    in the renegotiation phase, decreasing the second guaranteed power value when the temperature is greater than or equal to the preset temperature.

11. The method of claim 2, wherein
    when the information including the first guaranteed power value is transmitted, a calibration phase is performed before transitioning to the power transfer phase, and
    when the information including the second guaranteed power value is transmitted, it is transited to the power transfer phase without performing the calibration phase.

12. The method of claim 11, wherein the calibration phase includes receiving received power information from a wireless power receiver and determining power loss based on the received power information.

13. The method of claim 11, wherein the power transfer phase includes receiving a control error signal from a wireless power receiver and controlling transmission power.

14. A wireless power transmitter comprising:
    an inverter configured to convert DC power into AC power;
    a transmission coil to which the AC power is applied;
    a communication unit configured to demodulate a signal modulated in a wireless power receiver;
    a sensor configured to sense a voltage of the transmission coil; and a controller configured to:
  enter a negotiation phase and receive a foreign object detection status packet including a reference quality factor value,
  detect a foreign object using the measured quality factor value and the reference quality factor value,
  transmit a response signal that includes NAK information indicating the foreign object is detected,
  enter a power transfer phase including transmitting information including a second guaranteed power value when the response signal includes the NAK information, and
  enter a renegotiation phase for increasing or decreasing the second guaranteed power value without receiving an additional foreign object detection status packet.

15. The wireless power transmitter of claim 14, wherein the controller is further configured to:
  transmit a response signal that includes ACK information indicating the foreign object is not detected,
  in the power transfer phase, transmit information including a first guaranteed power value when the response signal includes the ACK information, wherein the first guaranteed power value is greater than the second guaranteed power value,
  measure an internal temperature of the wireless power transmitter, and
  in the renegotiation phase, transmit information including a third guaranteed power value when the temperature is less than a preset temperature and the response signal includes the NAK information, and
  wherein the third guaranteed power value is greater than the second guaranteed power value.

16. The wireless power transmitter of claim 14, wherein the second guaranteed power value is a minimum guaranteed power of the wireless power transmitter.

17. The wireless power transmitter of claim 14, wherein the controller determines a threshold quality factor value using a reference quality factor value constituting the reference factor, determines that the foreign object does not exist when the measured quality factor value is greater than or equal to the threshold quality factor value, and determines that the foreign object is present when the measured quality factor value is less than the threshold quality factor value.

18. The wireless power transmitter of claim 17, wherein the threshold quality factor value is a value that is less than the reference quality factor value by a first ratio.

19. The wireless power transmitter of claim 17, wherein the controller compares the reference quality factor value constituting the reference factor with a preset quality factor value of the wireless power transmitter and stops wireless charging when the reference quality factor value is less than the preset quality factor value of the wireless power transmitter.

20. A wireless power receiver comprising:
  a receiving coil configured to receive wireless power;
  a rectifier connected to the receiving coil;
  a converter connected to the rectifier; and
  a controller configured to:
  sense a voltage output from the rectifier and communicate with a wireless power transmitter to control an intensity of power applied to the receiving coil,
  enter a negotiation phase and transmit a foreign object detection status packet including a reference quality factor value,
  receive a response signal that includes NAK information indicating a foreign object is detected based on a measured quality factor value and the reference quality factor value,
  enter a power transfer phase including receiving information including a second guaranteed power value when the response signal includes the NAK information, and
  enter a renegotiation phase for increasing or decreasing the second guaranteed power value without transmitting an additional foreign object detection status packet.

* * * * *